United States Patent [19]

Snyder et al.

[11] 4,283,766
[45] Aug. 11, 1981

[54] AUTOMATIC CAMERA CONTROL FOR CREATING SPECIAL EFFECTS IN MOTION PICTURE PHOTOGRAPHY

[75] Inventors: R. David Snyder; Donald W. Iwerks, both of Burbank; Robert R. Otto, Tarzana, all of Calif.; Lee R. Richardson, Scottsdale, Ariz.; David S. Inglish, La Crescenta, Calif.

[73] Assignee: Walt Disney Productions, Burbank, Calif.

[21] Appl. No.: 78,302

[22] Filed: Sep. 24, 1979

[51] Int. Cl.³ .................. G03B 21/32; G06F 15/20
[52] U.S. Cl. ............................... 364/525; 364/107; 364/110; 352/48; 352/53; 352/90
[58] Field of Search ............. 364/516, 107, 525, 110, 364/423; 352/48–54, 89, 90; 353/31

[56] References Cited

U.S. PATENT DOCUMENTS

| | | | |
|---|---|---|---|
| 3,736,411 | 5/1973 | Berndt | 364/423 |
| 3,902,798 | 9/1975 | Trumbull et al. | 353/48 X |
| 3,989,933 | 11/1976 | Inghilleri | 364/525 |
| 4,092,673 | 5/1978 | Adams | 353/53 X |
| 4,099,719 | 7/1978 | Dean et al. | 364/423 X |
| 4,160,585 | 7/1979 | Keillor | 353/90 X |

*Primary Examiner*—Edward J. Wise
*Attorney, Agent, or Firm*—Fulwider, Patton, Rieber, Lee & Utecht

[57] ABSTRACT

An automated camera control drives a video or motion picture camera along multiple independent axes of movement to position the camera for recording an image of a field of view, typically focused upon a model or artwork in special effects motion picture photography. Key position coordinates are manually defined for specific frames of film in a film transport. The automated system generates axial coordinates at each intermediate frame and drives the camera to the intermediate positions thereby defined, as well as the several key positions defined manually. The camera is mounted upon a carriage and a model can also be mounted in relation to the camera and moved in coordinated fashion along a multiplicity of axes. The system accepts manual additions of specified key positions and position data, and the key position information can be edited or deleted. The camera can be driven through the same course of movement with exact repeatability once the specified key positions and corresponding positional data have been manually defined. A model stand and motion picture process projector can be driven in synchronism with the motion picture camera, and an operator monitors and controls all functions from a console positioned independent of the camera.

22 Claims, 11 Drawing Figures

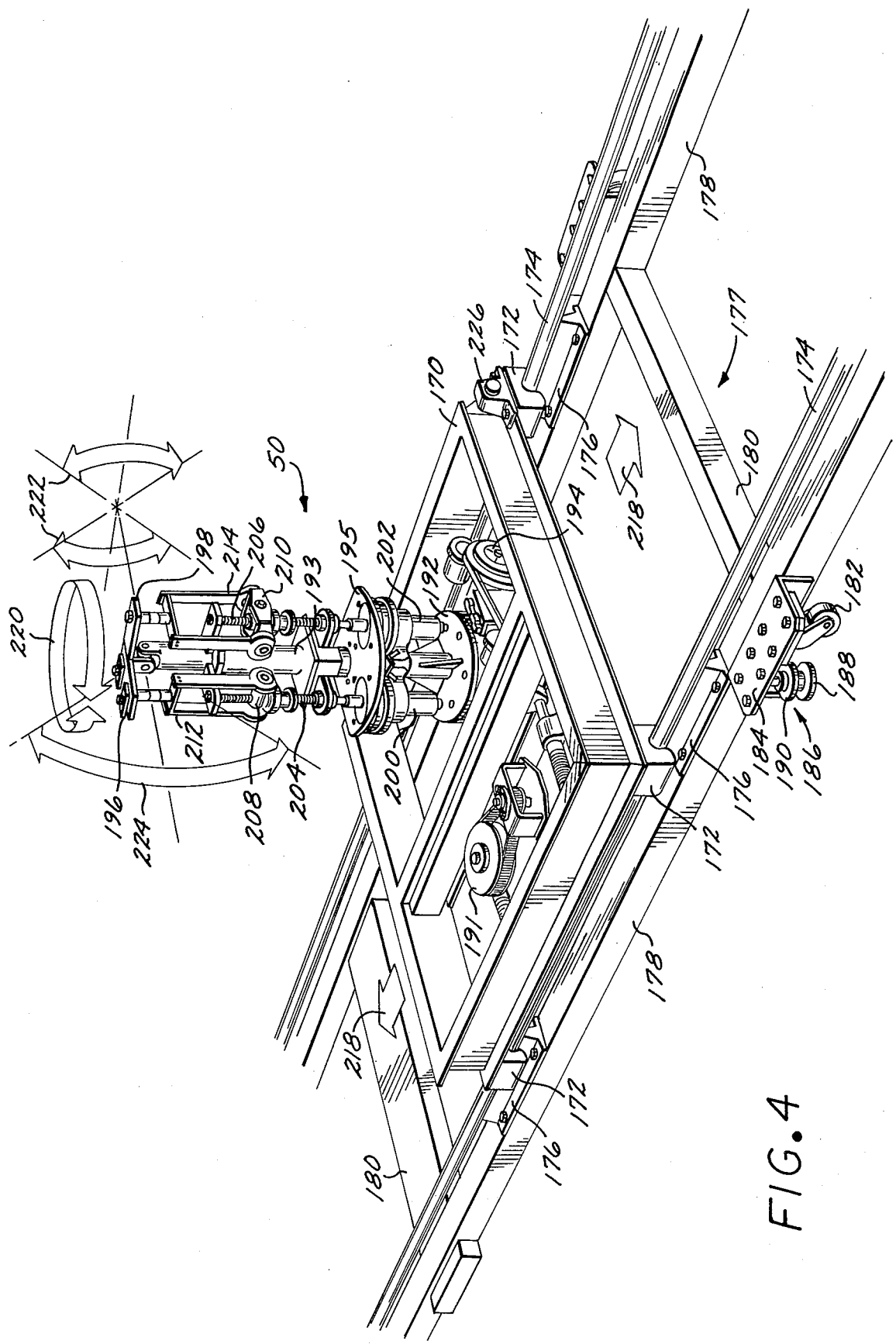

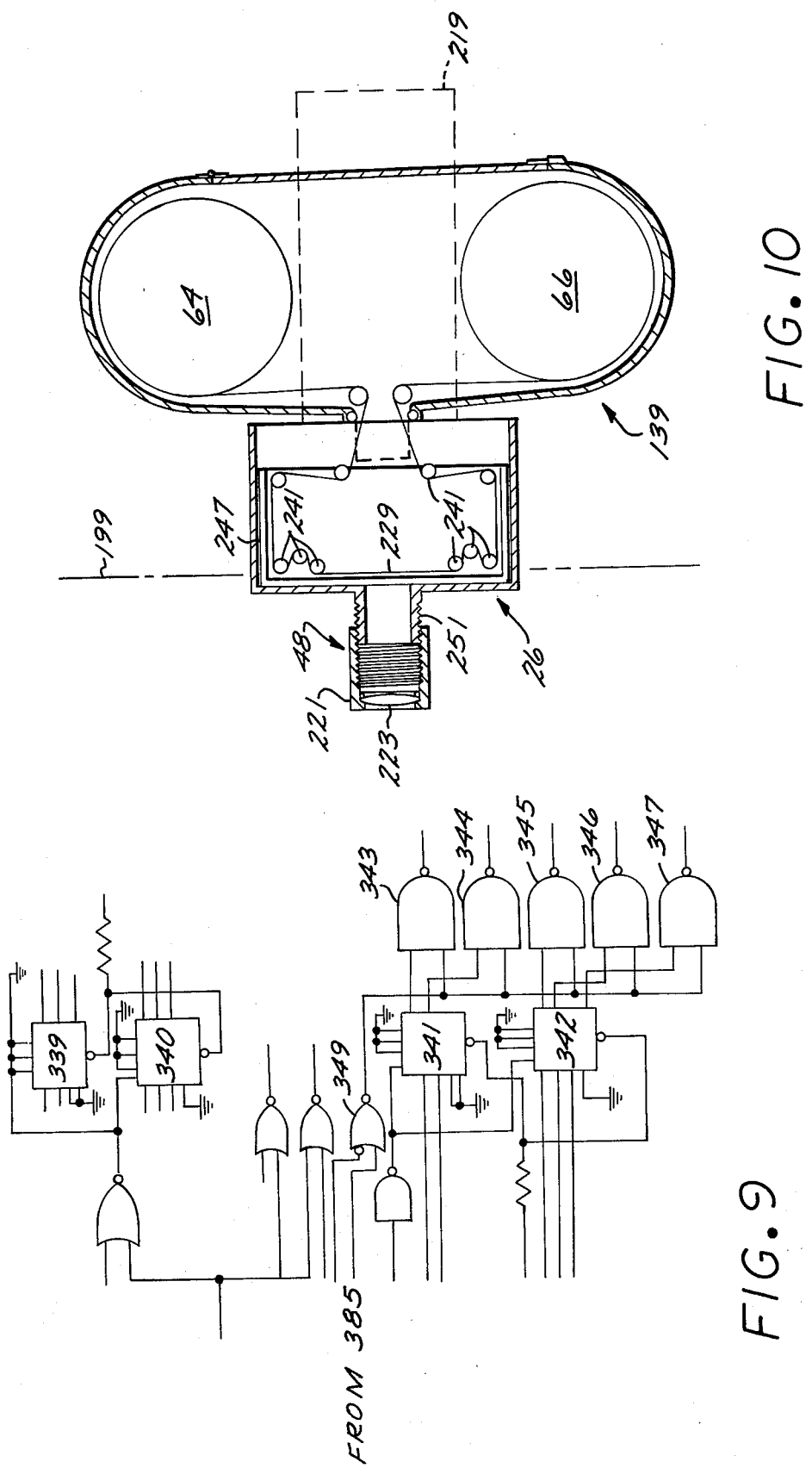

AUTOMATIC CAMERA CONTROL FOR CREATING SPECIAL EFFECTS IN MOTION PICTURE PHOTOGRAPHY

FIELD OF THE INVENTION

The present invention relates to automated video or motion picture camera control devices, especially as utilized to achieve special effects in motion picture photography.

BACKGROUND OF THE INVENTION

Prior attempts have been made to automate camera movement in order to achieve special effects in motion picture photography. In achieving special effects, a camera is typically focused upon a model and moved relative thereto, while always pointing at the model. The model itself may likewise be moved, especially in roll, pitch and yaw. The resulting effects, when photographed, simulate observation of a much larger object, viewing the object from ever changing fairly distant vantage points.

One early automated camera control system is described in U.S. Pat. No. 2,648,252. In this system, the relative position and orientation of a camera and subject were varied automatically through a predetermined pattern of movement. The original motion pattern was produced from manual operation of conventional camera hand wheels. One unit, or channel, of a recording-repeating mechanism was provided for each component or axis of motion. The actual record of the relative motion between camera and subject in terms of coordinates along any axis was made by inscribing a line lengthwise on a moving record strip or tape. The transverse variations in position of the line on the strip corresponded at any instant to the value of the coordinate on the axis involved. After recording a record groove, a repeating arm followed the previously prepared record. The signals received were coupled to a camera servomotor control for the axis involved.

One significant limitation of this system is that movement of the camera in the first instance in order to produce the recorded coordinate groove in the tape required manual movement of the camera. The system required great skill of the camera man producing the tape, and a number of practice runs were undoubtedly necessary to achieve a smooth, flowing movement of the camera relative to the subject. Even with extensive practice, however, the system was subject to imperfections in camera movement that might or might not have appeared during the initial practice runs. Moreover, the record tape produced was unalterable once recorded, and could not be edited.

More recent systems have substituted cassette tape data storage which could be edited repeatedly in place of the prior record strip or tape. In this way, satisfactory segments of camera movement could be retained while unsatisfactory segments could be redone and the revised motion recorded in place of the original unsatisfactory segment. Nevertheless, manual manipulation of the camera throughout its course of movement in the first instance was required, even though remote joy stick controls were substituted for the earlier hand wheels. Furthermore, cassette tape data storage was limited to two minutes of frame sequences. Although a remote focusing servo control was utilized to prevent the camera man from touching and jiggling the camera during filming, manipulation of the remote focusing control was manual. Furthermore, the stepper motor controls of this later system did not provide any basis for correcting for errors in movement. That is, the camera was ordered to progress along particular coordinate paths, although due to mechanical imperfections in the control system, the camera was free to deviate from these paths with no way of detecting or compensating for these deviations.

SUMMARY OF THE INVENTION

The present invention departs from prior concepts in programming and controlling video and photographic camera motion. In commercial motion picture photography, the fundamental unit of film production is a "take" which is one attempt to capture on film a continuous segment of dramatic action generally referred to as a "scene". In the system of the present invention, manual analog control of camera position to generate a reproducible record of camera motion is eliminated, and instead only a few "key" camera positions within the take are specified. Moreover, these positions are specified by digital coordinates in each of a plurality of axes for specified frames from among an enumerated number of frames in the take. Unlike prior systems, the automated camera control system of the invention internally derives the position coordinates for each intermediate film frame between designated frames corresponding to the key positions. The coordinate position for frames between those key positions designated by the operator are only stored temporarily due to the large data storage capacity that is required. They are regenerated each time the automated camera control system is called upon to move through the sequence of those key positions for which coordinate information is specified. The coordinate positional information of the key positions may be altered, in which case the internally derived positional information for intemediate positions is likewise altered when the system is run through a take. Also, editing is easily performed through a keyboard input to add, delete or rearrange the specified key positions.

A further feature of the invention not found in prior art devices is a capability for automatic focusing. Rather than relying upon manual operator focusing of the lens system for the camera, an initial distance of the film plane in the camera is specified for a particular film frame at a key position. Also, the system is provided with a lens code associated with a particular model lens assembly. The focal characteristics of that lens assembly are internally stored in memory as an algorithm relating the extent and direction of angular rotation of the lens barrel for altering the focal length to the distance of the film frame from the point of interest as the camera moves. The camera is thereby automatically focused upon the point of interest without any further action required by the system operator. A plurality of algorithms will typically be stored in memory, one for each of several alternative lens assemblies that may be utilized with the camera.

A further feature of the invention is a sub-system for control of movement of a model upon which the camera focuses in coordination with movement of the camera itself. Such models are used extensively to produce special effects in motion picture photography. Both the camera and the model are subject to movement along a plurality of axes, in addition to the focus axis associated with movement of the camera. Both the camera and the model are mounted upon trucks which can be moved lengthwise along a pair of parallel rails or tracks. In addition, a carriage on the camera truck can be moved horizontally perpendicular to the track orientation. Furthermore, the camera is suspended from a gantry or crane which is vertically movable along upright stanchions. The camera itself is carried in cantilevered fashion held by a yoke mounted in a swivel so that it can tilt forward and backward about a horizontal axis perpendicular to the direction of the camera's line of sight pan in angular rotation about a vertical axis, and roll about a horizontal axis coincident with the camera's line of sight.

The model is mounted upon a stand projecting upward from the model truck. Actuating members are provided so that the model can yaw about a vertical axis, roll about a horizontal axis parallel to the forward direction and pitch about a horizontal axis perpendicular to the forward direction, where the forward direction is defined according to the angle taken by the yaw axis. As with the camera, axial coordinates can be specified for the limited number of key positions associated with particular film frames in a take. Movement of the camera and model is coordinated electronically, and intermediate axial coordinates are derived for both the camera and the model. Furthermore, despite alteration of the distance between the model and the film plane of the camera, due to movement of the model truck and movement of the camera truck and carriage, the system will always retain the model as the point of interest, unless otherwise directed, and will adjust the focus of the camera to compensate for variations in the distance between the model and the camera film plane.

A further feature of the invention is the provision of an input to the automated camera control system from the film transport to continuously provide information as to the specific frame present at the camera lens as the film transport advances or rewinds film through the camera. Unlike prior systems, feedback signals inform the system as to the exact axial co-ordinates of the camera at all times. Position transducers associated with a film transport servomechanism provide an output to the control system identifying the film frame at the lens position at any instant as well as shutter angle. This facilitates editing the programmed camera and model movement, since unsatisfactory segments of a take can be replaced while retaining all satisfactory portions of the take. Once the coordinates have been assigned for the required key positions for the camera, and the model stand if one is used, the system can be cycled repeatedly through the programmed motion any number of times. During recycling, the programmed motion can be edited, altered and additional key positions added or existing key positions deleted.

The invention utilizes a digitally encoded central processing unit and automated servo mechanism controls. All manual input to the system is through an operator keyboard. Because all movements are performed in response to commands from a central computer, the system achieves exact repeatability in all of its movements. Even if manual errors are introduced into the system through the keyboard, the control system will reliably and exactly reproduce camera and model movements without any change from one run to the next. This literally allows for multiple exposure shots of the same scene which are quite useful in filming special effects.

The axial coordinate information is stored only with respect to the key positions designated by the system operator. The requirement for memory storage is thereby drastically reduced by repetitively regenerating the coordinate positional information for all film frames between the designated key positions. Automatic regeneration in this regard is carried out according to equations stored on a large computer disk.

The data concerning all takes of a particular scene will be stored on a removable floppy diskette. The diskettes containing the key position information for the takes of a scene are interchangeable. The control information for a single scene is stored on a single diskette, and each scene may include up to 99 takes. Separate scenes will be stored on separate diskettes.

The system operator will plan each take as a sequence of camera movements with each movement starting and ending at a specified key position. The movement of the camera relative to the subject being photographed is defined by giving these positions in terms of desired axial coordinate data. Up to 20 key positions may be specified for each take. The computer system of the invention moves the camera smoothly and continuously from one position to another when the take is run. In the absence of pan, tilt and focusing data, the system will continue to focus the camera upon a point of interest previously designated automatically.

A further feature of the invention is the provision for synchronization of the camera with a process projector. A process projector includes a motion picture projector with a screen in view of the camera upon which prerecorded images are projected. Typically the screen is transparent, and a rear projection technique is used to provide a backdrop against which the subject to be photographed with the camera control of the automated system of the invention is filmed. According to the invention, the prerecorded motion picture frames of the process projector can be synchronized to advance at a predetermined rate with respect to the rate of advance of film through the camera. One frame, or any number of frames of film, can be projected on the process projector screen for each frame of film carried through the film transport of the camera controlled according to the invention. This controls the rate of speed of the background image relative to the foreground subject. Synchronization is automatic and occurs at the rate specified by the system operator.

Another feature of the invention is the versatility of the camera control system. While a principle application is in the creation of special effects filming in motion picture photography where each film frame is held for a lengthy exposure time of up to several seconds, the control system of the invention has other uses. It can be used for live action filming, and additionally, the film camera can be replaced with a television camera. All of the axes of movement of a television camera are controlled in identical fashion as with a film camera, with the exception that there is no film transport associated with a video television camera.

A further feature of the invention is the provision of video tape capability. In addition to the recordation of key position data on the diskettes, a video camera positioned in place of the motion picture camera is able to allow scenes and takes to be recorded on video tape for repeated viewing of rehearsals. This allows the system operator to view the exact images encountered as the camera and models move, and to guide the operators in making any necessary adjustments in the key position data. Furthermore, the use of video tape allows scenes and takes recorded at different times to be "cut together" so as to assemble the most desirable portions of different takes.

Preferably the invention is provided with an operator console which can be moved independently of both the camera and the electronic memory and processing units. The console includes a CRT video monitor from which the operator can observe the image viewed by the camera. This system is far superior to the pilot lens arrangement previously required in motion picture photography since the operator need not physically accompany movement of the camera in order to observe the camera field of view. This allows the operator to observe and edit camera movement much more readily than with prior systems. Furthermore, the camera is not subject to movement by inadvertent contact by the operator.

The invention may be illustrated with greater clarity and particularly by reference to the accompanying drawings.

DESCRIPTION OF THE DRAWINGS

FIG. 4 is a perspective view of the model stand assembly.

FIGS. 7, 8 and 9 are logic diagrams of the servo control interface of FIGS. 2 and 6.

FIG. 10 is a plan sectional diagram of the film transport drive.

DESCRIPTION OF THE EMBODIMENT

Figure 1:
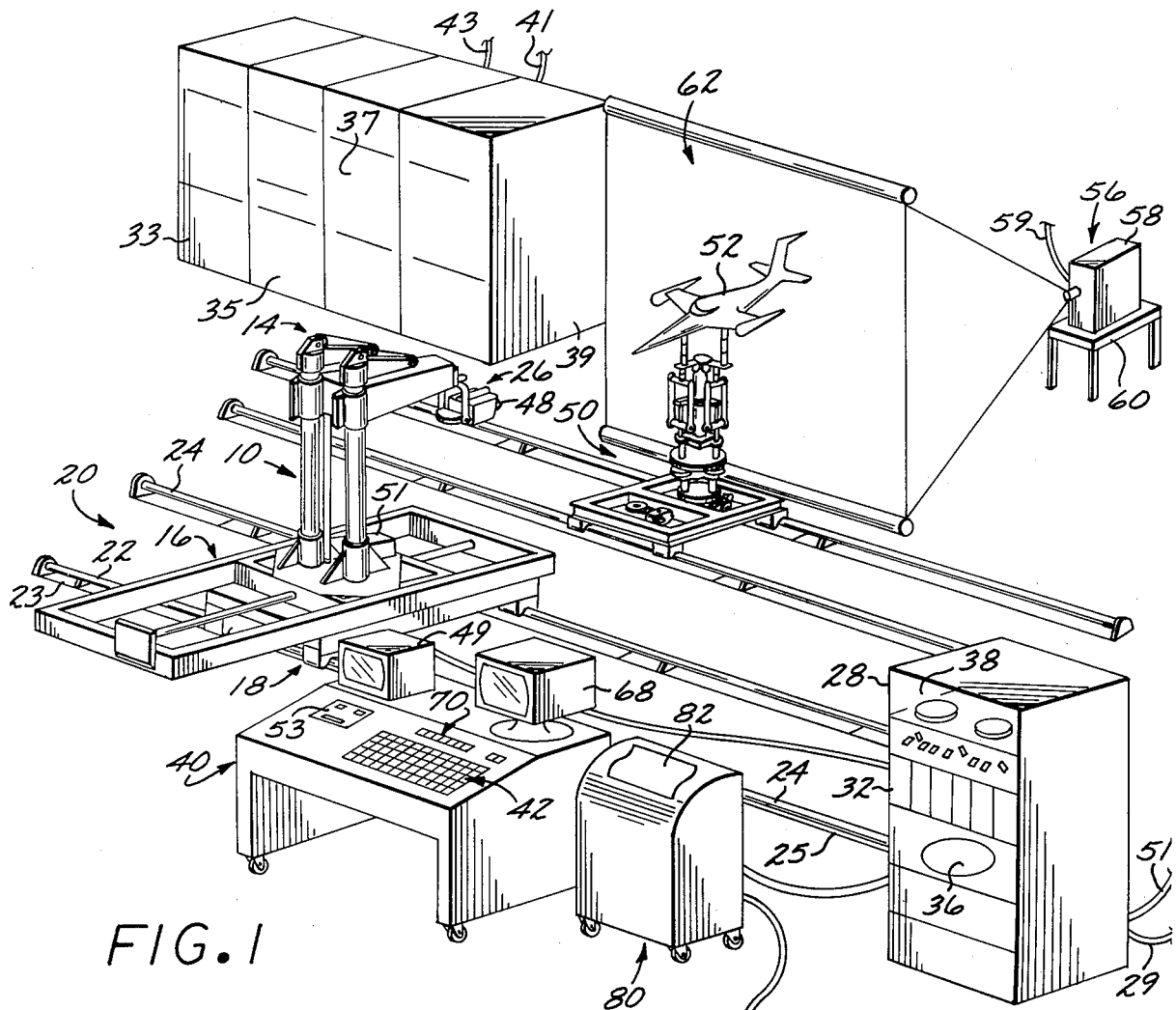
FIG. 1 is a perspective view of one embodiment of the control system of the invention.

FIG. 1 illustrates one embodiment of the automated motion picture camera control system of the invention. The invention has a camera positioning assembly 10 which includes a crane assembly 14 mounted on a carriage assembly 16, which in turn is carried upon a truck 18. The truck 18 is mounted in longitudinally reciprocal fashion upon 68 foot long tracks 20 formed of horizontally disposed space aprt rod-like rails 22 and 24 supported at spaced intervals by mounting pads 23 above longitudinally extending baseplates 25, clearly visible in FIG. 3. A motion picture camera 26 is suspended from the crane assembly 14 and is positioned and held relative to a plurality of independent position axes, as will hereinafter be described in conjunction with FIG. 3. The motion picture camera control system also includes five cabinets 28, 33, 35, 37 and 39 housing the electronic data processing equipment and connected to the camera positioning assembly 10 by cables 29, 41 and 43. The equipment in the cabinet 28 includes a cartridge disk drive 36, and a dual floppy diskette drive 38. Cabinet 33 contains a system computer 30, 64,000 word memory 34 and an expansion chassis. Cabinet 35 contains video equipment, video control equipment including the video sync generator 55 video camera control unit and system power supplies. Cabinets 37 and 39 contain an input/output adapter assembly 34, a servo control interface chassis 46, and servo drive equipment for the camera servo 44 and the model stand servos 54. A portable video tape recording unit 47 may be positioned remotely from the operator console 40, and a video monitor 49 can be located upon the operator console 40. All of the cabinets are indicated in FIG. 1 and the equipment therein is indicated diagrammatically in FIG. 2. All of the connecting cables for the system pass upward to an overhead framework as to be out of the way. If desired, the cables 29 and 51 leading to the camera positioning assembly 10 and the model stand 50 can be suspended from motorized carriages which will respectively track the movement of the camera 26 and model 52 along linear axes.

The memory 32 processes electronically encoded desired coordinates of the camera positioning assembly 10 for each of the position axes and for each of a plurality of separated and ennumerated film frames in the camera 26 associated with key camera positions and erasably stores these coordinates on the diskettes in the floppy diskette drive 38. The computer 30, with the aid of algorithm information stored on the moving head hard disk in the cartridge disk drive 36 is connected to the memory 32 to derive position coordinates for each position axis of the camera positioning assembly 10 for each film frame between the film frames of sequential key camera positions.

The motion picture camera control system of the invention is provided with an operator console 40 connected to the data processing system by a cable. From the console 40 a system operator is able to enter commands and to manually provide desired position coordinates for particular film frames. The console 40 includes an alphanumeric keyboard 42 through which the operator enters mnemonic command codes and desired coordinate information for key positions for particular film frames that are to be run through the camera 26. These film frames are designated by number within a take, which may include up to 1975 frames of film. The operator may designate axial coordinates for as many as 20 positions within the take. All of the information on each diskette is associated as a group of takes which all relate to the same scene. A hardcopy printing terminal 80 is coupled to the console 40 and used to provide paper printouts 82, of information associated with the takes and scenes.

Figure 2:
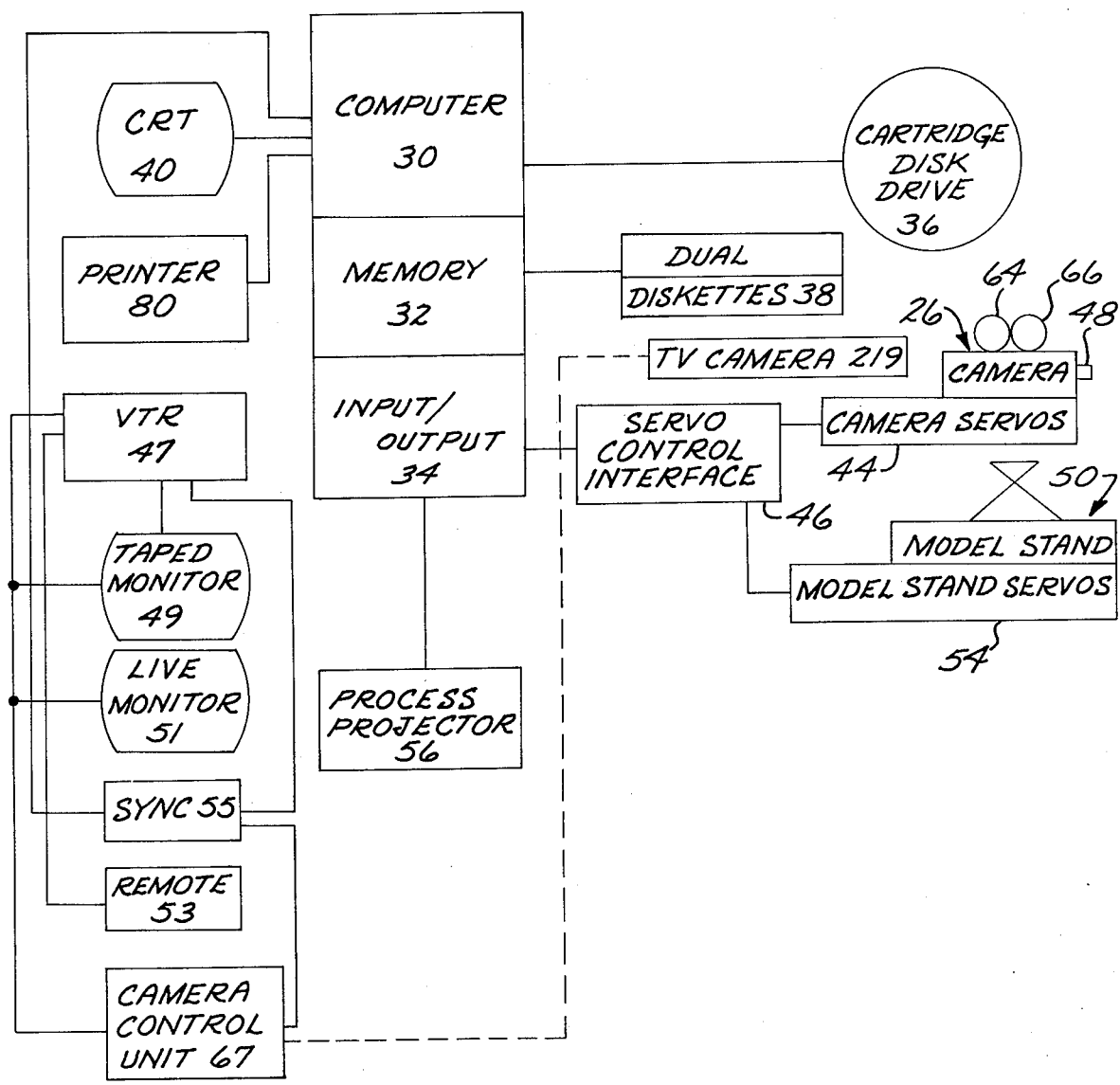
FIG. 2 is a block diagram of the major electronic components of the control system of the invention.

During rehearsals with a video camera 219 (FIG. 10) substituted for the film magazine 139, images from the camera 26 can be transmitted through a video camera control unit 67 and recorded in a video tape recorder 47, as depicted diagramatically in FIG. 2. The images may be observed on a live T.V. monitor 51 located near the camera 26 as depicted in FIGS. 1 and 2. This allows an operator to view directly the image which the camera 26 sees. Also, the video tape recorded images may be played back from the video tape recorder 47 for review on the tape monitor 49 at the operator console 40. The video tape recorder 47 may be operated by a remote set of controls 53 on the surface of the operator console 40. The tape monitor 49 may also present live images received directly from the video camera 219, during which time these images may be recorded.

Figure 6:
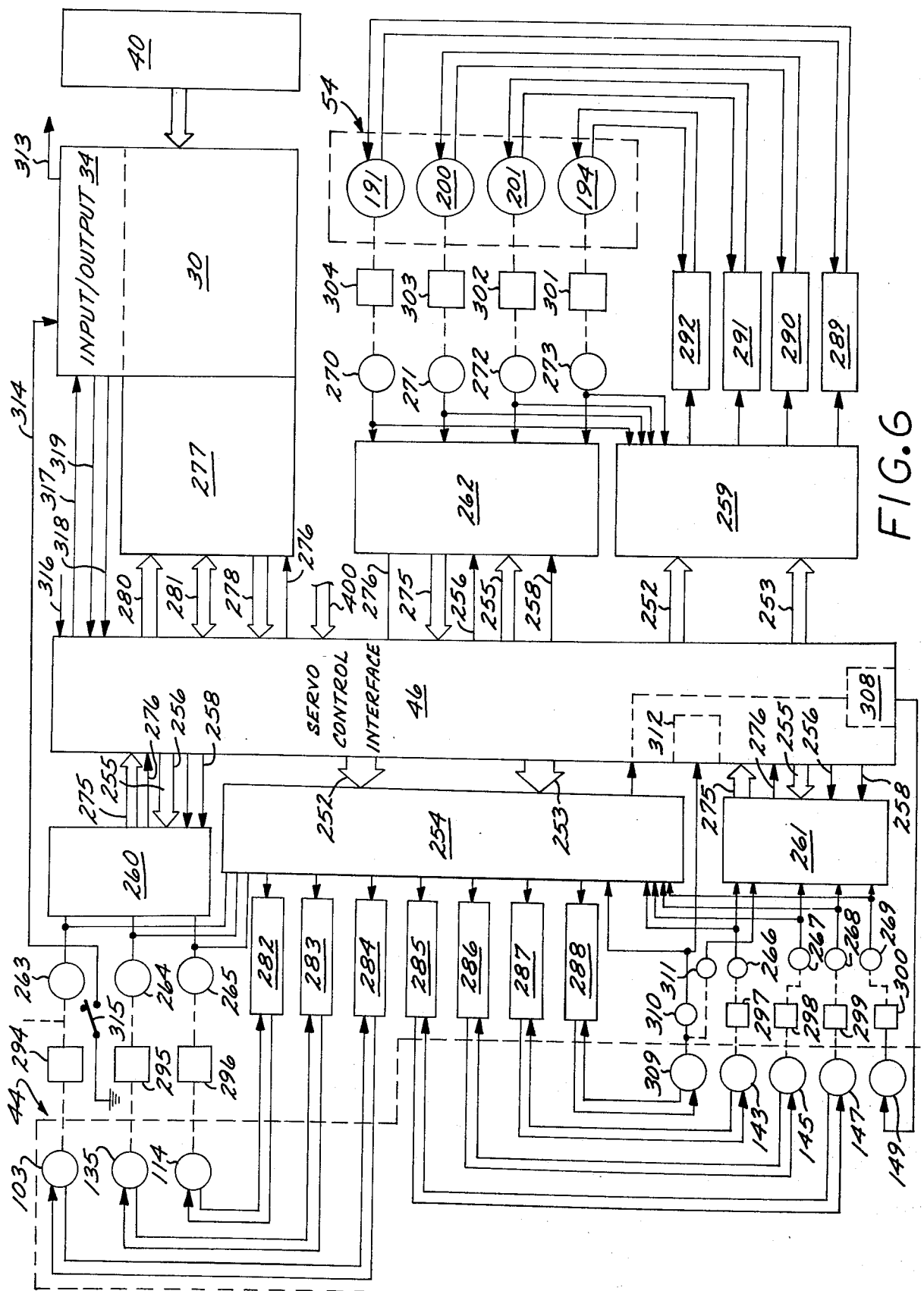
FIG. 6 is an expanded block diagram of the servo control interface 46, the camera servos 44 and the model stand servos 54 of FIG. 2.

The alphanumeric keyboard 42 and the input/output assembly 34 together serve as an actuating means to cycle the computer 30 sequentially through the intermediate film frames between sequential film frames designated by the operator from the console 40 and to couple the memory 32 and the computer 30 to camera positioning servo drives, indicated collectively at 44 in FIGS. 2 and 6, through a servo control interface transducer 46. The camera servos 44 direct the camera positioning assembly 10 to the coordinate positions associated with the sequential film frames as each frame arrives at the lens 48 of the camera 26.

The camera positioning assembly 10 can be used with or without a model stand assembly 50. The model stand assembly 50 is connected to the data processing equipment by a cable 51 and is used to position a subject within the field of view of the camera 26. For example, a model aircraft 52 is depicted as within the field of view of the camers 26 and supported upon the model stand assembly 50 as illustrated in FIG. 1. The model stand 50 is depicted in detail in FIG. 4 and is used to position and hold a subject relative to a plurality of independent position axes, hereinafter to be described.

The memory 32 of FIG. 2 processes electronically encoded desired subject coordinates of the model 52 for each of the model position axes for each of a plurality of designated film frames associated with key positions and stores this information on the floppy diskette in the dual diskette drive 38. These film frames are the same frames within a take for which coordinates of the camera positioning assembly 10 are specified by the operator at the console 40. Both the camera coordinates and the model coordinates may be entered through the keyboard 42 or input from the transducers. The computer 30 determines the model position coordinates for each frame between the sequential manually designated frames based upon algorithms stored in the hard disk in the disk drive 36. The input/output assembly 34 acts through the servo control interface 46 and model stand servo mechanisms, indicated collectively at 54 in FIGS. 2 and 6, to direct the model stand 50 to position the model 52 at the proper axial coordinates for sequential film frames. The input/output assembly 34 couples the memory 32 and the computer 30 to the servo control interface 46 for this purpose.

The camera positioning assembly 10 may be used with or without a process projector, indicated at 56 in FIGS. 1 and 2. The process projector 56 includes a motion picture projector 58 connected to the data processing equipment in the cabinet 28 by a cable 59 and mounted upon a supporting table 60 to project a motion picture image onto a transparent screen 62 which is in view of the camera 26 as depicted in FIG. 1. The motion picture projector 58 is coupled to the actuating input/output assembly 34. The input/output assembly 34 includes a synchronizing signal for advancing the images in the process projector 56 at a rate proportional to the rate of actuation of the film transport 247 for the camera 26, depicted in FIG. 10, as specified by the console operator using the keyboard 42. The film transport 247 includes a servomotor 309, depicted in FIG. 6, which is one of the drives of the camera servo mechanism 44 of FIGS. 2 and 6 and which advances and rewinds film between the reels 64 and 66 of FIG. 10.

DATA PROCESSING EQUIPMENT

In the embodiment of the invention contemplated, the computer 30 employed is preferably a NOVA 3/12 computer manufactured by Data General with two 16K and one 32K word MOS memory modules forming the memory 32 of FIG. 2. The computer 30 is equipped with a real time clock which establishes precise time intervals and keeps track of time of day and date. The computer chassis also is equipped with a hardware multiply divide unit to speed up the execution rate of computations and a memory map unit to provide access to the second 32,000 words of memory.

The hard disk in the cartridge disk drive 36 is a 2.5 megabyte unit used for program support and is the system disk for the computer 30. The operational program of the present invention resides on the disk in the cartridge disk drive 36. During computation of positional coordinate data for intermediate positions located between operator specified key positions, temporary data files are written onto and taken off the disk in the drive 36. The floppy disk at drive 38, on the other hand, is used for storage of the operator input data points for each of the separate takes that are used during the filming in process. The floppy diskettes in the diskette drive 38 provide a convenient storage medium for retaining the information on each of the takes generated throughout the day. These diskettes can be reused or recalled as needed if a certain shot is repeated.

The servo control interface 46 to the computer 30 incorporates a watch dog timer which accepts pulses from the computer 30 every 200 milliseconds. If the computer 30 fails to pulse the watch dog timer, the camera servos 44 and the model stand servos 54 are automatically brought to a stop. There is a power fail line which is used as an emergency stop for the servo motors if the computer 30 loses power. This is accomplished with a power-fail detection routine in the computer program which issues a digital command if a loss of power supply voltage is detected at the computer 30. The electronic data processing equipment of FIG. 2 including the computer 30, the memory 32, the input/output assembly 34, the cartridge disk drive 36 and the dual diskette drive 38, along with the operator console 40 and the hard copy printer 80 depicted in FIG. 1 may be ordered from Data General Corporation at 2221 Rosecrans Avenue, El Segundo, California 90245. The servo control interface 46 and other servo control equipment of FIG. 6 may be ordered from Northern Precision Laboratories, Inc. at 202 Fairfield Road, Fairfield, New Jersey 07006. Video equipment may be ordered from Sony Corporation, Conrac Corporation, at Conrac Division, 600 North Rimsdale Avenue, Covina, California 91722, and Cohu Inc., Cohu Electronics Division, Box 623, San Diego, California 92112. Complete ordering information in this regard is set forth in Appendix A.

CAMERA POSITIONING ASSEMBLY

The longitudinally extending track 20 for the camera positioning assembly 10 extends a distance of about 68 feet. The mechanical structure of the camera positioning assembly 10 is depicted in detail in FIG. 3. The truck 18 rides upon longitudinal cylindrical rails 22 and 24 that are mounted at intervals upon pads 23. The truck 18 includes a lower horizontally disposed framework 102 having corner bearing guides 104 with obtuse, arcuate concave recesses therein that secure the frame 102 to the rails 22 and 24 in longitudinally reciprocal fashion. The truck 18 is driven along the rails 22 and 24 by a servomotor 103, which is among the camera servos 44 of FIG. 2 and which is diagrammatically depicted in FIG. 6. The truck 18 also includes an upper rectangular framework 106 which is elongated in a transverse direction relative to the track 20. Within the framework 106 transverse cylindrical guide rods 108 form constraints for crosswise movement of the rectangular box-like carriage 16 in a reciprocal direction within the confines of the more elongated rectangular framework 106. Guide pads 110 at the corners of the carriage 16 mount the carriage 16 upon the guide rods 108. The carriage 16 itself is a rectangular frame-like structure that has transverse aligned threaded apertures therein to receive a worm drive shaft 112 that extends therethrough and which is mounted in bearings in the transverse edges of the framework 106. The worm drive shaft 112 is driven by a servomotor 114, which is one of the camera servomotors indicated at 44 in the block diagram of FIG. 2, and which is indicated in the expanded block diagram of FIG. 6. The servomotor 114 drives the worm shaft 112, visible in FIG. 3 in a selected direction to move the carriage 16 transversely relative to the track 20 and within the confines of the upper rectangular framework 106.

An octagonal baseplate 116 is bolted to the top of the carriage 16. The baseplate 116 and the structures it supports may be oriented relative to the carriage at any one of the four even 90 degree angles relative to the direction of the rails 22 and 24. The live T.V. monitor 55 may be positioned atop the baseplate 116 when a video camera 219 is utilized in place of the film magazine 139. A pair of tubular sockets 118, supported by bracing flanges rise vertically from the baseplate 116. A pair of upright cylindrical stanchions 120 are seated in the sockets 118 to form vertical guides for a gantry or crane 14. Atop the stanchions 120, transversely extending supporting arms 122 are connected to extend outwardly perpendicular to a horizontal line drawn through the stanchions 118 and 120. The cantilevered arms 122 carry pulleys 124 at their free extremities and pulleys 126 above the stanchions 120. A set of counter weights riding within the stanchions 120 maintains cables 128 which pass over the pulleys 124 and 126 in constant tension. The crane 14 includes a pair of tubular sleeves 130 that ride vertically along the stanchions 120. A triangular shaped cantilevered boom 132 extends outwardly from the sleeves 130 in the same direction as the supporting arms 122. The crane 14 includes a follower block (not visible) located between the tubular sleeves 130 and connected to the cantilevered boom 132. This allows a vertically disposed worm drive shaft 134, driven by a servomotor 135 (not visible in FIG. 3) comprising one of the servomotors of the servomotor group 44 of FIGS. 2 and 6 to drive the crane 14 vertically up and down the stanchions 120.

An L-shaped mounting bracket 136 extends outwardly from the cantilevered end of the boom 132 and is bolted thereto. A yoke 140 has opposing legs that extend from either side of a center swivel 142 that is rotatably mounted within the horizontal leg of the mounting bracket 136. A servomotor 143, depicted in FIG. 6, is mounted below one arm of the yoke 140, but has been omitted from FIG. 3 for the sake of clarity.

The camera 26 is balanced by a film magazine 139, during actual filming, and can be rotated about a horizontal axle 144 extending between the legs of the yoke 140. A servomotor 145, indicated in FIG. 6 and among those indicated at 44 in FIGS. 2 and 6, is carried with the camera 26, and is used to drive the camera in rotation about the axle 144. The camera 26 is additionally mounted about another horizontal axle perpendicular to the axle 144. A servomotor 147 (FIG. 6) drives the camera 26 about this roll axis.

The camera 26 includes a lens assembly 48, illustrated in section in FIG. 10. FIG. 10 depicts the relative positions of the film 229, the film transport, indicated generally at 247, and the lens assembly 48. The position of a T.V. camera 219 is also indicated in phantom lines. The T.V. camera 219 can be positioned in place of the film magazine 139, and is quite useful for recording video tape images during rehearsals.

The lens assembly 48 has a generally cylindrical barrel 221 that can be driven in angular rotation to carry a focal lens 223 toward and away from the plane 199 of the film 229 within the camera 26 under the control of a servomotor 149, indicated in FIG. 6. The film is driven by a transport servomotor 149, which turns mechanical sprockets 241 that engage the spaced edge perforations in the film 229. The film transport 247 is removable and interchangeable with other transports so that the system will accomodate either 4 or 8 perforation film. The film 229 is driven past transport sprockets 241 from a supply reel 64 to a take up reel 66. The reciprocal movement of the camera lens 223 relative to a threaded barrel mount 251 varies the focus of the camera lens 223 and is used to properly focus the camera upon the subject of interest. With the film magazine 139 and video camera 219 removed a boresight (not shown) is used to allow physical observation of an approximation of the camera field of view, if desired.

Figure 3:
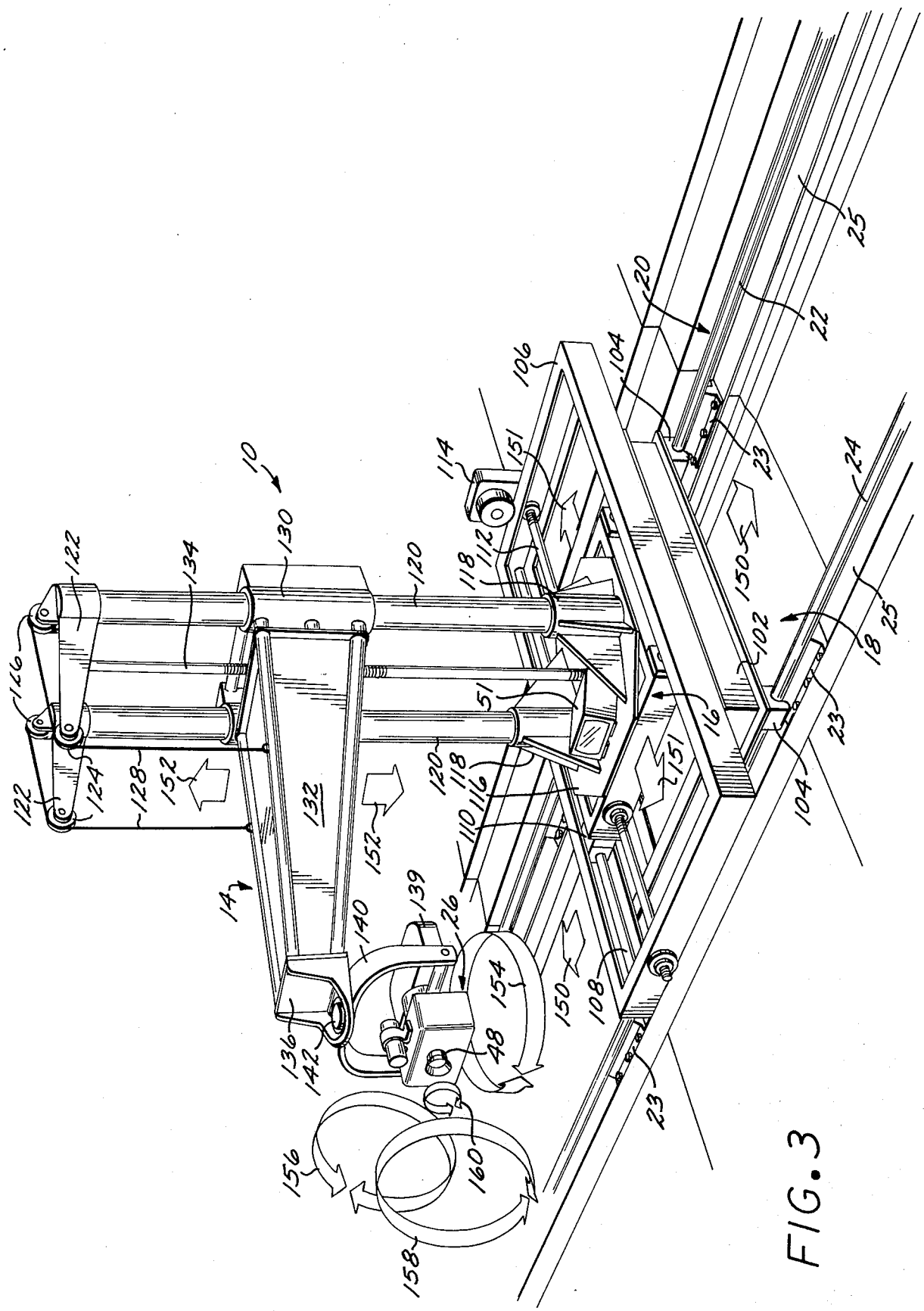
FIG. 3 is a perspective view of the camera positioning control assembly.

From FIG. 3 it can be seen that the camera positioning assembly 10 includes separate servo devices for moving the motion picture camera 26 along seven different axes. Specifically, the truck 18 effectuates motion along a truck axis in one of two opposite directions indicated by the directional arrows 150. The carriage 16 is driven along an east/west axis indicated by the directional arrows 151. This axis is likewise a horizontal axis, but is perpendicular to the truck axis. The crane 14 is driven along a north/south axis in either of two opposite vertical directions, indicated by the directional arrows 152, to raise or lower the boom 132 to vary the elevational height of the camera 26. The yoke 140 is driven in rotation about a vertical axis at the swivel 142 to effectuate a panning motion of the camera 26, indicated by the directional indicia 154. The camera 26 can likewise be driven in rotation about the horizontal axis 144 to effectuate a tilting movement, indicated by the directional indicia 156. Similarly, the camera 26 can be driven in rotation about an axis perpendicular to the axle 144 to effectuate a rolling motion, indicated by the directional indicia 158. Finally, the focus of the lens assembly 48 can be altered by movement of the lens barrel in the manner indicated by the directional indicia 160.

In all, the camera servomotors indicated collectively at 44 in FIGS. 2 and 6 drive the camera along seven distinct and independent axes of movement. The precise positions of the relatively movable mechanical parts along each of these axes are translated by resolvers into position feedback signals from the camera servomechanisms to the servo control interface 46 of FIG. 2 as positional coordinates. The resolvers are furnished with a.c. signals. From these signals, the resolvers return the sine and cosine of the input reference signal displaced in time as a function of the angle that the motor shaft associated therewith has turned through. By measuring the phase relationship of the resolver signals, the servo control interface 46 can determine the position of the camera 26 relative to the axis associated therewith. The coordinates along the truck axis, the east/west axis and the north/south axis are represented as coordinate distances from a predetermined reference location. The coordinates relative to the pan, tilt, roll and focal axes are indicated as distances of angular rotation in degrees. All of these positional coordinates are digitally encoded by the servocontrol interface 46 for processing by the computer 30.

MODEL STAND POSITIONING MECHANISM

The model 52 of FIG. 1 is controlled for movement along axes corresponding to some of the axes of movement of the camera 26. The model stand 50 is depicted without the model 52 in FIG. 4, and includes a truck 170 formed of a generally rectangular horizontally disposed framework with longitudinally extending intermediate supporting beams disposed therewithin. Like the truck 18 of the camera positioning control 10, the model truck 170 has corner support guides 172 with upwardly facing concave recesses. The truck 170 is longitudinally reciprocal along cylindrical rods forming rails 174 mounted by inverted T-shaped mounting pads 176 upon a mobilized ladder shaped track bed 177 having longitudinally extending stringers 178 and transverse ties 180. The track bed 177 is mounted for mobile movement upon several casters 182 attached to L-shaped angle mounts 184 that are welded to the outsides of the stringers 178. In this way, the entire track bed 177 can be moved into the proximity of the camera track 20 at a spaced disposition therefrom, or removed from the vicinity entirely if a model 52 is not to be used in conjunction with the camera control system of the invention. When the track bed 177 is moved into position, it is secured by the vertical adjustment of feet 186, also connected to the angle mounts 184. The feet 186 are equipped with footpads 188. The footpads 188 are biased to an up position by a spring (not visible) and held in a down position by a latch. When the pads 188 are lowered, they raise the casters 182 from the rolling surface to thereby immobilize the track bed 177.

The truck 170 is driven longitudinally along the rails 174 by means of a servomotor 191, which forms one of the model stand servos indicated collectively at 54 in FIGS. 2 and 6. The model stand 50 also includes a mounting disk 192 which is rotatable about a vertical axis by means of a servomotor 194. An upright center pole 193 extends from the mounting disk 192 and carries a servomotor mounting platform 195 spaced above the mounting disk 192. The center pole 193 extends upward and terminates in outwardly directed angle brackets 196 and 198, both extending outward and rotatably mounted for movement in vertical planes located at right angles to each other.

Servomotors 200 and 202 are arranged with vertically disposed drive shafts and are attached to the underside of the mounting platform 195 at locations disposed radially outward from the centerpost 193 and 90° offset from each other in a horizontal plane. The servomotor 200 drives a worm drive 204 and the servomotor 202 drives a vertically disposed worm drive 206. Follower blocks 208 and 210 are respectively associated with the worm drives 204 and 206 and respectively transmit vertical motion to upwardly directed yokes 212 and 214. The yokes 212 and 214 pivotally raise and lower the angle brackets 196 and 198 respectively which are hinged to the centerpost 193.

The servomotors 191, 194, 200, and 202 together comprise the model stand servos indicated at 54 in FIGS. 2 and 6. The servomotor 191 drives the truck longitudinally along the linear model truck axis indicated by the directional arrows 218 in FIG. 4. The servomotor 194 drives the mounting disk 192 through a worm drive in horizontal rotation to produce a model yaw, indicated by the directional indicia 220. The servomotor 202 moves the model angle bracket 198 in rotation about the upper extremity of the centerpost 192 to drive the model about a model roll axis in the direction indicated by the directional arrows 222. The servomotor 200 rotates the angle bracket 196 about the upper extremity of the centerpost 193 to produce motion along a model pitch axis, as indicated by the directional indicia 224. The model is directly mounted to the angle brackets 196 and 198.

Movement of the model 52 about the several axes of motion is transmitted by separate position transducers associated with each servomotor. Movement along the model truck axis 218 is digitally encoded as distance from a fixed reference point along the rails 174. The rotational movement about the model jaw axis, the model roll axis and the model pitch axis is also digitally encoded.

Movement of the camera 26 and the model 52 in all axes is highly precise. The repeatability of movement along all linear axes is 1/100th of an inch, and the repeatability of movement about all rotational axes is 1/100th of a degree. This precision is especially important in very close up work where very small movements of the camera 26 relative to the model 52 translate into very large screen movements. If the model 52 is to appear to be moving at a fixed rate of speed, this rate can be very carefully controlled in 1/100ths of an inch increments using the system of the invention. Perhaps the most significant benefit of this true repeatability is its utility to allow double or any multiplicity of exposures on the same original negative during first generation filming.

SERVO DEVICE CONTROL

The servo control interface 46, the camera servos 44 and the model stand servos 54 are indicated diagrammatically in FIG. 6. The servo control interface 46 provides command data, indicated at 252, and channel strobe signals, indicated at 253, to a position controller 254, having eight active channels, and to a position controller 259 having four active channels. The servo control interface 46 also provides address information, indicated 255, as well as scan clock signals 256 and strobe signals 258 to transducer converters 260, 261 and 262. Transducers 263–273 are provided to furnish the resolver feedback signals. Each of these transducers contains a fine and a coarse resolver. The coarse resolvers of each of the transducers 263–273 are geared at a ratio 1:32, to the fine resolvers. The ratio of resolver gear to input shaft is variable dependent on axis length and selected resolution. Each transducer 263–273 furnishes four signals to the transducer converter associated therewith; the sine and cosine of both the fine and the coarse resolvers. This provides the transducer converters 260–262 with both fine and coarse positional information.

The position controllers 254 and 259 convert the analog positional signal information from the transducers 263–273 to sixteen bit parallel words, which are transmitted to the system interface control 46, and which are indicated at 275. An end of conversion signal is also transmitted and is indicated at 276. The servo control interface 46 receives from the computer 30, through servo control interface circuitry 277, sixteen bit command position data words indicated at 278. Actual position data words 280, derived from the transducers 263-273, are transmitted to the servo control interface circuitry 277 from the servo control interface 46. Address and control input/output words are transmitted between the servo control interface circuitry 277 and the servo control interface 46, as indicated at 281.

The address words 281 transmitted to the servo control interface 46 select a particular channel of output, associated with one of the camera control or model stand axes, including the film transport axis and the focus axis. The servo control interface 46 compares the actual position data 275 with the command position data 278 to which the addressed servo motor is commanded. If the servo is at the proper position, the command data output 252 is zero, since the servo has been nulled. If there is a difference, however, the command data 252 operates the appropriate one of the servo amplifier drivers 282-292 to drive the associated servo motor to the position specified. The servo motors 103, 135, 114, 143, 145, 147, 149, 191-200, 202 and 194 physically move the camera control assembly 10 and model stand 50 along the axes and in the manner previously described through associated gear reducers 294-304. Each of the servo mortors includes a return tachometer signal to its associated drive amplifier to give smooth speed control under varying load conditions.

The signals transmitted to the servo amplifiers 282-292 is a d.c. voltage of between 0 and 15 volts, derived from the command data information 252. The voltage transmitted to the drivers 282-292 may be either a positive or negative voltage, and is proportional to the error between the actual position indicated by the data 275 and the desired position indicated by the data 252.

In operating the servo motors according to the invention, a five bit address word 255 is sent from the servo control interface circuitry 277 to the system interface control 46. The particular address selects a channel to determine which of the servo motors among the camera servos 44 and model stand servos 54 are to be activated. The system interface control 46 then either directs a command position data word 252 to the appropriate position controller 254 or 259, or it receives actual position data 275 from one of the transducer converters 260, 261 or 262. The transducer converters 260, 261 and 262 each have six channels multiplexed to produce position output data 275. Only three of the six channels are employed in the transducer converter 260, while there are five active channels in the transducer converter 261 and four active channels in the transducer converter 262. The address data 255 from the system interface control 46 determines which of the channels is selected.

Once the data from the transducer 263-273 associated with the addressed channel has stabilized, the transducer converter 260, 261 or 262 signals an end of conversion code 276 to the system interface control 46. This indicates that the position data has been converted, and is no longer changing. The system interface control 46 then transmits a strobe signal 258 to the transducer converter 260, 261 or 262, which in turn responds by transmitting an axial co-ordinate, which is a sixteen bit position data word 275.

The input/output assembly 34 is coupled to the computer 30 and includes outputs indicated collectively at 313 for performing such tasks as operating an electrical solenoid to close a mechanical shutter to optically shield the lens assembly 48 while film is being rewound. This typically occurs during double exposure sequences in filming special effects. Likewise, the input/output assembly 34 receives signals from switches in the camera 26 that indicate a broken film condition, no film magazine in the camera, and so forth. The computer 30 responds to such signals by displaying a message on the CRT 68 in the operator console 40 to alert the operator to the inproper condition. Similarly, the input/output assembly 34 indicates to the computer 30 whether or not the television camera 219 is installed or whether the film magazine 139 is correctly in position. Any mismatch between the film transport 247 and the film magazine 139 is also detected by signals to the input/output assembly 34. That is, an unacceptable condition will be detected, for example, where a four perforation film magazine 139 has been coupled to an eight perforation film transport 247.

One further input to the input/output assembly 34 is on line 314 which leads from a switch 315. This is a mechanical switch associated with movement of the truck 18 along the rails 22 and 24. The switch 315 is necessary only to expand by one bit the resolution of position along the truck axis. The switch 315 is located midway along the track 20. Movement of the truck 18 past the switch 315 in one direction opens the switch, while movement of the truck 18 in the opposite direction closes the switch.

Some of the servo mechanisms are slightly different from the others. The focus drive includes a servo motor 149, and a position transducer 269. The focus servo amplifier is not a separate drive unit, however, but instead is performed internally within the servo control interface 46, and is indicated diagrammatically at 308. The servo motor 309, which drives the mechanical sprocket 235 in FIG. 10, operates through two transducers 310 and 311. Every time the sprocket 235 completes a rotation to position a new frame immediately behind the lens 223 of the lens assembly 48, the transducer 310 will indicate a complete cycle of 360° to the position controller 254. That is, for every film frame, the transducer 310 generates a signal. The transducer 311, on the other hand, is coupled to the transport drive servo motor 310 and provides a signal as to which frame is directly behind the lens 223. This frame number is used and may be designated by a console operator from the operator console 40 to designate key positions for the camera 26. The transducer 311 is therefore not used to effectuate any position control, but rather is used to maintain a record of the actual film frame position. This record is maintained internally in the system interface control 46, as indicated at 312. The transducer 311 therefore signals the identity of the film frame passing through the lens plane 231 in FIG. 10, while the transducer 310 signals where the system is in the 360° cyclic transition between sequential film frames.

In order to provide a means for indexing the film frame number to coordinate the number of the film frame with a number assigned by the computer 30 without physically encoding the film, a computer program subroutine is provided which sets the frame number of the film to zero each time the connection of the film magazine 139 is altered. This program command rewinds the film transport 247 until the transducer 311 indicates a zero count, which is the index film frame number. When new film is inserted into the camera, the film frame encountered is necessarily designated as an index film frame number 0. Thereafter, the transducer 311 provides a signal to the computer 30 for each film frame through which the film transport 247 cycles. The transducer 311 provides counts to count up to a maximum of about 6400 frames. Consequently, the film magazine 139 is limited in size to accomodate film reels of no more than 6400 film frames.

The servo control interface 46 also includes a number of manually operated emergency stop remote power brake switches which provide emergency inputs indicated collectively at 316 in FIG. 6. The system interface control 46 cyclically examines the state of the emergency stop switch signal lines 316. If the status shows operation of any of the emergency switches, power is automatically cut off to the servo drives 282-292. Once an emergency stop condition is detected, the servo control interface 46 transmits an emergency stop signal on line 317 to the computer 30. The computer 30 in turn generates a display on the CRT 68 in the operator console 40 to inform the console operator of the emergency stop condition.

In order to reset the emergency switch condition, the console operator must type in a reset command (RS) on the keyboard 42. The computer 30 in turn operates the system interface control 46 to interrogate all of the position transducers 263-273 to determine the axial coordinate along each position axis. These signals are transmitted as position data signals 275 in the manner previously described. The system interface control 46 then commands the camera servos 44 and model stand servos 54 to go to the positions which were just read. This is necessary because even though the emergency stop signal on line 316 turned off power to the servo drives 282-292, the enertia of movement could well cause actual return movement of the camera truck 18, carriage 16, and other parts of the system once the system has been reset. As a consequence, once the emergency condition has terminated, the system would otherwise attempt to drive the servo motors to return to the position coordinates at which power was shut off. This is undesirable since it would create movement immediately upon termination of the emergency condition. By providing the actual position information as the desired axial coordinates before an emergency stop reset signal is transmitted from the input/output assembly 34 to the servo interface control 46 on line 318, abrupt movements of this type are avoided. The emergency stop reset signal 318 occurs a full second after the transducers 263-273 have been read and their coordinates transmitted to the servo drives 282-292.

A further safety feature of the invention is a watchdog timer signal transmitted from the input/output assembly 34 to the system interface control 46 on line 319. This pulse toggles a flip-flop in the servo control interface 46 to change its state. State reversal occurs every 200 milliseconds. The system interface control 46 is programmed to look for a change of bit state at least once a second. If such a state change does not occur, the servo control interface 46 will shut off power to the servo drives 282-292. In this way, the servo control devices are automatically disabled whenever power to the computer 30 is shut off or the computer 30 ceases to function for any reason.

One further emergency stop procedure which is employed involves an a.c. current detector which detects the existence of a.c. power to the computer 30. The computer 30 examines the status of this detector, and if it notes the absence of a.c. power for several milliseconds, it is informed that it will very shortly lose power. The computer 30 is quickly transferred into a short subroutine which, in about 10 microseconds, institutes an emergency stop condition analogous to the appearance of a signal on one of the manual input lines 316. By automatically instituting an emergency stop procedure immediately upon an indication of a power loss, the liklihood of damage to an extremely expensive camera 26 and model 52 is further minimized. Such failure is indicated by an illuminated push button switch and must be manually reset before normal system operations is reinitiated.

SERVO CONTROL INTERFACE CIRCUITRY

The servo control interface circuitry 277 in FIG. 6 is a customized interface circuit card that allows compatible communication between the computer 30 and the servo control interface 46. Through the circuit 277 the computer 30 and the servo control interface 46 transfer data and timing signals to each other. The computer 30 reads the position data 280 from the servo control interface 46 as of the latest conversion of any channel, and writes new positioning data 278 to any channel. The last converted channel as indicated by one of the transducers 263-273 and provided by the servo control interface 46, is ready to be read by the computer 30 when that particular channel has completed a conversion. In addition, the computer 30 can select a single channel convert mode where only a particular channel selected can cause the generation of an end of conversion signal 276. This selection is under the control of the program of Appendix C.

Figure 7:
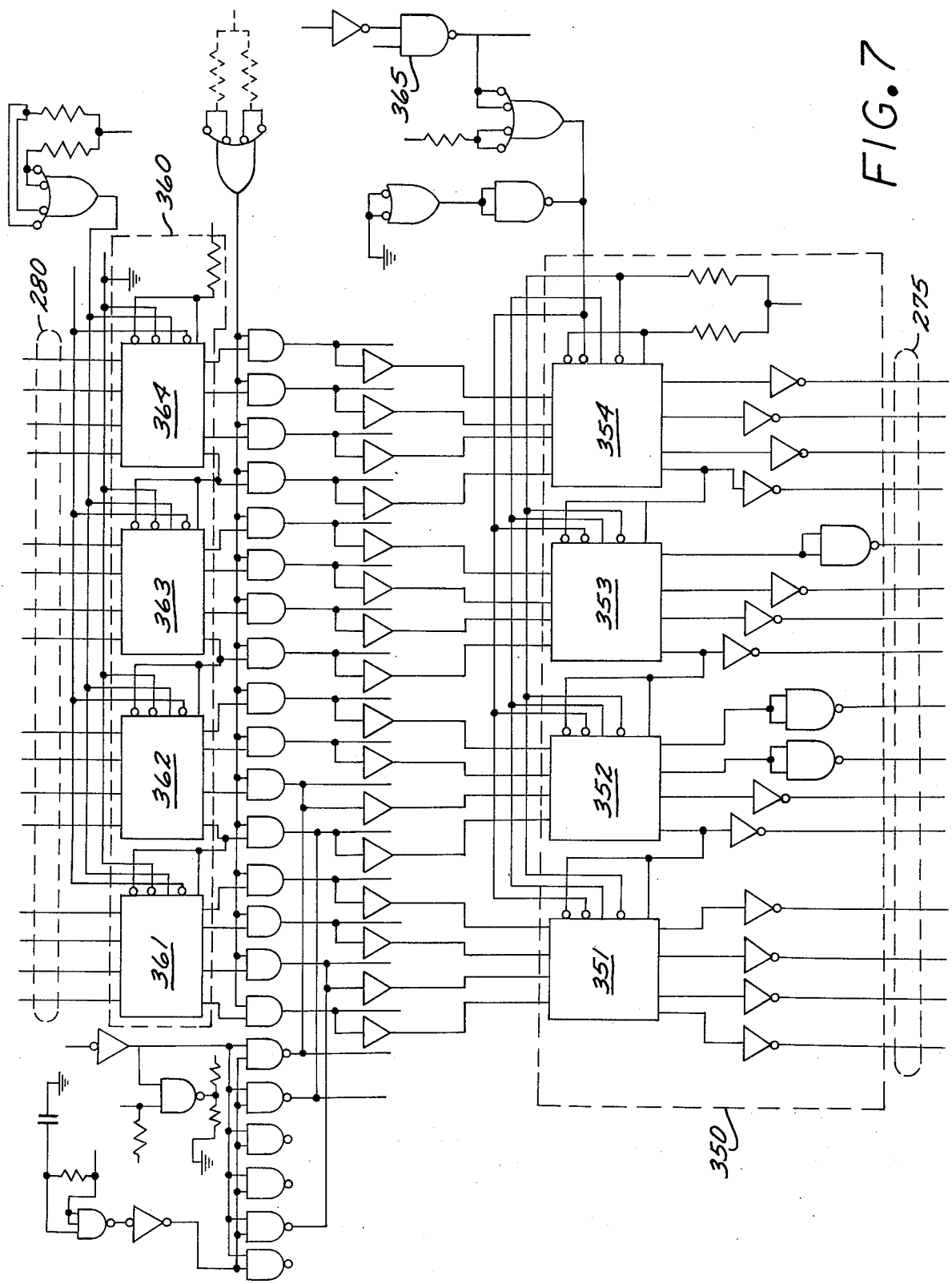
Figure 8:
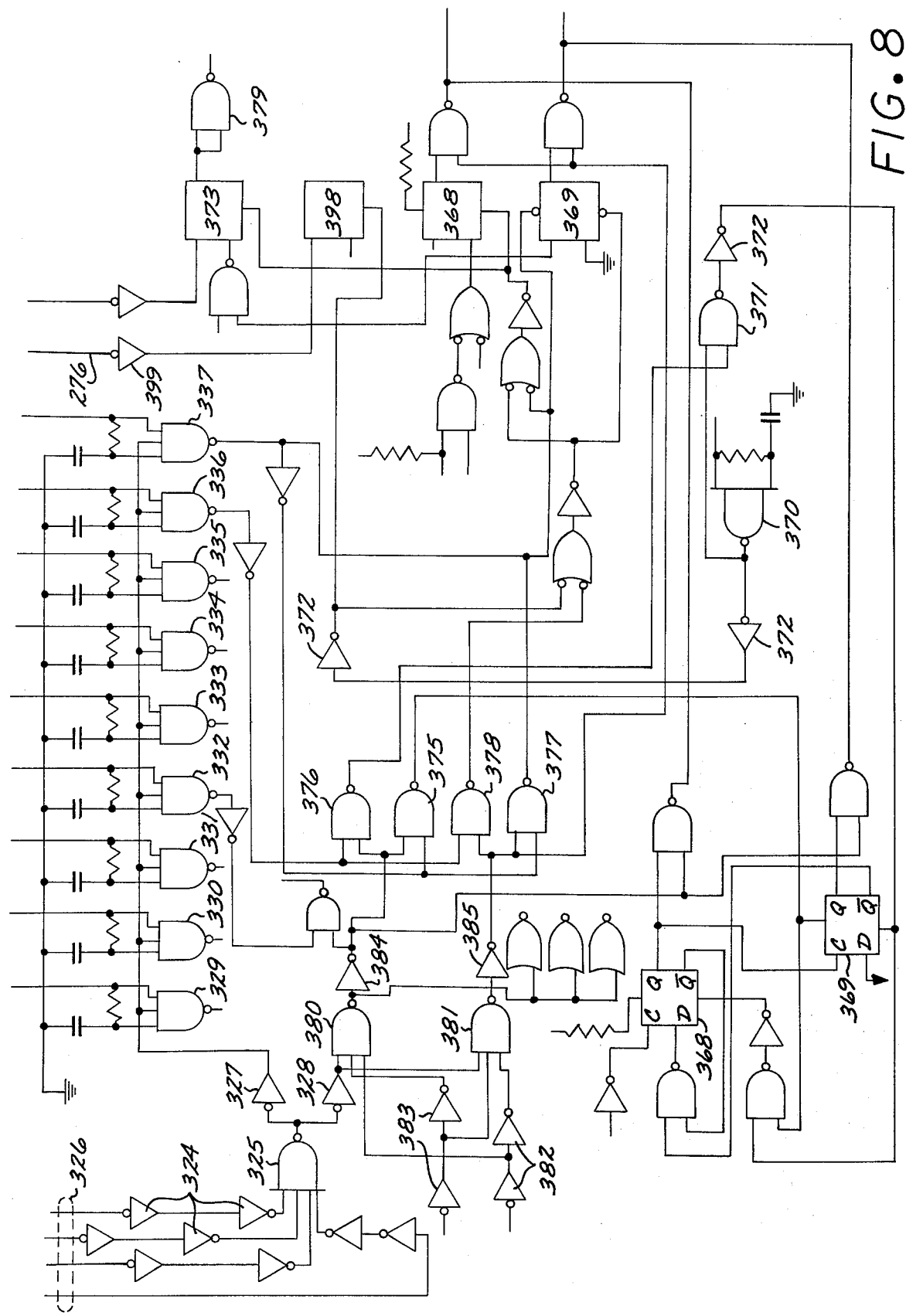

The servo control interface circuitry 277 of FIG. 6 is illustrated in detail in FIGS. 7, 8 and 9. The circuitry 277 uses one input/output slot in the chasis of the computer 30 and is under programmed control by the use of two special device codes. These special device codes are derived from inputs to a common device decoding network, applicable to both special device codes and formed by inverters 324 and a NAND gate 325 on lines from the computer 30 indicated collectively at 326 in FIG. 8. The output of AND gate 325 is divided into paths through inverters 327 and 328.

The inverter 328 is connected to a pair of NAND gates 380 and 381, which are respectively alternatively, gated shut by special device select signals on separate lines acting through inverters 382 and 383. The outputs of NAND gates 380 and 381 are respectively through inverters 384 and 385 to gate NAND gate pairs 375-376 and 377-378. Activation of NAND gates 375-376 corresponds to selection of the special device code associated with that portion of the circuitry directing data from the computer 30 to the system control interface 46. Activation of the NAND gates 377-378 corresponds to the special device code associated with that portion of the circuitry directing data from the system control interface 46 to the computer 30.

The output of inverter 327 is directed to an AND gate array including AND gates 329-337 to gate out position data for transfer to and from a selected channel in the servo control interface 46. The address of a channel to which positional information is to be transferred from the computer 30 to the system control interface 46 is held in a pair of shift registers 339 and 340, depicted in FIG. 9. The shift registers 339 and 340 provide the five bit channel identification code designated by the computer 30 to the system control interface 46. When data is traveling in the opposite direction, the address identification of the channel last read which contains updating information from one of the transducers 263-273 of FIG. 6 is held in the shift registers 341 and 342 of FIG. 9. This address is likewise a five bit code and is transmitted to the computer 30 through NAND gates 343-347, as illustrated in FIG. 9. These NAND gates require an enabling signal from NOR gate 349 to indicate that the positional data for the address has been received in its entirety.

A sixteen bit data output register 350 is depicted in FIG. 7 and is formed of four four-bit shift registers 351-354 connected with outputs to inverters and NAND gates as illustrated. The outputs of the data output register 350 represent the position coordinate to which the selected servo motor addressed by the output address shift registers 339 and 340 is to move. The sixteen output bits are collectively designated at 275 in FIGS. 6 and 7. To strobe data out of the output register 350 a data out signal is provided by the NAND gate 365 in FIG. 7.

Similarly, an input data register 360 is comprised of four four-bit shift registers 361-364 to receive inputs 280 from the servo control interface 46. These inputs represent the positional value to which a selected servo motor addressed by the data address input shift registers 341 and 342 of FIG. 9 is to move.

Busy/Done logic is required to specify the ready state of the input data register 360. It is not necessary to check Busy/Done status when performing output data instruction. The Busy/Done logic checks are performed with respect to the device selection outputs from NAND gates 375-378 in FIG. 8. A Done signal appears at the Q output line of CD flip-flops 368. A Busy signal appears at the Q output of CD flip-flops 369 in FIG. 8. Since read and write instructions may not be delayed or controlled by the servo motor and transducer equipment, special care must be taken when one of these instructions arrives during conversion of the current channel. On input, the old position value in the input data register 260 must be dispatched to the computer 30 if the new position information is not ready. On output, the new value stored in the output data register 350 may take effect on the next conversion if it cannot be used on the current one. In no case should an intermediate or invalid value be returned on input or converted on output.

A timing of conversions is communicated to the computer 30 by means of the Busy/Done flags appearing at the outputs of flip-flops 368 and 369 in FIG. 8. When power is initially applied these flip-flops are cleared by a reset signal from NAND gate 370, NAND gate 371 and inverters 372. A start pulse from either NAND gate 375 or NAND gate 378 appears on any input or output command addressed to the system control interface 46. The start pulse sets the associated Busy flip-flop 369 and clears the associated Done flip-flop 368. A clear pulse from either NAND gate 376 or NAND gate 378 clears the associated Busy flip-flop 369 and the Done flip-flop 368. If the Busy flip-flop 369 is set and a conversion occurs on any channel, the Busy flip-flop 369 is cleared and the Done flip-flop 368 is set. If the Busy flip-flop 369 is not set, than a conversion does not effect either the Busy flip-flop 369 or the Done flip-flop 368. When the Busy flip-flop 369 is cleared and the Done flip-flop 368 is set as a result of a conversion, an interrupt is requested at the output of NAND gate 379 by interrupt request flip-flop 373. An interrupt disable signal will be generated by the flip-flop 398 until an end of conversion code 276 is received by inverter 399. The transition from Busy to Done is triggered by a conversion on any channel, not just the current channel. The computer 30 can read the number of the channel which was converted most recently from the input address shift registers 341 and 342. When multiple conversions have occured, the lowest number channel converted will set the Done flip-flop 368 and drop the Busy flip-flop 369 causing an interrupt. When the Done flip-flop 368 is again cleared, the next sequential channel that has finished a conversion will set the Done flip-flop 368 and so forth.

OPERATOR CONSOLE

The operator console 40, as previously noted, includes a conventional aphanumeric keyboard 42. This keyboard 42 is laid out as a standard typewriter keyboard. Above and behind the keyboard 42 there is a CRT screen 68. This CRT is used to display alphanumeric information, such as slating information, position coordinates of the camera positioning control 10, position coordinates of the model stand control 50, and other information. Another live video monitor 51 (FIG. 2) may be utilized to observe an image as it is transmitted from a video television camera 219 which may be physically attached to the camera 26 in place of the magazine 139 in the yoke 140, in FIG. 3, in the manner illustrated in FIG. 10. The television camera 219 receives images through the lens assembly 48 associated with the camera 26 to produce a visual image on the CRT of the field of view of the camera lens assembly 48 of the camera 26. This allows an operator to observe the image that will be recorded on film, once the film magazine 139 is repositioned as in FIG. 3, with the camera 26 and model 52 at any position coordinates. Another monitor 49 may be connected to the video tape recorder 47 and located at the operator console 40 to replay images captured on video tape. This capability allows the console operator to verify and adjust camera and model positioning from a single location, without the necessity of peering through a pilot lens at the location of the camera 26. This drastically shortens the amount of time required to ensure proper camera and model orientation, and prevents the occurrence of any inadvertent movement of the camera 26 from operator contact. Also, the use of video tape allows squences to be cut together from takes recorded earlier. The video monitor 49 may also be used to view live video images as they are transmitted from the video camera 219.

Direct observation of the camera field of view may be achieved using a television camera 219 attached to the camera 26. The camera 26 can be used alternatively with interchangeable film transports 247. A four perforation transport 247 may be used in association with conventional 35 millimeter film. Alternatively, an eight perforation transport can be substituted to accomodate double frame 35 millimeter film, the projection of which is known in the trade as Vistavision. The backing plate 253 of the film transport 247 may be removed and a field lens installed to provide an image for a television camera 219 may be attached in place thereof. The television camera field lens thereby lies in the film plane 231 so that it transmits to the television camera exactly the same image as would frames of the film 253 through the lens assembly 48.

The image received through the lens 48 will typically be distorted, since anamorphic lenses are conventionally used in 35 millimeter cameras for motion picture photography. That is, the lens 223 will typically be an anamorphic lens that will produce a distorted image in the film plane 199, with vertical distances exaggerated so that distorted tall, slender images are projected onto the film plane 199. The video control equipment 35 receives the distorted video information and electronically performs corrections to remove the distortions. The system thereby performs electronically the necessary corrections to achieve the proper aspect ratio for an image displayed on the video monitors 49 and 51. Such corrections are optically performed in motion picture projection in theater houses by projecting the film through a lens identical to the camera lens 233, but rotated 90° from the disposition of the lens 223 in the camera 26. Utilizing the electronic corrections, the images appearing on the video monitors 49 and 51 are not distorted, and circles actually appear as true circles, rather than in the eliptical form in which they are projected by the lens 223 onto the film plane 199.

The T.V. camera 219 is equipped with a fully automatic iris and is a self-contained unit and includes the necessary flanges for attachment directly to the backside of the film transport 247. The T.V. camera 219 does not require focusing or changing of the view finder by the console operator, and produces an image on the video monitors 49 and 51 which is the same as the console operator would see looking directly into the back of the film transport 247 at the film plane 199, corrected for aspect ratio distortion as described. A video tape recorder 47 is connected to the T.V. camera 219 and may be operated from remote controls 53 at the operator console 40 to receive images from the camera 26 when the T.V. camera 219 is fixed in position. In this way the console operator can replay the observed images transmitted from the camera 26 to the television monitor 49 once a rehearsal has been completed.

Figure 5:
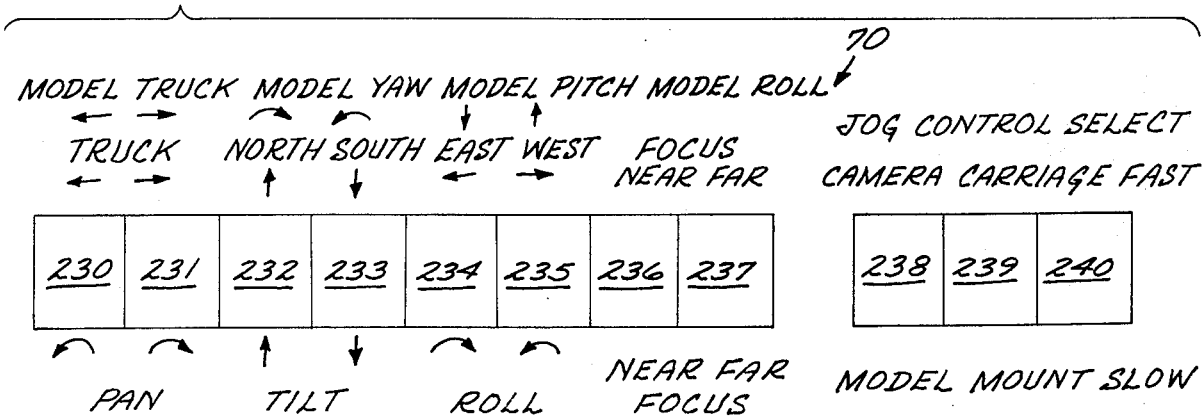
FIG. 5 is a detail view of the camera and model movement controls.

A jogging control panel 70 is also included as a unit with the keyboard 42 in the operator console 40 and is depicted in detail in FIG. 5. The jogging controls are a series of buttons, which allow the console operator to signal the camera positioning assembly 10 or the model stand 50 to move the camera 26 or model 52 in a precise manner.

HARD COPY TERMINAL

The motion picture camera control system of the invention also employs a hard copy terminal indicated at 80 in FIG. 1. This hard copy terminal is utilized to produce a paper copy of alphanumeric images that appear on the CRT 68. The paper copy emerging from the hard copy terminal 80 is indicated at 82 in FIG. 1.

The operator is able to list on the hard copy terminal 80 all takes, when (and if) they were shot, the sequence of positions for any take, and other selected items of information.

POSITION COORDINATE CONTROL

The console operator may manually provide axial coordinates to the system for any designated axis in either of two ways. The axial coordinates for a specified film frame may be entered through the alphanumeric keyboard 42. Alternatively, the camera positioning assembly 10 may be manipulated to position the camera 26 by "jogging" to the desired position utilizing the button controls of the jogging control panel 70 depicted in FIG. 5. The jogging control panel 70 consists of eight movement control keys, numbered 230 through 237 and three function select keys, numbered 238–240 in FIG. 5. The movement control keys 230–237 are grouped into four groups of two keys each. Each group of two keys has three different functions. Each pair of keys, such as the pair comprised of keys 230 and 231, manipulates the camera positioning assembly 10 or the model stand 50 to alter the coordinates on a selected axis of either the camera positioning control 10 or the model stand 50. The axes which may be selected are indicated for each pair of key controls on labels on the keyboard 70 in the manner depicted in FIG. 5. Each pair of movement control keys has three alternative types of movement control, two of which are labelled above each pair of keys and one of which is labelled below, in the manner depicted in FIG. 5.

The top row of labels in the jogging control 70 for the movement control keys 230–237 indicates the controls for the model stand axes. For example, the keys 232 and 233 control model yaw in the directions indicated in FIG. 5 when the model stand 50 is being controlled. The middle row of movement labels relate to the camera carriage axes. For example, the keys 230 and 231, operating in the camera carriage control mode, adjust movement along the truck axis, as indicated by the directional arrows in FIG. 3. The keys 232 and 233 alter movement along the north/south axis in the directions indicated by the arrows 152 in FIG. 3, while the keys 234 and 235 alter movement in the east/west directions while operating in the carriage control mode, indicated by the arrows 151 in FIG. 3.

When the camera mount rotational axes are to be controlled, the bottom labels of FIG. 5 are indicative of the axial control for the associated keys 230–237. That is, the keys 230 and 231 control panning of the camera, according to the directional indicia 154 in FIG. 3. The keys 232 and 233 control tilt of the camera, according to the directional indicia 156 in FIG. 3. The keys 234 and 235 control roll of the camera, according to the directional indicia 158 in FIG. 3. The keys 236 and 237 control focus to move the barrel of the lens assembly 48 in the manner indicated by the directional indicia 160 in FIG. 3 in either the camera carriage or camera mount mode of operation.

The function select keys 238–240 control the function of the movement control keys 230–237. The control key 238 determines whether the model stand 50 or the camera positioning assembly 10 is selected. If the camera positioning assembly 10 is selected, the function control key 239 selects either the carriage axes or the mount axes, that is either the orthogonal axes 150, 151 and 152 associated with the carriage, or the rotational axes 154, 156 and 158 associated with the camera mount. The control key 240 selects either the fast or slow jogging speed.

During utilization of the control panel 70, the CRT screen 68 displays which of the available three modes of operation has been selected. As each one of the function select keys 238–240 is depressed, it toggles to the opposite condition. A movement control key may be selected from the keys 230–237 and held down once a function has been selected. With the simultaneous depression of one of the movement control keys 230–237 and the REPEAT key, a continuous stream of jogging control characters is generated as an input to the computer 30. This causes a continuous movement to occur of either the camera 26 or the model 52 along the axis effected by the depressed one of the keys 230–237. In this fashion, a console operator may control movement of the camera 26 or model 52 entirely through digital inputs to the system through the control panel 70. These digital inputs are indicated at 400 in FIG. 6. As the camera 26 or model 52 moves to a new position, the current axial coordinates are treated as the desired position coordinates for the film frame at the lens 48. With continued movement, these coordinates are continuously updated until, or unless the operator ceases manipulation of the camera 26 or model 52 through the keyboard 70 and causes the present axial coordinates for the camera 26 and model 52 to be entered as desired position coordinates for a particular film frame.

POINT OF INTEREST

In addition to the eleven independent axes along which the camera positioning assembly 10 and model stand 50 may be manipulated, there is one additional data parameter called the point of interest (POI) axis. The POI coordinate defines the distance in inches from the film plane in the camera 26 to the point of interest, which may be the model 52. This coordinate defines the point in space at which the camera 26 is directed. When the model stand 50 is utilized, a point of interest is designated for a particular film frame for film in the camera 26 and a lens code associated with a particular lens assembly is also entered through the keyboard 42. The computer 30 thereafter automatically utilizes the coordinate information along with the eleven physical axes associated with both the model stand 50 and the camera positioning assembly 10 to determine the POI coordinate for each film frame. The computer 30 uses this information to derive a focal coordinate for each film frame based upon the stored encoded characteristics associated with the lens code for the particular lens assembly 48 utilized. If the subject is to remain stationary, the POI coordinate will change according to the three dimensional spacial distance of the camera 26 from the designated spacial position of the initially defined point of interest as determined by camera carriage movement along the axes indicated by the directional arrows 150, 151 and 152 in FIG. 3. Once entered into the computer 30 through the keyboard 42, the point of interest will remain as designated for subsequent film frames until or unless altered for designated positions again through the keyboard 42. The camera 26 will pan, tilt and focus automatically to keep the point of interest in view and in focus.

AUTOMATIC FOCAL CONTROL

As previously noted, the lens assembly 48 includes a lens barrel carrying an optical lens and is mounted on the camera 26 for rotation about an axis directly in front of and perpendicular to the plane of film in the camera 26. Angular rotation of the barrel of the lens assembly 48 proportionately alters the distance of the lens therein from the film plane. The encoded characteristics of the focal coordinate indicate an angular rotation along the directional indicia 160 in FIG. 3. This angular displacement is digitally encoded in hundredths of a degree for processing by the computer 30. An algothrim relating angular position of the lens barrel in the lens assembly 48 to focus distance from the subject of interest is stored on the hard magnetic disk in the cartiage disk drive 36 of FIG. 2.

Typically, the camera 26 will utilize more than one different type of lens assembly 48, each having different focal characteristics. Accordingly, separate algorithms for different lens assemblies must be stored, and the lens code must be entered by the operator at the console 40 through the keyboard 42 to designate the particular algorithm to be used.

The stored algorithms are close digital approximations of a graphic tabulation of point of interest distance to proper angular displacement along the focal axis 3 to maintain the camera's subject in focus. Actually, two algorithms are employed for each unique lens characteristic, since the system inludes encoded feedback from all position axes in the system. Thus, for each lens one algorithm derives a requisite angular displacement in degrees from a reference position in terms of distance in inches of the lens in the lens assembly 48 from the point of interest. This displacement figure is utilized to operate the servo control to rotate the lens barrel as indicated by the directional arrow 160 in FIG. 3. An encoded feedback reports to the computer 30 the actual angular rotation that occurred. This feedback is decoded to determine the distance in inches to which the lens of the camera 26 was focused.

Exemplary algorithms are set forth below for specific lenses. In the algorithms, D equal degrees and I equals distance in inches.

The algorithms for a 24 millimeter lens are set forth below.

$$D = 1./(-1.0146E - 2 + 8.7276E - 4(8.82582E - 10I^5 - 5.51309E - 7I^4 + 1.29883E - 4I^3 - 1.33285E - 2I^2 + 1.40524I + 5.59599))$$
$$I = 1./(4.1576E - 3 + 6.6406E - 4(-6.99743E - 9I^5 + 2.55115E - 6I^4 - 3.55408E - 4I^3 + 1.96972E - 2I^2 + .78007 4I - 4.39215))$$

The algorithms for a 28 millimeter lens are set forth below.

$$D = -12.983 + 2664.5/(-5.73334 + 1.50029I - .0115945I^2 + 1.61927E - 4I^3 - 1.02157E - 6I^4 + 2.0484E - 9I^5$$
$$I = 1./(1.0088E - 2 + 3.2413E - 4(-18.7466 + 1.47399D - 2.44613E - 3D^2 + 2.76978E - 6D^3))$$

The algorithms for a 50 millimeter Summicron-R lens is as follows:

$$D = 1.372 + \frac{4714.9}{-4.34025E - 7I^3 - 4.59784E - 4I^2 + 1.16862I - 4.80525}$$
$$I = 1./(2.4242E - 3 + 1.9097E - 4(1.46611E - 10D^5 - 1.21464E - 7D^4 + 3.69763E - 5D^3 - 5.92042E - 3D^2 + 1.53608D - 17.0452))$$

The following algorithms closely approximate the functional characteristics of a 35 millimeter lens.

$$D = 1./(-.08747 + 6.7575E - 4(-1.11543E - 10I^5 + 9.5474E - 8I^4 - 2.36044E - 5I^3 + 1.94031E - 3I^2 + .760125I + 24.728))$$
$$I = 6.5547 + 1649.2/(-2.81935E - 10D^5 + 2.11702E - 7D^4 - 5.09313E - 5D^3 + 6.2585E - 3D^2 + .731136D + 1.5109)$$

The following algorithms closely approximate the functional characteristics of a 19 milimeter lens.

$$D = -4.3709 + \frac{2002.2}{4.10165E - 6I^3 - 2.91183E - 3I^2 + 1.35573I - 5.49086}$$
$$I = 1./(7.6447E - 3 + 4.2307E - 4(-1.70294E - 9I^5 + 7.94886E - 7I^4 - 1.20523E - 4I^3 + 4.15\ 86E - 3I^2 + 1.37163I - 15.3407))$$

The algorithms for a 90 millimeter lens are set forth below:

$$D = 1./(3.117E - 3 + 1.438E - 4(2.20096E - 7I^3 - 4.62066E - 4I^2 + 4I^2 + 1.26097I - 30.9956))$$
$$I = 1./(2.0747E - 3 + 1.2787E -$$

-continued
$$4(-1.1447E - 3I^2 + 1.33539I - 16.7946))$$

FILM TRANSPORT CONTROL

The automated camera control system of the invention preferably also includes a film transport mechanism for advancing and rewinding film coupled to the servo control interface 46. This film transport mechanism may be a servomotor for driving the film reels 64 and 66 of FIG. 2 in either of the two opposite directions of rotation. The film transport servo may be considered to be part of the camera servo control 44 indicated in FIG. 2.

The camera film transport servo is connected to the servo control interface 46 to provide encoded film position signals of film frame passage and direction of movement past the lens in the camera lens assembly 48. This information is transmitted through the input/output assembly 34 and is stored in memory. The film frame position is stored in digitally encoded form as a number corresponding to the film frame currently at the film lens. This same number is displayed on the CRT 68 to the operator at the console 40.

AUTOMATIC REPLAY

A principal feature of the invention is the ability to automatically drive the camera positioning assembly 10 to move the camera 26 repetitively along the same path and aimed exactly as prescribed by the position coordinates along the various position axes. This repetitive replay is achieved utilizing an index associated with the film transport. This film transport servo is indexed relative to a reference position, and movement of the servo a distance sufficient to advance or rewind the film by a single frame, increments or decrements a signal from the film transport resolver accordingly. The signal from the film transport resolver is transmitted to the computer 30 and displayed on the CRT 68. This signal provides a distance indication of film advancement or rewinding. The computer 30 determines the encoded number of the film frame currently at the camera lens.

Through the keyboard 32, the operator can designate a desired current film frame and can provide a repositioning signal. This repositioning signal is interpreted through the input/output assembly 34 which responds to operate the film transport servo motor to advance or rewind the film in the camera 26 to the desired film frame. Concurrently, the input/output assembly 34 operates through the servo control interface 46 to control the camera positioning assembly 10 to move the camera 26 to the coordinate positions associated with the desired current film frame. The console operator, through the keyboard 42, can initiate a replay signal so that the camera positioning assembly 10 will move the camera 26 in the prescribed path and at the prescribed orientation as the film transport moves forward. The information as to the axial position coordinates associated with the numbered film frames and associated with the key positions within each take as they arrive at the camera lens is read from the diskettes on the diskette drive 38.

It should be borne in mind that in order to minimize storage requirements, information is stored in the diskettes only in association with key positions. As previously indicated, up to 20 key positions can be designated in association with each film take. Accordingly, the camera 26 must be repositioned to one of these key positions in order to start the replay sequence. The positional information associated with the intermediate positions is not stored in the floppy diskettes, but instead is regenerated from the positional information associated with the preceeding and subsequent designated key positions that are stored in the diskette. However, these intermediate positions will be precisely reproduced by virtue of the stored position control algorithms maintained in permanent memory in the hard disk in the disk drive 36.

SYSTEM SOFTWARE

The automated camera control system of the invention is regulated and monitored by operator commands from the operator console 40. In utilizing the system, the operator will normally plan each take as a sequence of camera movements with each movement starting and ending at a specified key position. The movement of the camera 26 relative to the model 52, or other item being photographed, is specified by providing these key positions from the operator console 40. Up to twenty key positions may be specified. The computer 30, through the input/output assembly 34 and servo-control interface 46 will move the camera 26 smoothly and continuously from one position to the next when a take is run.

Appendix B hereto lists the various operator commands which can be entered at the operator console 40 through the keyboard 42. Appendix C is the program listing that is used to control the system of the invention in its perferred embodiment. The program of Appendix C makes use of the RDOS operating system (real time disk operating system) provided by the manufacturer of the equipment of Appendix A. Multi-tasking allows the program to perform more than one operation at a time with priorities assigned to each operation. The program assigns the highest priority to the issuance of camera commands at regular intervals, and lower priorities to updating the operator's CRT screen 68, and recording the time of day, and so forth. Most of the program of Appendix C is written in FORTRAN. However, the actual command routines which issue camera commands and read camera data from the servo control interface 46 are written in assembly language.

The basic purpose of the system software, is to (1) enable the operator to define camera movement by specifying a set of key camera positions, (2) "inbetween" those positions to create a smooth and continuous movement, (3) execute the smoothed movement under computer control and (4) enable the operator to operate the hardware from the keyboard 40.

The first of the four functions listed above results in the creation of a data file on a floppy diskette in the dual diskette drive 38 called a TAKE FILE containing a set of camera positions. This set of positions is converted into an INBETWEENED FILE on the cartridge disk drive 36 by the second or "inbetweening" function. The third "shooting" function runs the hardware through the smoothed movement.

Figure 11:
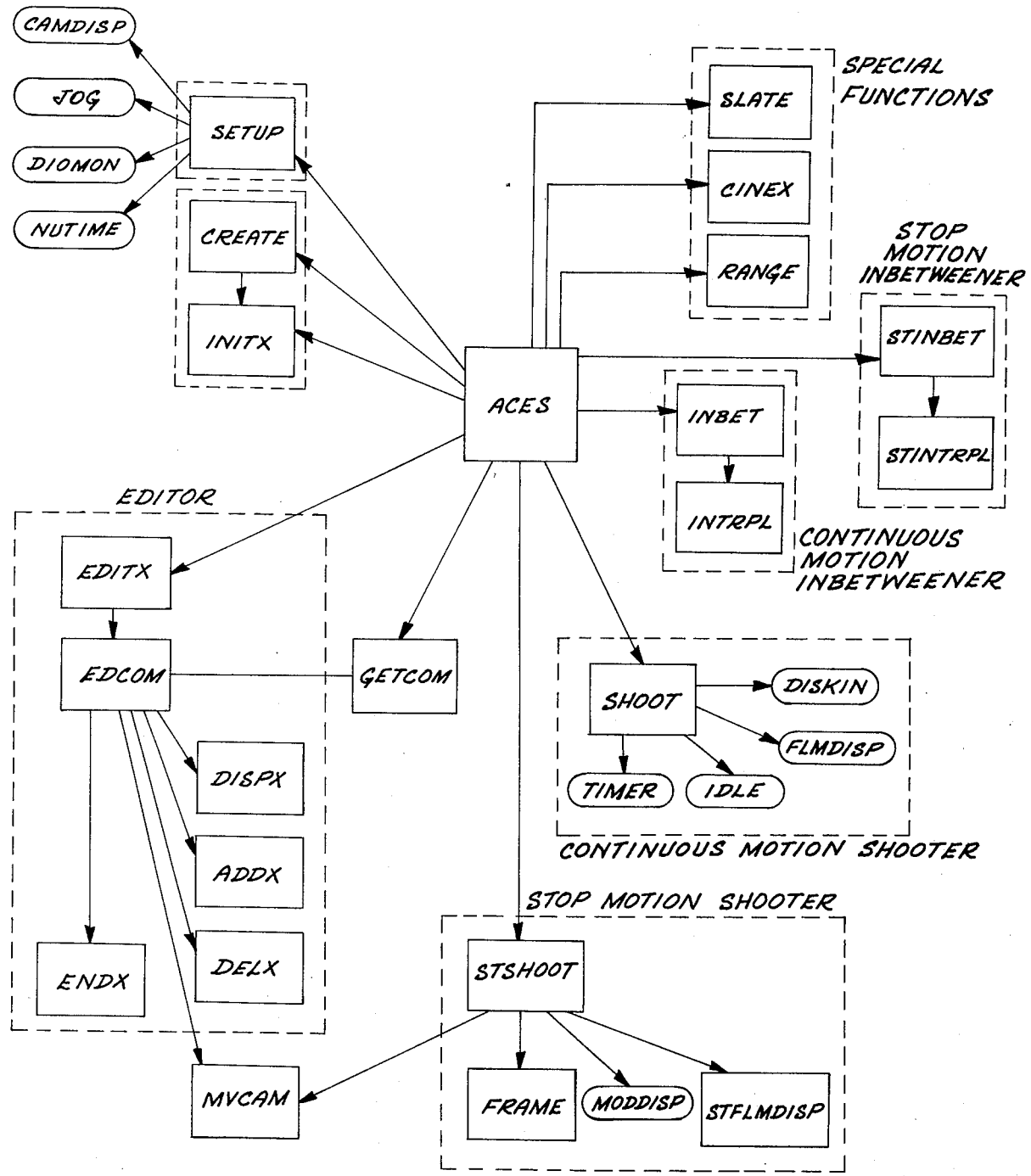
FIG. 11 is a functional block diagram of computer program organization.

The major program routines with which the system performs the foregong functions are executed as functional groups of routines. The most important functional groups of routines and tasks are summarized in Appendix D hereto. The functional inter-relationship between the various routines is illustrated in the block diagram of FIG. 11. The CAM DISP, JOG, DIOMON, NUTIME, DISKIN, FILMDISP, IDLE, TIMER and MODDISP are all separate tasks, while the separate subroutines are depicted in rectangular boxes in FIG. 11. The directional arrows indicate which of the particular subroutines call or activate other subroutines or tasks. The sequence program steps of each of the subroutines and tasks are set forth specifically in Appendix C.

The program of Appendix C makes use of overlays to perform some of its operations. The overlays allow parts of the program to be alternatively stored on disk until they are needed in memory. This allows the program of Appendix C to execute in a smaller total amount of memory. When a new overlay is called, there is a slight delay while that part of the program is read from the disk in the cartridge disk drive 36. The overlays are designed so that only infrequent, non-realtime functions use overlays. The overlays are groups of subroutines and tasks encompassed within dashed lines in FIG. 11.

Appendix E presents the list of ACES operator commands described in Appendix B, and also denotes the subroutines that are executed in order to carry out the commands. The major subroutines appear in FIG. 11, and all of the subroutines of Appendix E are to be found in Appendix C.

The first routine listed in Appendix E (ACES or EDCOM) waits for user input in the command and edit modes respectively. Some commands are processed completely within the first routine. When other routines are called, the system eventually returns to the first routine, except for "TAKE" and "END" commands which initiate and terminate the edit mode.

OVERVIEW OF OPERATION

As previously noted, the unit of operation in recording and playback is the scene. The console operator will plan each take within a scene as a sequence of camera movements which each movement starting and ending at a specified key position. The movement of the camera relative to an item being photograph is specified by giving these positions in terms of film frame numbers between 1 and 1975. Up to 20 positions may be specified within each take. The system will move the camera 26 smoothly and continuously from one position to another when the take is run.

When work begins on a new scene, a new diskette is assigned to hold the data for it. The production number, SCENE identification, and other "SLATE" items are supplied as previously described. Then the first take is defined.

The operator will define the key positions to which the camera will move during the take. Each position is made up of numerical values for the axial coordinates for the seven axes of the camera 26, for the four axes of the model stand 50 and an extra coordinate defining the distance to the point of interest (POI). If the point of interest moves during a take, the camera follows it smoothly from one point to the next. Each take will usually start with frame 1, and run up to any frame through frame number 1975, and each key position manually designated by the operator through the keyboard 42 can be any frame within this.

At any designated key position the values of each axial coordinate (except pan and tilt) must be specified. If pan and tilt are not specified for a particular key position, they are computed based on the assumption that the point of interest is the same as for the previous position. This feature allows the camera positioning 10 to automatically track the point of interest.

The actual coordinate positions may be entered through the keyboard, or by jogging the camera to the desired position and the values set to the current camera position in the manner previously described. The numerical values for current camera position are always displayed on the CRT 68. When working with a particular take, the current position being entered or updated is also displayed. The console operator simply types in new axial co-ordinate information to update the current position in accordance with the commands of Appendix B. New positions may be added or old ones deleted. The camera may be moved to any position that is defined in the data, or it may be moved by the jogging control panel 70.

Once a sequence of positions has been entered, the operator may request that the camera run through the movements in a rehearsal mode. This may be done as a check to ensure that no physical obstacles to the camera movement exist. As the camera moves through the designated positions and through intermediate positions according to the position control algorithms specified by the disk in the cartridge disk drive 36, the computer 30 determines the position co-ordinates for film frames between the designated key positions according to the subroutines identified as INBET, STINBET, INTRPL, and STINTRPL of Appendix C.

As soon as satisfactory movement of the camera 26 is achieved, the take is shot. Once a take has been shot, the axial position coordinates can no longer be modified. However, a new take may be created from an old one by simply copying it. This new take may be modified as desired.

Although the axial coordinates of a take once shot may no longer be modified, the film of the take may be double exposed to achieve special effects by repeating the shoot command of Appendix B. As previously noted, the repeatedability of movement will be within the physical tolerances of the equipment, which is 1/100th of an inch for linear movements and 1/100th of a degree for rotational movements. Because the system precisely positions the camera to the same point for each frame in a take, exact double exposure overlays of the same model on the same portion of film may be achieved.

When a diskette is first inserted into the diskette drive 38, it must be initialized. To this end, the computer 30 displays certain questions on the CRT 68. The operator responds through the keyboard 42 by providing identifying information concerning the production, the scene, the director, the cameraman, and a designation as to whether the film transport is four or eight perforations. This heading information, along with the current camera position will be displayed on the CRT 68. Thereafter, the heading and current camera position will be displayed on the CRT 68 when the diskette is utilized again.

A new take is generated by typing CReate followed by the number of the take to be created. The CReate command is indicated in Appendix B. The computer 30 will respond with questions on the CRT screen 68 asking for a lens code. In the embodiment contemplated, the lens codes are as follows: 19 mm=1; 12 mm=2; 28 mm=3; 35 mm=4; 50 mm=5; and 90 mm=6. If the take is not the first take on the diskette, the CRT 68 will pose a question as to whether or not the position data is to be copied from another take, and if so, the take number from which the data is to be copied.

The console operator may obtain a general summary of the takes contained on a diskette by entering the LIst command of Appendix B. In response to this command, the CRT will display the takes in numerical order, the number of key positions in each take, the starting number of the take frame, the ending number of the take frame and the date and time at which the take was last shot, if it has been shot. To obtain a hard copy listing of the same data, the command LIst 1 is entered, and a paper hard copy 82 is provided from the hard copy printer 80.

In actually moving the camera positioning assembly control 10 and the model stand 50 according to position coordinates, the computer 30 transfers to the MVCAM subroutine of Appendix C. This subroutine operates upon digitally encoded axial coordinates to move the camera positioning assembly 10 and model stand 50 as required. These coordinates are defined by the console operator for the key positions in the take. For the positions in between, however, axial coordinates are generated on the large 2.5 megabyte disk file in the cartridge disk drive 36 by the subroutines identified as INBET and STINBET in Appendix C. For continuous motion filming the system provides new position co-ordinates for each axis every 40 milliseconds. IF there is no movement along a particular axis, the same position co-ordinate is repeated. The camera transport is also addressed every 40 milliseconds in synchronization with the signals from the transducer 310 in FIG. 6. For stop motion photography the camera is moved to the intermediate frame positions by the STSHOOT and MVCAM subroutines. Once the camera has moved into the appropriate position, the system enters a delay subroutine to allow vibrations to dissipate before exposing the film. If the take is being shot, pursuant to the SHoot command of Appendix B, the computer 30 performs the SHOOT or STSHOOT subroutines which are found in the program listing of Appendix C. This exposes the film frame by frame as it is moved by the film transport to the lens assembly 48 of the camera 26.

Typing the DIsplay command, indicated in Appendix B, while in the edit mode will cause the computer 30 to provide a listing of all of the key positions in the take being edited. The information listed includes the take frame, the camera position and orientation, and the distance to the point of interest and point of focus. To obtain a hard copy listing of this information on the hard copy printer 80, the command DIsplay 1 while in the edit mode is given to the computer 30. The DIsplay command will provide data for either the camera axes or the model stand, which ever has been selected. The DIsplay 1 command provides the information for all axes.

While in the edit mode, the console operator must select a particular key position to look at and/or edit. He does this by referring to the sequence number of that position from among the key positions designated. The DIsplay command will provide the operator with the sequence number for each key position. To select a particular key position the user enters POsition followed by the sequence number. The axial values for that position will then be displayed on the CRT screen 68 and the user may then change the axial coordinates for that position. The axial coordinates of the position currently being displayed can be changed by entering the axis name followed by a new axial coordinate value, as indicated in the edit commands of Appendix B. If no new value is given for pan or tilt, the axial values for these axes will be blanked out and the computer 30 will calculate an intermediate value for those axes, as determined by the specified point of interest. The point of interest value is changed by entering the command PI followed by the new value. In order to change any model stand axial value, the first jogging control select key 238 in the jogging control panel 70 depicted in FIG. 5 must be set to MODEL.

A new position can be added to the take by entering the ADd command of Appendix B followed by a frame number. The frame number must be between 1 and 1975. The new position can occur at any point in the take. It can come before the first position, thereby becoming the new first position. It can also come after the last position, or anywhere in between. The only restriction is that the position must not already exist. The computer 30 responds to the ADd command by changing the frame and position numbers indicated on the screen and displaying the axial coordinate values of the new position. Any following positions are given new sequence numbers.

A position can be deleted by entering the DElete command of Appendix B, followed by its frame number. If the deleted key position frame is the one currently displayed, it will be removed from the screen and the axial coordinates of the following key position will be displayed. Following key positions are given new sequence numbers.

The user may relocate a key position in time by changing its frame number. This is done by typing FRame on the keyboard 12 followed by the new frame number. The currently displayed position is then assigned this new frame number. A position may not be given a frame number which would place it before the previous key position or after the following key position.

Axial values can be entered into a position directly from the current camera position. The camera must first be moved to the desired position by using the jogging control panel 70, or through an entry to the keyboard 42. The user then enters UPdate on the keyboard 42 and all axial coordinate values in the displayed position are changed to match the axial coordinate values of the actual camera position. Either model stand 50 or the camera positioning assembly 10 will be updated depending upon which has been selected on the jogging control panel 70.

The user may position the camera to any point defined in the take by entering the MOve command of Appendix B. The computer 30 will then move the camera (or model stand if it has been selected) from its current position to the position being displayed. The command is useful in setting up the camera prior to defining new positions with the update command.

Through the operator console 40, utilizing the keyboard 42, an operator can enter slating information to be stored on a diskette in the diskette drive 38. This slating information entered when a take is first created and is used in addition to the slating chalkboard manually employed to identify a segment of film with a specific take. A slate command is provided to expose a few frames of film to photograph the slate. The slate command requires a specification of exposure time in seconds and allows the operator to designate the number of frames to be shot for slating. A frame with the capping shutter closed is always advanced after the end of the slating exposure which bears the take identifying information to separate the slate from the actual take film which then follows.

EDITING

The floppy diskettes which are driven by the diskette drive 38 form a non-volatile memory storage in which desired coordinates of the camera positioning assembly 10 and the model stand 50 are erasably maintained. The information associated with the selected key positions within a take may be altered, and the key positions themselves may be added or deleted to or from an existing take. As a consequence, the console operator is able to alter selected portions of the take between designated key positions without effecting other portions of the take. This allows the console operator to replace defective sequences between key positions, to add sequences, or to delete them without affecting satisfactory portions of the take. Takes once shot however are not allowed to be modified or erased in any manner, but may be re-shot any number of times desired.

ENDING THE EDIT MODE

When the key positions of a take have been defined to the user's satisfaction the operator exits from the edit mode before proceeding to run the take. The ENd command indicates to the computer that the console operator is finished editing. The computer 30 responds by removing the position data from the display and by writing a permanent copy of the new take on the diskette in the drive 38.

REHEARSING A TAKE

Once a take has been defined, the operator might order the computer 30 to perform that movement. To rehearse a take the operator types REhearse on the keyboard 42 followed by the take sequence number. If the camera 26 seems to be approaching an object to closely, the operator can stop it by hitting one of the red panic buttons. During rehearsal movement can be viewed on the video monitors 49 and 51 to observe the field of view of the video camera 219. Before moving through the take positions, the camera moves into its initial position and pauses. The operator is asked to type a carriage return before the actual rehearsal movement begins. The rehearse command may use "cutback" and pause frames as with the shoot command.

SHOOTING A TAKE

A take is shot by entering SHoot followed by the take number. Film is exposed starting at its current position in the magazine. The computer 30 then moves the camera 26 through the take as with the REhearse command, only in this case the computer 30 also operates the camera motor and shutter. The computer 30 automatically records the date and time on the diskette in the diskette drive 38. A take may be rehearsed or shot any number of times. Before shooting begins the camera 26 moves to its initial position for the shot and pauses. The console operator is requested to type carriage return to start the shot. When a take is to be filmed, the computer 30 will ask for a code as to whether filming is to be continuous (1), stop motion photography (2), or to abort filming (3). If the operator responds with a code of 3, the computer returns to the command mode negating the shoot command. If the response is a code of 1, the computer asks for the exposure time.

If the user indicates a "1" after the take number, the computer 30 will ask for an exposure time, a settling time and a cutback frame and a pause frame. Filming will begin at the cutback frame. The value of the cutback frame must be between the first take frame, usually "1" and the last take frame. When the computer 30 reaches the pause frame, it will stop filming until the next pause frame is entered. The value of the next pause frame must be between the next frame to be shot and the last frame to be shot. If zero is entered than the camera 26 does not pause in its filming.

If the operator desires to position the film in the magazine, this is done with the SEt command. The operator types SEt followed by the frame number to set it to. The film will be wound forward or backward to the desired frame.

To facilitate operation of the video system and video camera 219, the operator may issue a command to open and close the mechanical and electronic shutters. The commands to accomplish this are "OPen" and "CLose" respectively. Opening and closing the shutter will advance the film by one frame. The CLose command should be issued prior to any other command that moves the film transport servomotor (such as set) to ensure proper positioning of the film.

EMERGENCY STOP/POWER FAIL

If the servo camera interface equipment experiences an emergency stop or a power failure, it must be reset. This condition is indicated by illumination of the stop button on the servo control chassis. The stop condition disables computer control over the camera servos 44 of FIG. 2 until the camera axis coordinates are reset. Resetting is accomplished by entering "RS" at the keyboard 42. If the stop condition was caused by a power failure, the P. F. reset push button must be momentarily depressed and the light must be off before the RS command will take effect.

CHANGING DISKS

In order to change diskettes, the user should use the QUit command. This command releases the diskette from the diskette drive 38 so that another may be inserted in its place. After the new diskette has been inserted into the left disk drive, the user enters ACES to restart the system.

The process projector 56 of FIG. 1 can be operated manually by entering PR or PP (optionally followed by a space and a numerical value) in the command mode. If a number is not given then the motion picture projector 58 is advanced by one frame. If a number is given, the projector 58 is advanced by the number of frames given. Automatic control of the process projector 56 is achieved by entering PR or PP in the edit mode. The computer 30 then asks for a numerical entry indicating the desired operating mode. A zero entry means the process projector 56 is not to be used. This is the default condition if the PP or PR command is not given for a particular take. An entry of "1" indicates each frame in the process projector will be photographed once by the camera. For double, triple and so forth shots, a "2", "3" etc. is entered. In this mode each frame in the motion picture projector 58 is shot 2,3 or more times for the corresponding successive frames of film in the camera 26. In the skip frame mode, every second, third, etc. frame in the process projector 56 is shot. This mode is selected by entering "-2", "-3", etc.

CINEX

The CInex command will automatically generate a 125 frame cinex, which is a sequence of frames shot with different colors of filters. The computer first requests that five exposure times be entered. When the yellow filter is in place, each of the five exposures is filmed in order, and the sequence is repeated 25 times. The film is then rewound, and when the cyan filter is in place, each exposure is filmed five times in order, and the sequence repeated five times. The film is rewound once more, and when the magenta filter is in place, each exposure is filmed 25 times in order. The user may provide an optional number with the CInex command to generate a cinex of other than 125 frames. The number given is the number of different exposures desired. Thus, a command of "CInex 3" would request a 27 frame cinex.

RANGE

The RAnge command will automatically shoot a range test of 16 exposure times. The computer, 30 will ask for the sixteen exposure times to be entered. The sequence will be repeated as many times as desired on subsequent frames.

EXIT

The system is turned off by first entering the command QUit. The remote stop button should be depressed prior to issuing the QUit command to disable the camera servo system 44 and the model stand servo system 54. This provides for an orderly shutdown of the software. When a "R" appears in the upper left hand corner of the screen, the user should turn to the hard copy print terminal 80 and issue the shut down command.

STOP ACTION MODE

Two modes of operation are available with the control system of the invention. These are a stop action mode and a continuous mode. In the stop action mode, the camera 26 is advanced one frame at a time and brought to a stop before exposing each film frame. In the continuous mode the camera is moved smoothly from fixed point to fixed point under control of the computer 30.

In continuous mode the camera and model axes are moved constantly and the camera shutter is rotated at a constant speed. This speed may be slowed down considerably from real time, but there are no stops and no delays involved. The axes are commanded to a new position every 40 milliseconds and the speed and motion is determined by the particular move programmed during the set up of the shot.

CONTINUOUS MODE

The control system of the invention can be run in the continuous mode not only for use in motion picture photography, but also for use in live video recording. That is, the camera 26 may be replaced with a video camera which dispatches video signals to the electronic data processing equipment in the cabinet 28 without any provision for recording the image of the field of view on film. Operation of the system with a video camera of this type is identical as with a motion picture film camera with the exception that the enumerated key positions are related to specific running time intervals within an overall video recording time. That is, instead of designating a key position by film frame number, the same number is used to identify a particular moment in time within the overall duration of a video recording run. The data is treated identically by the electronic data processing equipment, and the designation of a film frame or a running time interval has meaning only to the console operator.

The electronics of the servo control interface 46 involve digital to analog converters, analog to digital converters, read out displays and servo amplifiers. The servo motor drives are powered through long cables extending from the input/output assembly 34 to the camera positioning assembly 10 and the model stand 50. The camera servo motors 44 and the model stand servo motors 54 are d.c. operated 1/5 or ¼ horsepower motors and involve a two step control loop scheme. There is an analog control loop which is always active and which attempts to drive the servo motors to the commanded position at all times. An analog resolver or encoder provides feedback for this control loop and there is a resolver for each servo motor. In addition to this analog loop, there is a digital command register which is converted for use by this analog loop and the digital command then is provided to the computer 30.

The computer 30 also can sample the current position of the analog motors by a separate analog to digital converter circuit which is addressed by the computer for the particular channel required. The servo system response is carefully tuned for each position axis to provide both the 1/100th of an inch or degree accuracy required as well as a range of speeds suitable for the continuous mode of operation. A typical servo command is a 16 bit wide number placed in the register by the computer 30. This command will provide an absolute position or angular rotation along the axis commanded. On the front panel of the servo system there is a switching arrangement which allows both display and command of each individual channel independent of control of the computer 30. This is a manual mode and is extremely useful for checking out system hardware and setting up zero points on the various axes.

It should be understood that the control system of the invention may be modified and varied significantly from the specific embodiment disclosed herein without departing from the fundamental and essential concepts of the invention. Accordingly, the invention should not be construed as limited to the specific embodiment disclosed and described, but rather is defined in the claims appended hereto.

| | | APPENDIX A |
|---|---|---|
| Quantity | Part No. | Description |
| 1 | 8608 | NOVA 3/12 Computer with 65,536 Words MOS Memory 30 |
| 1 | 8530 | Automatic Program Load |
| 1 | 8531 | Power Monitor and Auto Restart |
| 1 | 8539 | High Performance Floating Point Unit for NOVA 3 Systems |
| 1 | 8534 | Hardware Multiply/Divide |
| 1 | 8537 | 12 Slot I/O Expansion Chassis |
| 1 | 6030 | Dual Diskette Subsystem Includes 2-Drives, Chassis and Power Supply, and 4-Drive Controller. |
| 1 | 6040-A | 60 CPS "DASHER" KSR Terminal Printer. |

APPENDIX A
-continued

| Quantity | Part No. | Description |
|---|---|---|
| 1 | 6053-A | Alphanumeric Video Display Terminal with Detachable Keyboard, Includes 96 ASCII Character Set. |
| 2 | 4075 | I/O Interface, Subassembly for use with 4076, 4077, and/or 4079 Controllers. |
| 2 | 4077 | Asynchronous Line Controller Jumper Selectable Baud Rate. |
| 1 | 4079 | Real Time Clock |
| 2 | 4191 | Digital I/O Interface Subassembly & External Connector. |
| 2 | 4066 | Digital I/O Interface provides 16 Inputs, 16 Outputs, One External Interrupt. |
| 2 | 4078 | EIA Interface for 4077 Asynchronous Controller. |
| 1 | 1012L | Two Bay 19" Rack Cabinet with Blower & Circuit Breaker for Eclipse or NOVA Computer. |
| 1 | 4192 | General Purpose I/O or Digital I/O External Connector. |
| 1 | AC | Accessories/Connectors |
| 1 | 3573-1 | DOS 8 (Subsequent) |
| 1 | 3658-1 | FORTRAN 5 (Subsequent) |
| 1 | 3657-1 | RUNTIME (Subsequent) |
| 1 | 6054 | 2.5MB Cartridge Disc Subsystem with One Drive, Four Drive Controller, and One Removable Cartridge. |

Northern Precision Laboratories Part No.

| Quantity | Part No. | Description |
|---|---|---|
| 1 | 801544-1 | Automatic Camera Control System, Electronics Console |
| 1 | 801544-1 | Electronics Console (3 Bays) including interface control panel and blowers. |
| 3 | 801512-6 | Transducer Converter |
| 12 | 211780-1 | Multiplexer & Output |
| 7 | 801511-1 | Transducer |
| 5 | 801550-1 | Transducer |
| 1 | 490033-1 | Resolver |
| 2 | 801545-6 | Position Controller Chassis |
| 12 | 211925-1 | 16 Bit Digital Control Transformer |
| 4 | | Servo Drive Chassis |
| 7 | | ¼ Horsepower Motor & Drive |
| 4 | 801547-1 | 1/5 Horsepower Motor & Drive |
| 1 | 490007-1 | Motor with Drive |
| 1 | 801503-1 | 14 Bit Tracking Converter |

Sony Corporation

| Quantity | Part No. | Description |
|---|---|---|
| 1 | VO-2860 | Video Tape Recorder Reproducer |
| 1 | RM-430 | Video Tape Remote Control |

Conrac Corporation

| Quantity | Part No. | Description |
|---|---|---|
| 1 | DZB-15/C-ER 8420D | TV Monitor |
| 1 | SNA-9/C-ER 8420D | TV Monitor |

Cohu Electronics

| Quantity | Part No. | Description |
|---|---|---|
| 1 | 2740-505 | Sync Generator |
| 1 | 7910-010ER-8420A | Camera Control Unit |
| 1 | 2006/ER-7781, ER-6016, ER 8420B | T.V. Camera |

APPENDIX B

| Command | Description |
|---|---|
| CAmera turnover x n | shoot n frames at exposure x |
| CReate n | create take number n |
| TAke n | edit take number n |
| REhearse n | rehearse take number n |
| SEt m | move the film to frame m |
| SHoot n | shoot take number n |
| SHoot n 1 | shoot n with a cutback, pause, or dissolve |
| LIst | list a summary of the takes on a diskette |
| LIst 1 | (list on the printer terminal) |
| RS | E-Stop/Powerfail reset |
| QUit | exit from the ACES system |
| OPen | open the shutters |
| CLose | close the shutters |
| PRocess projector n(or PP n) | advance the process projector n frames |
| CInex | create 125 frame cinex |
| RAnge | generate a 16 exposure range test |
| SLate x n | expose n frames at x seconds for a slate, then clear (1) |
| LL | load lens at infinity |

ACES EDIT COMMANDS:

| Command | Description |
|---|---|
| DIsplay | list the positions in the take being edited |
| DIsplay 1 | (list on the printer terminal) |
| POsition n | display/edit position n |
| ADd m | add a position at frame m |
| DElete m | delete the position at frame m |
| FRame m | change the frame number of the displayed position to m |
| UPdate | change the axis values to the current camera position |
| MOve | move the camera to displayed position |
| TRuck x | change the truck axis value to x |
| EAst/west x (or EW x) | change the east/west value to x |
| NOrth/south x (or NS x) | change the north/south value to x |
| PAn x | change the pan value to x if x not given, compute the pan for this position |
| TIlt x | change the tilt value to x if x not given, compute the pan for this position |
| ROll X | change the roll value to x |
| FOcus x | Change the focus value to x |
| PI x | change the point of interest value to x |
| MT x (model truck) | change the model stand truck axis value to x |
| MY x (model yaw) | change the model stand yaw axis to x |
| MP x (model pitch) | change the model stand pitch axis value to x |
| MR x (model roll) | change the model stand roll axis value to x |
| ENd | exit the edit mode -save this take on the diskette |
| PRocess projector (or PP) | set the process projector's operating mode |
| MS(model stand lockout) | set/remove model stand lockout and display current status |

APPENDIX C

```
      PRINT ACESLIST.MC ACES INITX CREATE ^
      GETCOM JOG MVCAM CAMDISP DIOMON ^
      CAMDRIV CAMTITL CIEXP CINEX CLOSH OPNSH CLOEL OPNEL ^
      CLRSCRN CNVRT DEG DIST DIGIO DMESS ERMESS ^
      FRAM1 FRTSK GETFR GETNAME HEADNG IDLE INPCH ITOR RTOI ^
      LISTX MOVCURS NUTIME PFSET PFRST PROJ ^
      RANGE SETFR SETUP SLATE ^
      EDITX EDCOM ADDX DELX DISPX AXDISP ENDX ^
      SHOOT DISKIN FLMDISP TIMER IDIV ^
      STSHOOT STFLMDISP FRAME MODDISP ^
      INBET INTRPL STINBET STINTRPL ^
      DUMPSTOP DUMPSMOOTH HMA
C                                                          **** ACES ****
C ACES USER INTERFACE MAIN ROUTINE
C
      COMPILER NOSTACK
      COMMON /COM1/ NTAKE,IPOS,IFILE(6)
      COMMON /COM2/ IARG1,IARG2,ARG1,ARG2,ICOM(20),KER
      COMMON /COM3/ KFLAG
      COMMON /COM4/ DELTC,DELTS
      COMMON /COM6/ XTIME(20),YAX(20),IREC,TSTART,TEND,NPOINTS,DELT
      COMMON /HEAD/ IBLN1(192),LENS,IPERF,FRATE,EXPS,ICS,NPOS,ISH,LASTF,
     *  MISC(22),IBLN2(672)
      COMMON /KTIM/ KTIMER
      COMMON /KEYS/ KSCRN
      COMMON /INLIN/ NCHAR
      COMMON /CHNL/ ICHNL(24)
      COMMON /SENS/ ITRSNS,IABRT,JPERF,JMAG,IBUCK,JPROJ
      DIMENSION IARRAY(16)
      EQUIVALENCE (IARRAY,IBLN2)
      EXTERNAL ZEDIT,ZPCS,ZINIT,ZCREAT,ZLIST,ZINTRP,ZSHOOT,
     *  ZSTINTRP,ZSTSHOOT
      DATA DELTC/.04/,DELTS/1./
      DATA MSG/1/
      DATA LBACK,LERASE/27K,13K/
C
      CALL OVOPN(35,"ACES.OL",IER)
      IF(IER.EQ.1) GO TO 5
      TYPE "CANNOT OPEN OVERLAY   -   IER=",IER
      GO TO 92
5     CONTINUE
      CALL FOVLD(35,ZINIT,0,IER)
      IF(IER.NE.1) GO TO 99
      CALL SETUP(0)
      CALL FOVRL(ZINIT,IER)
      IF(IER.NE.1) GO TO 99
10    CALL GETCOM(N)
      GO TO (11,12,13,14,15,17,19,90,20,21,22,23,24,25,
     * 95,95,95,95,95,95,95,95,95,95,95,95,95,95,95,95,95,95,26,26,27,
     * 95,95,95,95,28,29,95),N
C
C TAKE
C
11    CONTINUE
      CALL FOVLD(35,ZEDIT,0,IER)
      IF(IER.NE.1) GO TO 99
      CALL EDITX
      KFLAG=0
      CALL FOVRL(ZEDIT,IER)
      IF(IER.NE.1) GO TO 99
      GO TO 10
```

```
C
C CREATE
C
12      CONTINUE
        IF(IARG1.LT.1) GO TO 124
        IF(IARG1.GT.99) GO TO 124
        CALL FOVLD(35,ZCREAT,0,IER)
        IF(IER.NE.1) GO TO 99
        CALL CREATE
        CALL FOVRL(ZCREAT,IER)
        IF(IER.NE.1) GO TO 99
        IF(KER.NE.0) GO TO 10
        CALL CLRSCRN
        KFLAG=1
C CALL EDITX AUTOMATICALLY
        GO TO 11
C TAKE NUMBER OUT OF RANGE
124     CALL ERMESS(4)
        GO TO 10
C
C CHANGE
C
13      CONTINUE
        GO TO 10
        CALL RESET
        CALL RLSE("DP4",IER)
        CALL REC(KSCRN,MSG)
        TYPE " "
        CALL MOVCURS(19,1,IER)
        TYPE "CHANGE DISKETTES AND THEN HIT 'RETURN'"
        READ(11,100) I
100     FORMAT(A2)
        CALL XMT(KSCRN,MSG,$132)
132     CONTINUE
        CALL OVOPN(35,"ACES.OL",IER)
        CALL FOVLD(35,ZINIT,0,IER)
        IF(IER.NE.1) GO TO 99
        CALL SETUP(1)
        CALL FOVRL(ZINIT,IER)
        IF(IER.NE.1) GO TO 99
        GO TO 10
C
C REHEARSE
C
14      IFLAG=1
        GO TO 151
C
C SHOOT  (CONTINUOUS MOTION)
C
15      IFLAG=0
151     CONTINUE
        CALL REC(KSCRN,MSG)
        CALL MOVCURS(19,1,IER)
        TYPE "CONTINUOUS (1), STOP MOTION (2), OR ABORT FILMING (3)? "
155     ACCEPT I
        IF(I.GE.1.AND.I.LE.3) GO TO 152
        WRITE BINARY(10) LBACK,LERASE
        GO TO 155
152     CONTINUE
        CALL XMT(KSCRN,MSG,$156)
156     CONTINUE
        IF(I.EQ.3) CALL CLRSCRN
        IF(I.EQ.3) GO TO 10
        IF(I.EQ.2) GO TO 1500
        IF(IARG1.GE.100) GO TO 153
C PERFORM INBETWEENING
        CALL GETNAME(IARG1)
        CALL STAT(IFILE,IBLN1,IER)
        IF(IER.EQ.1) GO TO 154
C TAKE DOES NOT EXIST
        CALL ERMESS(7)
        GO TO 10
```

```
154     CONTINUE
        CALL FOVLD(35,ZINTRP,0,IER)
        IF(IER.NE.1) GO TO 99
        CALL INBET
        CALL FOVRL(ZINTRP,IER)
        IF(IER.NE.1) GO TO 99
        IF(KER.EQ.13) GO TO 10
153     CONTINUE
        CALL FOVLD(35,ZSHOOT,0,IER)
        IF(IER.NE.1) GO TO 99
        CALL PRI(6)
        CALL SHOOT(IFLAG)
        CALL PRI(10)
        CALL FOVRL(ZSHOOT,IER)
        IF(IER.NE.1) GO TO 99
        IF(IABRT.NE.0) GO TO 93
        GO TO 10
C
C SHOOT  (STOP-MOTION FILMING)
C
1500    CONTINUE
        IF(IARG1.GE.100) GO TO 1503
C PERFORM INBETWENING
        CALL GETNAME(IARG1)
        CALL STAT(IFILE,IBLN1,IER)
        IF(IER.EQ.1) GO TO 1504
C TAKE DOES NOT EXIST
        CALL ERMESS(7)
        GO TO 10
1504    CONTINUE
        CALL FOVLD(35,ZSTINTRP,0,IER)
        IF(IER.NE.1) GO TO 99
        CALL STINBET
        CALL FOVRL(ZSTINTRP,IER)
        IF(IER.NE.1) GO TO 99
        IF(KER.EQ.13) GO TO 10
1503    CONTINUE
        CALL FOVLD(35,ZSTSHOOT,0,IER)
        IF(IER.NE.1) GO TO 99
        CALL PRI(6)
        CALL STSHOOT(IFLAG)
        CALL PRI(10)
        CALL FOVRL(ZSTSHOOT,IER)
        IF(IER.NE.1) GO TO 99
        IF(IABRT.NE.0) GO TO 93
        GO TO 10
C
C LIST
C
17      CONTINUE
        CALL FOVLD(35,ZLIST,0,IER)
        IF(IER.NE.1) GO TO 99
        CALL LISTX
        CALL FOVRL(ZLIST,IER)
        IF(IER.NE.1) GO TO 99
        GO TO 10
C
C HELP
C
19      CONTINUE
C       CALL HELPX
        GO TO 10
C
C SET
C
20      CONTINUE
        IF(ARG1.EQ.-100000.) GO TO 202
C       IF(IARG1.LT.0) GO TO 202
C       IF(IARG1.GT.6400) GO TO 202
        I=IARG1
        CALL SETFR(I)
        GO TO 10
```

```
C FRAME NUMBER OUT OF RANGE
202     CALL ERMESS(9)
        GO TO 10
C
C  E-STOP RESET
C
21      CONTINUE
        CALL PFRST
        GO TO 10
C
C  OPEN THE SHUTTERS
C
22      CALL OPNSH
        IF(KER.NE.0) CALL DMESS(1)
        GO TO 10
C
C CLOSE THE SHUTTERS
C
23      CALL CLOSH
        IF(KER.NE.0) CALL DMESS(2)
        GO TO 10
C
C  CINEX
C
24      CONTINUE
        CALL FOVLD(35,ZPCS,0,IER)
        CALL CINEX
        CALL FOVRL(ZPCS,IER)
        IF(IER.NE.1) GO TO 99
        GO TO 10
C
C  RANGE
C
25      CONTINUE
        CALL FOVLD(35,ZPCS,0,IER)
        IF(IER.NE.1) GO TO 99
        CALL RANGE
        CALL FOVRL(ZPCS,IER)
        IF(IER.NE.1) GO TO 99
        GO TO 10
C
C  PROCESS PROJECTOR  (ADVANCE BY ONE FRAME)
C
26      CONTINUE
        IF(ARG1.EQ.-100000.) IARG1=1
        DO 262 I=1,IARG1
262     CALL PROJ
        GO TO 10
C
C SLATE
C
27      CONTINUE
        CALL FOVLD(35,ZPCS,0,IER)
        CALL SLATE
        CALL FOVRL(ZPCS,IER)
        IF(IER.NE.1)GO TO 99
        GO TO 10
C
C  LOAD LENS
C
28      CALL WRTCAM(13K,0)
        GO TO 10
C
C  CAMERA TURNOVER
C
29      CONTINUE
        IF(ARG1.EQ.-100000.) GO TO 10
        FRATE=.5/ARG1
        EXPS=ARG1
        N=IARG2
        CALL OPNEL
        IF(KER.NE.0) CALL DMESS(1)
        IF(KER.NE.0) GO TO 10
```

```
              IF(ARG2.EQ.-100000.) N=1
              CALL FOVLD(35,ZPCS,0,IER)
              IF(IER.NE.1) GO TO 99
              DO 292 I=1,N
              CALL FRAM1
              CALL FDELY(20)
292           CONTINUE
              CALL FOVRL(ZPCS,IER)
              IF(IER.NE.1) GO TO 99
              CALL CLOEL
              GO TO 10
      C
      C QUIT
      C
90            CONTINUE
              M=22K
              L=14K
              WRITE BINARY(10) L,M
92            CALL RESET
              CALL RLSE("DP4",IER)
              CALL EXIT
      C
      C HANDLE ABORT CONDITION
      C
93            CONTINUE
              CALL REC(KSCRN,MSG)
              CALL MOVCURS(20,1,IER)
              TYPE "**** EMERGENCY STOP ON ****"
              CALL XMT(KSCRN,MSG,$10)
              GO TO 10
      C
      C EDIT COMMANDS
      C
95            CALL ERMESS(5)
              GO TO 10
99            TYPE "TROUBLE WITH OVERLAYS   -   IER=",IER
              GO TO 92
              END
      C                                                         **** INITX ****
              COMPILER NOSTACK
              SUBROUTINE INITX
      C GET HEADER INFO  -  CREATING FIRST TAKE ON FLOPPY
      C
              COMMON /COM1/ NTAKE,IPOS,IFILE(6)
              COMMON /COM3/ KFLAG
              COMMON /HEAD/ IPROD(32),ISEQ(32),ISCEN(32),ICAMAN(32),IDIRCT(32),
            * ICOMNTS(32),LENS,IPERF,FRATE,EXPS,ICS,NPOS,ISH,LASTF,
            * MISC(22),IHIST(32),
            * AXES(16,20)
              COMMON /KEYS/ KSCRN
              DATA MSG/1/,L/27K/,M/13K/
      C
              CALL REC(KSCRN,MSG)
              CALL MOVCURS(10,1,IER)
              TYPE "PRODUCTION?"
              READ(11,100) (IPROD(I),I=1,32)
100           FORMAT(32A2)
              TYPE "SCENE?"
              READ(11,100) (ISCEN(I),I=1,32)
              TYPE "DIRECTOR?"
              READ(11,100) (IDIRCT(I),I=1,32)
              TYPE "CAMERAMAN?"
              READ(11,100) (ICAMAN(I),I=1,32)
              TYPE "4 OR 8 PERF TRANSPORT?"
26            READ(11,110) IPERF
110           FORMAT(I1)
              IF(IPERF.EQ.4) GO TO 29
              IF(IPERF.EQ.8) GO TO 29
              WRITE BINARY(10) L,M
              GO TO 26
29            CONTINUE
              CALL XMT(KSCRN,MSG,$35)
35            CONTINUE
              RETURN
              END
```

** CREATE **

```
C
        COMPILER NOSTACK
        OVERLAY ZCREAT
        SUBROUTINE CREATE
C CREATE A NEW TAKE
C   KFLAG = 0  -  REGULAR MODE
C   KFLAG = 1  -  CREATE FIRST TAKE ON DISKETTE
        COMMON /COM1/ NTAKE,IPOS,IFILE(6)
        COMMON /COM2/ IARG1,IARG2,ARG1,ARG2,ICOM(20),KER
        COMMON /COM3/ KFLAG
        COMMON /KEYS/ KSCRN
        COMMON /HEAD/ IPROD(32),ISEQ(32),ISCEN(32),ICAMAN(32),IDIRCT(32),
       * ICOMNTS(32),LENS,IPERF,FRATE,EXPS,ICS,NPOS,ISH,LASTF,
       * MISC(22),IHIST(32),
       * AXES(16,20)
        DIMENSION IARRAY(320)
        EQUIVALENCE (IARRAY,AXES)
        DATA MSG/1/,L/27K/,M/13K/
        KFLAG=0
        NTAKE=IARG1
        AXES(1,1)=1.
        CALL STAT("DP4:TAKELIST",ISEQ,IER)
        IF(IER.EQ.1) GO TO 10
C
C CREATING FIRST TAKE
C
        KFLAG=1
        CALL CFILW("DP4:TAKELIST",1,IER)
        IF(IER.EQ.1) GO TO 5
        TYPE " CANNOT CREATE FILE TAKELIST  -  IER=",IER
        CALL RESET
        CALL EXIT
5       CONTINUE
        CALL OPEN(36,"DP4:TAKELIST",0,IER)
        IF(IER.EQ.1) GO TO 6
        TYPE " CANNOT OPEN FILE TAKELIST  -  IER=",IER
        CALL RESET
        CALL EXIT
6       CONTINUE
        WRITE(36,110)
110     FORMAT("     0")
7       CALL CLOSE(36,IER)
        CALL INITX
        GO TO 8
C SEE IF NEW TAKE IS REALLY NEW
10      CONTINUE
        CALL OPEN(36,"DP4:TAKELIST",0,IER)
        READ(36,130) NUM
        IF(NUM.EQ.0) GO TO 7
        READ(36,130) (IARRAY(I),I=1,NUM)
130     FORMAT(I4)
        CALL CLOSE(36,IER)
        DO 15 I=1,NUM
        IF(IARRAY(I).EQ.IARG1) GO TO 16
15      CONTINUE
C TAKE NOT FOUND  -  EVERYTHING'S OK
        GO TO 4
C DUPLICATE TAKE NUMBERS FOUND
16      CONTINUE
        CALL ERMESS(10)
        RETURN
C
4       I=IARRAY(1)
        CALL GETNAME(I)
C READ HEADER INFO
C
        CALL OPEN(41,IFILE,0,IER,64)
        IF(IER.EQ.1) GO TO 50
        TYPE "CANNOT OPEN FILE WITH HEADER INFO  -  IER=",IER
        CALL RESET
        CALL EXIT
50      CALL READR(41,0,IPROD,6,IER)
        CALL CLOSE(41,IER)
        CALL CLRSCRN
        CALL HEADNG
```

```
C PERFORM CREATE DIALOG
      8         CONTINUE
                CALL REC(KSCRN,MSG)
                CALL MOVCURS(24,1,IER)
                WRITE(10,120) NTAKE
      120       FORMAT(" CREATING TAKE",I2)
                CALL MOVCURS(10,1,IER)
                TYPE "LENS TYPE: (19MM=1,24MM=2,28MM=3,35MM=4,50MM=5,90MM=6) "
      54        WRITE BINARY(10) M
                ACCEPT LENS
                IF(LENS.GE.1.AND.LENS.LE.6) GO TO 55
                WRITE BINARY(10) L,M
                GO TO 54
      55        CONTINUE
      C         TYPE "ENTER ANY OTHER COMMENTS"
      C         READ(11,100) (ICOMNTS(I),I=1,10)
      C
                IF(KFLAG.EQ.1) GO TO 40
                NPOS=1
                TYPE "COPY POSITION DATA FROM ANOTHER TAKE?"
                WRITE BINARY(10) M
      20        READ(11,100) I
      100       FORMAT(A2)
                IF(I.EQ.2HYE) GO TO 25
                IF(I.EQ.2HY ) GO TO 25
                IF(I.EQ.2HNO) GO TO 40
                IF(I.EQ.2HN ) GO TO 40
                WRITE BINARY(10) L,M
                GO TO 20
      25        TYPE "WHICH TAKE?"
                WRITE BINARY(10) M
      24        ACCEPT J
                IF(J.LT.1) GO TO 26
                IF(J.GT.99) GO TO 26
                DO 23 I=1,NUM
                IF(IARRAY(I).EQ.J) GO TO 27
      23        CONTINUE
      26        TYPE "UNACCEPTABLE TAKE NUMBER<13>"
                WRITE BINARY(10) L,L,M
                GO TO 24
      27        CONTINUE
                CALL GETNAME(J)
C OPEN FILE FROM WHICH TO TAKE THE POSITION DATA
                CALL OPEN(41,IFILE,0,IER,64)
                CALL READR(41,6,LENS,1,IER)
                J=2*NPOS
                CALL READR(41,8,IARRAY,J,IER)
                CALL CLOSE(41,IER)
      40        CALL XMT(KSCRN,MSG,$45)
      45        CONTINUE
                RETURN
                                                                **** GETCOM ****
      C
                COMPILER NOSTACK
                SUBROUTINE GETCOM(NCOM)
C ACCEPT AND TRANSLATE USER COMMAND FROM TERMINAL
      C   AND RETURN NUMERICAL ARGUMENTS
      C     BLANK = -100000.
      C     INFINITY = -10000.
      C
                COMMON /INLIN/ NCHAR
                COMMON /KEYS/ KSCRN
                COMMON /COM2/ IARG1,IARG2,ARG1,ARG2,ICOM(20),KER
                DIMENSION LCOM(42),IARG(2),ARG(2)
                EQUIVALENCE (IARG1,IARG),(ARG1,ARG)
                DATA LCOM/2HTA,2HCR,2HCH,2HRE,2HSH,2HLI,
            *    2HHE,2HQU,2HSE,2HRS,2HOP,2HCL,2HCI,2HRA,
            *    2HDI,2HAD,2HDE,2HUP,2HMO,2HEN,2HPO,2HFR,2HTR,2HEA,2HNO,
            *    2HPA,2HTI,2HRO,2HFO,2HPI,2HEW,2HNS,2HPP,2HPR,2HSL,2HMT,2HMY,2HMP,2HMR,
            *    2HLL,2HCA,2HMS/
                DATA MASK/177400K/,IBLNK/020040K/,ICOMMA/026040K/
                DATA LERASE/13K/,LBACK/27K/,LNEXT/32K/
                DATA MSG/1/
```

```
C
10      CALL REC(KSCRN,MSG)
        CALL MOVCURS(24,1,IER)
        IF(KER.NE.0) GO TO 15
        WRITE BINARY(10) LBACK,LERASE,LBACK,LERASE,LNEXT,LNEXT
15      CONTINUE
        WRITE BINARY(10) LERASE
        CALL XMT(KSCRN,MSG,37)
7       CONTINUE
        CALL INPCH
        IF(NCHAR.EQ.0) GO TO 7
        ICOM(1)=(ICOM(1).AND.177400K)+ICOM(2)/256
        KER=0
        DO 20 I=1,42
        IF(ICOM(1).EQ.LCOM(I)) GO TO 30
20      CONTINUE
X       WRITE(10,200) ICOM,LCOM
X200    FORMAT(1X,10OI7)
C COMMAND NOT FOUND
        CALL ERMESS(3)
        GO TO 10
C
C FOUND VALID COMMAND  -  NOW FIND THE ARGUMENTS
C
30      NCOM=I
C FIND FIRST BLANK AFTER COMMAND
        DO 60 I=2,20
        IF(ICOM(I).EQ.IBLNK) GO TO 65
60      CONTINUE
C NO BLANKS  -  RETURN ERROR
        CALL ERMESS(3)
        GO TO 10
65      II=I
        IARG1=0
        IARG2=0
        DO 80 IJ=1,2
C FIND NON-BLANK CHARACTER
        I=II
35      IF(ICOM(I).EQ.IBLNK) GO TO 40
        IF(ICOM(I).EQ.ICOMMA) GO TO 40
        GO TO 45
C IF NO MORE ARGUMENTS ARE TO BE FOUND, SET TO BLANK INDICATOR
40      IF(I.GE.20) GO TO 90
        I=I+1
        GO TO 35
C IS ARGUMENT AN "I"?
45      IF(ICOM(I).NE.2HI ) GO TO 50
C IF SO, ASSUME IT IS "INFINITY"
        IARG(IJ)=-10000
        ARG(IJ)=-10000.
        GO TO 75
C IF NOT IT SHOULD BE A NUMBER
50      CALL CNVRT(I,IARG(IJ),ARG(IJ),IER)
C ON ENTRY I = FIRST CHARACTER OF NUMBER
C ON EXIT  I = LAST +1 CHARACTER OF NUMBER
        IF(IER.EQ.1) GO TO 75
C NOT A VALID NUMBER
        CALL ERMESS(4)
        GO TO 10
75      II=I
80      CONTINUE
        RETURN
C SET BLANK INDICATOR
90      ARG(IJ)=-100000.
        RETURN
        END                                             **** JOG ****
C
        COMPILER NOSTACK
        TASK JOG
C
        COMMON /KEYS/ KSCRN
        COMMON /SENS/ ITRSNS,IABRT,JPERF,JMAG,IBACK,JPROJ
        COMMON /JOGCOM/ JCHAR
        COMMON /CUM8/ ICAM,ICAR,IR,IAX1,IAX2,ICAMOLD,ISAVE(16)
```

```
      DIMENSION ICHAR(13),ICH(24),IDELT(24,2)
      DATA ICHAR/162K,161K,163K,164K,166K,165K,167K,
     * 170K,171K,172K,173K,122K,136K/
      DATA IR/1/,MSG/1/,ICAM/1/,ICAR/1/
      DATA ICH/20K,20K,23K,23K,21K,21K,22K,22K,
     * 10K,10K,11K,11K,12K,12K,13K,13K,0K,0K,1K,1K,2K,2K,13K,13K/
      DATA IDELT/1,-1,1,-1,1,-1,1,-1, 1,-1,1,-1,1,-1,1,-1,
     * 1,-1,1,-1,1,-1,1,-1,
     * 20,-20,10,-10,10,-10,10,-10,
     * 10,-10,10,-10,10,-10,3,-3,
     * 30,-30,30,-30,30,-30,3,-3/
1     CONTINUE
      CALL FDELY(20)
      IF(JCHAR.EQ.0) GO TO 1
      JCHAR=JCHAR.OR.100K
      JCHAR=JCHAR.OR.20K
      DO 10 I=1,13
      IF(JCHAR.EQ.ICHAR(I)) GO TO 20
10    CONTINUE
      WRITE(10,100) JCHAR
100   FORMAT(/" ERROR IN JOG  -  JCHAR = ",OI7)
      JCHAR=0
      GO TO 1
20    CONTINUE
      IF(I.GT.8) GO TO 50
      IF(IABRT.EQ.0) GO TO 24
      CALL REC(KSCRN,MSG)
      CALL MOVCURS(20,1,IER)
      TYPE "****  EMERGENCY STOP CONDITION ****"
      CALL XMT(KSCRN,MSG,$22)
22    CONTINUE
      JCHAR=0
      GO TO 1
24    CONTINUE
      IF(ICAM.EQ.0) GO TO 25
      I=I+8
      IF(ICAR.EQ.1) I=I+8
25    CONTINUE
      CALL RDCAM(ICH(I),II)
      JOLD=JCHAR
30    JCHAR=0
      DO 40 III=1,5
      II=II+IDELT(I,IR)
      CALL FDELY(4)
      CALL WRTCAM(ICH(I),II)
40    CONTINUE
      IF(JOLD.EQ.JCHAR) GO TO 30
      GO TO 1
50    CONTINUE
      JCHAR=0
      I=I-8
      GO TO (51,52,53,1,1),I
51    ICAM=1-ICAM
      GO TO 1
52    ICAR=1-ICAR
C                                                    **** MVCAM ****
      COMPILER NOSTACK
      SUBROUTINE MVCAM
      COMMON /HEAD/ IPROD(32),ISEQ(32),ISCEN(32),ICAMAN(32),IDIRCT(32),
     * ICOMNTS(32),MISC(32),IHIST(32),AXES(16,20)
      COMMON /COM1/ NTAKE,IPOS,IFILE(6)
      COMMON /COM2/ IARG1,IARG2,ARG1,ARG2,ICOM(20),KER
      DIMENSION IFLAG(16),IDELT(16),CURNT(16),ICURNT(16),IAX(10),IDESRD(16)
C     IFLAG = 1 INDICATES THE AXIS HAS REACHED ITS DESTINATION
C     (OR IS ASSUMED TO HAVE DONE SO)
      EQUIVALENCE (IFLAG,ISEQ(1)),(ICURNT,ISEQ(17)),
     * (IDESRD,IHIST(17)),(IMODL,MISC(13))
      COMMON /CHNL/ ICHNL(24)
      COMMON /KEYS/ KSCRN
      COMMON /SENS/ ITRSNS,IABRT,JPERF,JMAG,IBACK,JPROJ
      COMMON /COM8/ ICAM,IBLN3(21)
      COMMON /COM9/ PANGLE
      DATA IAX/3,4,5,6,7,8,13,14,15,16/
      DATA IDELT/0,0,50,30,30,10,10,10,10,0,0,0,60,30,60,60/
      DATA MSG/1/
```

```
C
        IF(IABRT.EQ.0) GO TO 5
3       CALL REC(KSCRN,MSG)
        CALL MOVCURS(20,1,IER)
        TYPE "**** EMERGENCY STOP CONDITION ****"
        CALL XMT(KSCRN,MSG,$4)
4       CONTINUE
        RETURN
5       CONTINUE
C
C  INITIALIZE VARIABLES
C
        I1=1
        I2=6
        IF(ICAM.EQ.0) I1=7
        IF(ICAM.EQ.0) I2=10
        IF(NTAKE.EQ.0) I1=1
        IF(NTAKE.EQ.0) I2=10
        IF(IMODL.EQ.1) I2=6
C  MOVE FOCUS CONTROL
        CALL RTOI(9,AXES(9,IARG1),K)
        CALL WRTCAM(13,K,K)
        DO 10 II=I1,I2
        I=IAX(II)
        IFLAG(I)=0
        IF(AXES(I,IARG1).NE.-100000.) GO TO 15
        IFLAG(I)=1
        GO TO 10
15      CONTINUE
        IF(I.EQ.16) PANGLE=AXES(15,IARG1)
        CALL RTOI(I,AXES(I,IARG1),IDESRD(I))
        CALL RDCAM(ICHNL(I),ICURNT(I))
        IF(I.EQ.16) PANGLE=CURNT(15)
        CALL ITOR(I,ICURNT(I),CURNT(I))
        IDELT(I)=IABS(IDELT(I))
        IF(AXES(I,IARG1).LT.CURNT(I)) IDELT(I)=-IDELT(I)
        IF((I.EQ.6.OR.I.EQ.7.OR.I.EQ.14)
     *   .AND.(ABS(AXES(I,IARG1)-CURNT(I))
     *   .GT.180.)) IDELT(I)=-IDELT(I)
10      CONTINUE
C
C  MOVE CAMERA INTO POSITION AT FAST JOG RATE
C
45      CONTINUE
        IF(IABRT.EQ.1)GOTO 3
        DO 50 II=I1,I2
        I=IAX(II)
        IF(IFLAG(I).EQ.1) GO TO 50
        IF(IABS(ICURNT(I)-IDESRD(I)).LE.IABS(IDELT(I))) GO TO 55
        ICURNT(I)=ICURNT(I)+IDELT(I)
        CALL WRTCAM(ICHNL(I),ICURNT(I))
        GO TO 50
55      CONTINUE
        CALL WRTCAM(ICHNL(I),IDESRD(I))
        IFLAG(I)=1
        DO 57 JJ=I1,I2
        J=IAX(JJ)
        IF(IFLAG(J).NE.1) GO TO 50
57      CONTINUE
        GO TO 60
50      CONTINUE
        CALL FDELY(4)
        GO TO 45
C
C  DONE
C
60      CONTINUE
        IF(NTAKE.NE.0) RETURN
C  ADVANCE PROCESS PROJECTOR IF REQUESTED
C    USED ONLY IF CALLED FROM STSHOOT
        IF(AXES(1,IARG1).EQ.0.) RETURN
        N=IFIX(AXES(1,IARG1))
        DO 65 I=1,N
65      CALL PROJ
        RETURN
        END
```

** CAMDISP **

```
C
        COMPILER NOSTACK
        TASK CAMDISP
C   DISPLAY CAMERA POSITION ON SCREEN
C
        COMMON /NPL/ JVAL(24)
        COMMON /SENS/ ITRSNS,IABRT,JPERF,JMAG,IBACK,JPROJ
        COMMON /INLIN/ NCHAR
        COMMON /CHNL/ ICHNL(24)
        COMMON /KEYS/ KSCRN
        COMMON /COM8/ ICAM,ICAR,IR,IAX1,IAX2,ICAMOLD,ISAVE(16)
        COMMON /COM9/ PANGLE
        DIMENSION MESS(3,2),NAMER(2,2),NAMEC(4,2)
        DATA NAMER/2HSL,2HOW,2HFA,2HST/
        DATA NAMEC/2HMO,2HUN,2HT ,2H  ,2HCA,2HRR,2HIA,2HGE/
        DATA MESS/0,2HOF,2HF ,782,2HON,8207/
        DATA IFR/20000/
        DATA ISAVE/16*-32000/
C CHANNEL ASSIGNMENTS
C   3    TRUCK           0
C   4    E/W             2
C   5    N/S             1
C   6    PAN             10
C   7    TILT            11
C   8    ROLL            12
C   9    FOCUS           13
C  10    TRANSPORT POS'N 15
C   -    FRAME NUMBER    14
C  13    MODEL TRUCK     20
C  14    MODEL YAW       23
C  15    MODEL PITCH     21
C  16    MODEL ROLL      22
C
        DATA ICHNL/0,0,0K,2K,1K,10K,11K,12K,13K,15K,14K,0,20K,23K,21K,22K/
        DATA MSG/1/,IESTP/-99/
X       CALL OPEN(37,"TCAM",0,IER)
10      CONTINUE
        CALL FDELY(20)
        IF(ICAM.NE.ICAMOLD) CALL CAMTITL
        J=-1
        DO 30 I=IAX1,IAX2
        J=J+9
        CALL RDCAM(ICHNL(I),KK)
        IF(KK.EQ.ISAVE(I)) GO TO 30
        ISAVE(I)=KK
        IF(I.NE.16) GO TO 20
        CALL RDCAM(21K,LL)
        CALL ITOR(15,LL,PANGLE)
20      CONTINUE
        CALL ITOR(I,KK,XX)
X       WRITE(37,123) I,KK,XX
X123    FORMAT(" I= ",I2," KK= ",I5," XX= ",F8.2)
        CALL REC(KSCRN,MSG)
        CALL MOVCURS(5,J,IER)
        IF(XX.EQ.-10000.) GO TO 25
        WRITE(10,100) XX
100     FORMAT(1X,F9.2)
        GO TO 27
C HANDLE INFINITE FOCUS
25      WRITE(10,130)
130     FORMAT(4X,"INF  ")
27      CONTINUE
        CALL MOVCURS(24-NCHAR+1,IER)
        CALL XMT(KSCRN,MSG,$30)
30      CONTINUE
C
C   CHECK FRAME NUMBER
C
        CALL RDCAM(14K,IFR)
        IF(IFR.EQ.IFROLD) GO TO 40
        IFROLD=IFR
        CALL GETFR(IFR)
        CALL REC(KSCRN,MSG)
        CALL MOVCURS(3,15,IER)
        WRITE(10,110) IFR
```

```
110     FORMAT(1X,I5)
        CALL MOVCURS(24,NCHAR+1,IER)
        CALL XMT(KSCRN,MSG,$40)
C
C   E-STOP DISPLAY
C
40      CONTINUE
        IF(IABRT.EQ.IESTP)GO TO 50
        IESTP=IABRT
        CALL REC(KSCRN,MSG)
        CALL MOVCURS(3,61,IER)
        J=IABRT+1
        WRITE(10,120) MESS(1,J),MESS(2,J),MESS(3,J)
120     FORMAT("   E-STOP : ",3A2)
        CALL MOVCURS(24,NCHAR+1,IER)
        CALL XMT(KSCRN,MSG,$50)
C
C   JOGGING CONTROLS
C
50      CONTINUE
        IF(IR.EQ.IROLD) GO TO 60
        IROLD=IR
        CALL REC(KSCRN,MSG)
        CALL MOVCURS(3,23,IER)
        WRITE(10,140) (NAMER(I,IR),I=1,2)
140     FORMAT(" JOG RATE: ",2A2)
        CALL MOVCURS(24,NCHAR+1,IER)
        CALL XMT(KSCRN,MSG,$60)
60      CONTINUE
        IF(ICAM.EQ.0) GO TO 70
        IF(ICAR.EQ.ICAROLD) GO TO 70
        ICAROLD=ICAR
        J=ICAR+1
        CALL REC(KSCRN,MSG)
        CALL MOVCURS(3,42,IER)
        WRITE(10,150) (NAMEC(I,J),I=1,4)
150     FORMAT(" SELECT : ",4A2)
        CALL MOVCURS(24,NCHAR+1,IER)
        CALL XMT(KSCRN,MSG,$70)
70      CONTINUE
        GO TO 10
        END
C
```

** DIOMON **

```
        COMPILER NOSTACK
        TASK DIOMON
C MONITOR THE DIGITAL INPUT SWITCHES
C
        COMMON /SENS/ ITRSNS,IABRT,JPERF,JMAG,IBUCK,JPROJ
        COMMON /KEY3/ KDIO
        DIMENSION I1(16),I2(16)
        DATA MSG/1/
C
        DO 5 I=1,16
5       I1(I)=2
C
10      CALL FDELY(20)
C
C RESET WATCHDOG TIMER
C
        CALL REC(KDIO,MSG)
        I1(1)=0
        CALL DIGOUT(1,I1)
        I1(1)=1
        CALL DIGOUT(1,I1)
        CALL XMT(KDIO,MSG,$15)
15      CONTINUE
C
C READ CURRENT STATUS OF SWITCHES
C
        CALL DIGIN(1,I2)
        IABRT=0
C CHECK EMERGENCY STOP SWITCH
        IF(I2(1).EQ.1) GO TO 20
        IABRT=IABRT+1
```

```
C READ OTHER SLOT'S DIG. IN.
20      CALL DIGIN(0,I2)
C CHECK PROCESS PROJECTOR READY SIGNAL
        IPROJ=I2(9)
C CHECK BUCKLE SWITCHES
        IBTMP=0
        IF(I2(4).EQ.0) IBTMP=1
C CHECK TRANSPORT TYPE
        I=I2(5)+I2(5)+I2(6)+1
        GO TO (22,23,24,25),I
22      JPERF=2HNO
        IBTMP=0
        GO TO 30
23      JPERF=2H8
        GO TO 30
24      JPERF=2H4
        GO TO 30
25      JPERF=2H
        IBTMP=0
C CHECK FOR FILM MAGAZINE
30      I=I2(7)+I2(7)+I2(8)+1
        GO TO (32,33,34,35),I
32      JMAG=2HBR
        IBTMP=0
        GO TO 40
33      JMAG=2H8
        GO TO 40
34      JMAG=2H4
        GO TO 40
35      JMAG=2HTV
        IBTMP=0
C CHECK TRACK SENSOR
40      ITRSNS=I2(1)
C UPDATE BUCKLE SWITCH FLAG
        IBUCK=IBTMP
        GO TO 10
        END
```

```
;                                                       **** CAMDRIV ****
; CAMERA DRIVER
;    WRITES TO AND READS FROM NPL INTERFACE BOARDS
;
;       CALLING SEQUENCES:
;               FOR READING  - CALL RDCAM(ICHANNEL,IVALUE)
;               FOR WRITING  - CALL WRTCAM(ICHANNEL,IVALUE)
;
;
        .TITL   CAMDRIV
        .ENT    WRTCA,RDCAM
        NPL = 61
        .EXTD   .FARL,.FRET
        .NREL
        2
WRTCA:  JSR     @.FARL          ; PROCESS ARGUMENTS
                                ;
        LDA     0,@-167,3       ; SELECT PROPER CHANNEL
        DOAS    0,NPL
                                ;
        LDA     0,@-166,3       ; GET NEW VALUE FOR THE CHANNEL
        DOB     0,NPL           ;   AND SEND IT TO THE CAMERA
                                ;
        JSR     @.FRET
                                ;
                                ;
        2
RDCAM:  JSR     @.FARL          ; PROCESS ARGUMENTS
                                ;
        LDA     0,@-167,3       ; SELECT PROPER CHANNEL
        DOAS    0,NPL
        SKPBZ   NPL             ; WAIT FOR BUSY FLAG RESET
        JMP     .-1
                                ;
        DIB     0,NPL           ; READ LOCATION OF CHANNEL
        STA     0,@-166,3       ;   AND STORE IT IN ARGUMENT LIST
                                ;
        JSR     @.FRET
        .END
```

```
C                                                       **** CAMTITL ****
        COMPILER NOSTACK
        SUBROUTINE CAMTITL
C
C SET UP TITLES FOR CAMERA/MODEL STAND DISPLAY
C     AND SET PARAMETERS FOR USE IN CAMDISP
C
        COMMON /COM1/ NTAKE,IPOS,IFILE(6)
        COMMON /COM8/ ICAM,ICAR,IR,IAX1,IAX2,ICAMOLD,ISAVE(16)
        COMMON /KEYS/ KSCRN
        DATA LERASE/13K/
        DATA MSG/1/
C
        ICAMOLD=ICAM
        DO 5 I=1,16
5       ISAVE(I)=-32000
        CALL REC(KSCRN,MSG)
        CALL MOVCURS(4,1,IER)
        IF(ICAM.NE.1) GO TO 10
C CAMERA STAND
        IAX1=3
        IAX2=9
        WRITE(10,100)
100     FORMAT("  CAMERA     TRUCK      E/W       N/S      PAN      TILT",
       *"      ROLL       FOCUS     POI")
        WRITE BINARY(10) LERASE
        GO TO 30
C MODEL STAND
10      CONTINUE
        IAX1=13
        IAX2=16
        WRITE(10,110)
110     FORMAT("  MODEL      TRUCK      YAW      PITCH     ROLL<13>")
        WRITE BINARY(10) LERASE
30      CALL XMT(KSCRN,MSG,$31)
31      CONTINUE
        IF(NTAKE.NE.0) CALL AXDISP
        RETURN
        END
        COMPILER NOSTACK                                ;*** CIEXP ***
        SUBROUTINE CIEXP(FTIM,IFCT,IER)
C-----------------------------------------------------------------------
C CIEXP EXPOSES ONE FRAME AND CHECKS E-STOP, BUCKLE SWITCHES FOR
C       THE "CINEX" PROCEDURE
C
C       FTIM = DESIRED TURNOVER RATE (RPS)
C       IFCT = CURRENT FRAME # FOR DISPLAY
C       IER  = RETURNED 1=OK, -1=E-STOP, -2=BUCKLE SWITCH
C
C PCS
C-----------------------------------------------------------------------
        COMMON /SENS/ITRSNS,IABRT,JPERF,JMAG,IBUCK,JPROJ
        COMMON /KEYS/KSCRN
        COMMON /HEAD/IBLN1(192),LENS,IPERF,FRATE,EXPS,ICS,NPOS,ISH,LASTF,
       * MISC(22),IBLN2(672)

DATA MSG/1/

C-----------------------------------------------------------------------
C UPDATE FRAME # DISPLAY
C-----------------------------------------------------------------------
        CALL REC(KSCRN,MSG)
        CALL MOVCURS(22,1,IER)
        TYPE "FRAME ",IFCT
        CALL XMT(KSCRN,MSG,$10)
10      CONTINUE
C-----------------------------------------------------------------------
C CHECK FOR E-STOP
C-----------------------------------------------------------------------
        IF(IABRT.EQ.1)GO TO 900
C-----------------------------------------------------------------------
C CHECK FOR BUCKLE SWSITHCES
```

```
         IF(IBUCK.EQ.1)GO TO 910
C------------------------------------------------------------
C SHOOT FRAME
C------------------------------------------------------------
         FRATE=FTIM                          ; SET FRAME RATE
         EXPS=0.5/FRATE
         CALL FRAM1                          ; SHOOT FRAME
         CALL FDELY(10)                      ; WAIT 0.1 SECOND FOR
         IER=1                               CAMERA TO SETTLE DOWN
         RETURN
C------------------------------------------------------------
C ERROR RETURNS
C------------------------------------------------------------
900      IER=-1                              ; E-STOP
         RETURN
910      IER=-2                              ; BUCKEL SWITHC
         COMPILER NOSTACK                    ;*** CINEX ***
         OVERLAY ZPCS
         SUBROUTINE CINEX
C------------------------------------------------------------
C CINEX IS A SEPARATE PROCEDURE FOR GENERATING N*N*N FRAME
C       SEPARATION MASTER RANGES
C
C       A COMMAND ARGUMENT MAY BE USED AS AN OPTIONAL RANGE COUNT
C
C
C       N EXPOSURE TIMES ARE SPECIFIED TO BEGIN A TRIPLE
C       FILM EXPOSURE SEQUENCE:
C
C       YELLOW FILTER
C               [1-N],[1-N]...(N*NX)
C               REWIND
C       CYAN FILTER
C               [1,1,..NX,2,2,....,N,N]...(NX)
C               REWIND
C       MAGENTA FILTER
C               [1,....1;(N*NX)],[2,....,2;(N*NX)],.......(NX)
C               LEAVE FILM ON FRAME N*N*N+1
C       EXIT
C
C PCS
C------------------------------------------------------------
         COMMON /KEYS/KSCRN
         COMMON /HEAD/IPROD(32),ISEQ(32),ISCEN(32),ICAMAN(32),IDIRCT(32),
        * ICOMNTS(32),LENS,IPERF,FRATE,EXPS,ICS,NPOS,ISH,LASTF,IFRM1,
        * MISC(21),IHIST(32),
        * AXES(10,20)
         COMMON /COM2/IARG1,IARG2,ARG1,ARG2,ICOM(20),KER

DIMENSION FRTM(10)

DATA MSG/1/
         DATA LERASE/13K/

C------------------------------------------------------------
C GET EXPOSURE TIMES, N
C------------------------------------------------------------
         CALL CLRSCRN
         N=5                                 ; LET N DEFAULT TO
         IF(ARG1.EQ.-100000.)GOTO 3
         IF((IARG1.LT.1).OR.(IARG1.GT.10))GOTO 905
         N=IARG1
3        N2=N*N
         CALL REC(KSCRN,MSG)
         CALL MOVCURS(10,1,IER)
         WRITE(10,4)N
4        FORMAT(" ENTER"I3" EXPOSURE TIMES (SECONDS, -99=EXIT)")
         CALL MOVCURS(12,1,IER)
         DO 10 I=1,N
5           WRITE(10,7)I
```

```
7       FORMAT(I5":"Z)
        ACCEPT EXPT
        IF(EXPT.LE.-99.)GO TO 900          ; CHECK FOR
        IF(EXPT.LT..0625)GO TO 5           ; EXIT COMMAND
        FRTM(I)=0.5/EXPT
10      CONTINUE
        CALL MOVCURS(10,1,IER)
        WRITE BINARY(10)LERASE
        CALL XMT(KSCRN,MSG,$15)
15      CONTINUE
C-----------------------------------------
C INITIALIZE
C-----------------------------------------
        CALL WRTCAM(15K,0)                 ; FORCE MECH. SHUTTER TO 0 POSITION
        CALL GETFR(ICFR)                   ; GET CURRENT FRAME NUMBER
C-----------------------------------------
C SHOOT YELLOW EXPOSURES
C-----------------------------------------
        CALL REC(KSCRN,MSG)
        CALL MOVCURS(20,1,IER)
        WRITE BINARY(10)LERASE
        WRITE(10,140)
140     FORMAT(" HIT C.R. TO BEGIN YELLOW EXPOSURES"Z)
        READ(11,150)ICHR
150     FORMAT(A1)
        CALL MOVCURS(20,1,IER)
        WRITE BINARY(10)LERASE
        CALL XMT(KSCRN,MSG,$25)
25      CONTINUE

IFCT=1                             ; INIT LOCAL FRAME COUNTER
        CALL OPNEL                         ; OPEN ELECTRONIC SHUTTER
        IF(KER.EQ.0)GO TO 27
        CALL DMESS(1)
        RETURN
27      CONTINUE

DO 200 I=1,N2
            DO 100 J=1,N
                CALL CIEXP(FRTM(J),IFCT,IER)
                IF(IER.NE.1)GO TO 910
                IFCT=IFCT+1
100         CONTINUE
200     CONTINUE

CALL CLOEL                         ; CLOSE ELECTRONIC SHUTTER
        IF(KER.EQ.0) GO TO 32
        CALL DMESS(2)
        RETURN
32      CONTINUE
        CALL REC(KSCRN,MSG)
        CALL MOVCURS(22,1,IER)
        WRITE BINARY(10)LERASE
        TYPE "REWINDING"
        CALL XMT(KSCRN,MSG,$33)
33      CONTINUE

CALL FDELY(100)                    ; ALLOW BREATHER BEFORE REWIND

CALL SETFR(ICFR)                   ; REWIND TO START FRAME
        CALL FDELY(50)                     ; LET FRAME COUNT UPDATE
C-----------------------------------------
C SHOOT CYAN EXPOSURES
C-----------------------------------------
        CALL REC(KSCRN,MSG)
        CALL MOVCURS(22,1,IER)
        WRITE BINARY(10)LERASE
        CALL MOVCURS(20,1,IER)
        WRITE BINARY(10)LERASE
        READ(11,150)ICHR
        CALL MOVCURS(20,1,IER)
        WRITE BINARY(10)LERASE
        CALL XMT(KSCRN,MSG,$35)
```

```
35      CONTINUE

IFCT=1                                  ; SET LOCAL FRAME COUNTER TO
        CALL OPNEL                              ; OPEN ELECTRONIC SHUTTER
        IF(KER.EQ.0) GO TO 36
        CALL DMESS(1)
        RETURN
36      CONTINUE

DO 500 I=1,N
            DO 400 J=1,N
                DO 300 K=1,N
                    CALL CIEXP(FRTM(J),IFCT,IER)
                    IF(IER.NE.1)GO TO 910
                    IFCT=IFCT+1
300             CONTINUE
400         CONTINUE
500     CONTINUE
        CALL CLOEL                              ; CLOSE ELECTRONIC SHUTTE
        IF(KER.EQ.0) GO TO 38
        CALL DMESS(2)
        RETURN
38      CONTINUE
        CALL REC(KSCRN,MSG)
        CALL MOVCURS(22,1,IER)
        WRITE BINARY(10)LERASE
        TYPE "REWINDING"
        CALL XMT(KSCRN,MSG,$37)
37      CONTINUE

CALL FDELY(100)                         ; ALLOW ANOTHER BREATHER

CALL SETFR(ICFR)                        ; REWIND TO START FRAME
        CALL FDELY(50)                          ; LET FRAME COUNT UPDATE
C------------------------------------------------
C SHOOT MAGENTA EXPOSURES
C------------------------------------------------
        CALL REC(KSCRN,MSG)
        CALL MOVCURS(22,1,IER)
        WRITE BINARY(10)LERASE
        CALL MOVCURS(20,1,IER)
        WRITE BINARY(10)LERASE
        WRITE(10,40)
40      FORMAT(" HIT C.R. TO BEGIN MAGENTA EXPOSURES"Z)
        READ(11,150)ICHR
        CALL MOVCURS(20,1,IER)
        WRITE BINARY(10)LERASE
        CALL XMT(KSCRN,MSG,$45)
45      CONTINUE

IFCT=1                                  ; RESET LOCAL FRAME COINTER TO
        CALL OPNEL                              ; OPEN ELECTRONIC SHUTTER
        IF(KER.EQ.0) GO TO 47
        CALL DMESS(1)
        RETURN
47      CONTINUE
            DO 600 J=1,N2
                CALL CIEXP(FRTM(I),IFCT,IER)
                IF(IER.NE.1)GO TO 910
                IFCT=IFCT+1
600         CONTINUE
700     CONTINUE

CALL CLOEL                              ; CLOSE ELECTRONIC SHUTTER
                                                ; LEAVE FILM ON LAST FRAME+1
        IF(KER.EQ.0) GO TO 48
        CALL DMESS(2)
48      CONTINUE
```

```
C-------------------------------------------------
C ALL DONE; RETURN
C-------------------------------------------------
        CALL CLRSCRN
        RETURN
C-------------------------------------------------
C ERRORS
C-------------------------------------------------
920     CALL XMT(KSCRN,MSG,$905)
905     CONTINUE
        CALL CLRSCRN
        RETURN
910     CALL REC(KSCRN,MSG)
        CALL MOVCURS(20,1,IER)
        WRITE BINARY(10)LERASE
        IF(IER.EQ.-1)TYPE "** E-STOP **"
        IF(IER.EQ.-2)TYPE "** BUCKLE SWITCHES **"
        CALL XMT(KSCRN,MSG,$915)
915     CONTINUE
        RETURN
        END
C                                                       **** CLOSH ****
C    CLOSE THE MECHANICAL AND ELECTRONIC SHUTTERS
C
        COMPILER NOSTACK
        SUBROUTINE CLOSH
C
C   CLOSE ELECTRONIC SHUTTER
        CALL CLOEL
C
        CALL WRTCAM(15K,-24576)
        CALL FDELY(10)
        CALL WRTCAM(15K,-16384)
        CALL FDELY(10)
        CALL WRTCAM(15K,-8192)
        CALL FDELY(10)
        CALL WRTCAM(15K,0)
        CALL FDELY(10)
        RETURN
        END
C                                                       **** OPNSH ****
C   OPEN MECHANICAL AND ELECTRONIC SHUTTERS
C
        COMPILER NOSTACK
        SUBROUTINE OPNSH
C
        CALL WRTCAM(15K,8192)
        CALL FDELY(10)
        CALL WRTCAM(15K,16384)
        CALL FDELY(10)
        CALL WRTCAM(15K,24576)
        CALL FDELY(10)
        CALL WRTCAM(15K,32767)
        CALL FDELY(10)
C
C   OPEN ELECTRONIC SHUTTER
        CALL OPNEL
        RETURN
        END
C                                                       **** CLOEL ****
        COMPILER NOSTACK
        SUBROUTINE CLOEL
C   CLOSE THE ELECTRONIC SHUTTER
C
        COMMON /HEAD/ IBLN1(32),IARRAY(16),IBLN2(848)
        COMMON /KEY3/ KDIO
        COMMON /COM2/ IARG1,IARG2,ARG1,ARG2,ICOM(20),KER
        DATA MSG/1/
C
        KER=0
        DO 10 I=2,16
10      IARRAY(I)=2
        IARRAY(1)=0
        CALL REC(KDIO,MSG)
        CALL DIGOUT(0,IARRAY)
        CALL XMT(KDIO,MSG,$20)
```

```
 20      CONTINUE
         CALL FDELY(10)
         CALL DIGIN(0,IARRAY)
C  IF STILL CLOSED SET KER
         IF(IARRAY(3).EQ.1) KER=14
         RETURN
         END
C                                                          **** OPNEL ****
         COMPILER NOSTACK
         SUBROUTINE OPNEL
C  OPEN THE ELECTRONIC SHUTTER
C
         COMMON /HEAD/ IBLN1(32),IARRAY(16),IBLN2(848)
         COMMON /KEY3/ KDIO
         COMMON /COM2/ IARG1,IARG2,ARG1,ARG2,ICOM(20),KER
         DATA MSG/1/
C
         KER=0
         DO 10 I=2,16
 10      IARRAY(I)=2
         IARRAY(1)=1
         CALL REC(KDIO,MSG)
         CALL DIGOUT(0,IARRAY)
         CALL XMT(KDIO,MSG,$20)
 20      CONTINUE
         CALL FDELY(10)
         CALL DIGIN(0,IARRAY)
C  IF STILL CLOSED SET KER
         IF(IARRAY(3).EQ.0) KER=14
         RETURN
         END
C                                                          **** CLRSCRN ****
         COMPILER NOSTACK
         SUBROUTINE CLRSCRN
C  CLEAR LINES 8 TO 24 ON SCREEN
C
         COMMON /KEYS/ KSCRN
         DATA MSG/1/
         DATA L,M/13K,32K/
         CALL REC(KSCRN,MSG)
         CALL MOVCURS(8,1,IER)
         DO 10 I=8,24
         WRITE BINARY(10) L,M
 10      CONTINUE
C
         CALL XMT(KSCRN,MSG,$20)
 20      CONTINUE
         RETURN
         END
C                                                          **** CNVRT ****
         COMPILER NOSTACK
         SUBROUTINE CNVRT(I1,IARG,ARG,IER)
C  CONVERTS CHAR. STRING ARGUMENT TO A REAL AND INT. NUMBER
         COMMON /COM2/ IARG1,IARG2,ARG1,ARG2,ICOM(20),KER
C  THE INTEGER PART OF THE NUMBER IS BETWEEN I1 AND I2
C  THE FRACTIONAL PART IS BETWEEN J1 AND J2
C
         DIMENSION NUMBR(10)
         DATA NUMBR/030040K,030440K,031040K,031440K,032040K,032440K,
        * 033040K,033440K,034040K,034440K/
         DATA IBLNK,ICOMMA,IDECML/020040K,026040K,027040K/
         DATA MINUS,IPLUS/026440K,025440K/
C  SET ERROR FLAG
         KK=1
         ARG=0.
         IARG=0
         IER=2
C  CHECK FOR SIGN
         XSIGN=1.
         IF(ICOM(I1).NE.MINUS) GO TO 6
         XSIGN=-1.
         GO TO 7
 6       IF(ICOM(I1).NE.IPLUS) GO TO 8
 7       I1=I1+1
```

```
8         CONTINUE
C FIND THE RIGHT-HAND-SIDE DELIMITER
          DO 10 I=I1,20
          IF(ICOM(I).EQ.IBLNK) GO TO 20
          IF(ICOM(I).EQ.ICOMMA) GO TO 20
          IF(ICOM(I).EQ.IDECML) GO TO 30
10        CONTINUE
C NO DELIMITER FOUND  -  RETURN ERROR CONDITION
          RETURN
C BLANK OR COMMA FOUND  -  NO FRACTIONAL PART EXISTS
20        I2=I-1
          J1=0
          J2=0
          GO TO 50
C DECIMAL FOUND  -  FIND WHAT'S TO THE RIGHT OF THE DECIMAL
30        I2=I-1
          IF(ICOM(I+1).NE.IBLNK) GO TO 40
C BLANK TO RIGHT OF DECIMAL  -  NO FRACTIONAL PART
          KK=2
          J1=0
          J2=0
          GO TO 50
C SET LIMITS FOR FRACTIONAL PART OF NUMBER
40        J1=I+1
          DO 42 I=J1,20
          IF(ICOM(I).EQ.IBLNK) GO TO 44
          IF(ICOM(I).EQ.ICOMMA) GO TO 44
42        CONTINUE
C NO DELIMITER FOUND  -  RETURN ERROR CONDITION
          RETURN
44        J2=I-1
C
C CONVERT INTEGER PART OF NUMBER
C
50        CONTINUE
          IF(I2.LT.I1) GO TO 82
          I=I2
          X=1.
C CHARACTER CONVERSION LOOP
65        DO 70 J=1,10
          IF(NUMBR(J).EQ.ICOM(I)) GO TO 75
70        CONTINUE
C NON-NUMERIC CHARACTER FOUND
X         WRITE(10,130) ICOM(I),ICOM(I),I
X130      FORMAT(" 1 ",OI8," ",A2,I5 )
          RETURN
75        ARG=ARG+FLOAT(J-1)*X
X         WRITE(10,220) I,J,ARG
X220      FORMAT("  I=",I3,"  J=",I3," ARG=",F10.4 )
          IF(I.EQ.I1) GO TO 80
          X=X*10.
          I=I-1
          GO TO 65
80        IF(J1.NE.0) GO TO 82
          ARG=ARG*XSIGN
          I1=I2+KK
          IER=1
          IF(ABS(ARG).LE.32767.) IARG=IFIX(ARG)
          RETURN
C
C CONVERT FRACTIONAL PART OF NUMBER
C
82        CONTINUE
          X=1.
C CHARACTER CONVERSION (DO) LOOP
          DO 85 I=J1,J2
          X=X/10.
          DO 90 J=1,10
          IF(NUMBR(J).EQ.ICOM(I)) GO TO 95
90        CONTINUE
C NON-NUMERIC CHARACTER FOUND
X         WRITE(10,140) ICOM(I),ICOM(I),I
X140      FORMAT(" 2 ",OI8," ",A2,I5 )
          RETURN
```

```
  95      ARG=ARG+FLOAT(J-1)*X
   X      WRITE(10,220) I,J,ARG
  85      CONTINUE
          I1=J2+1
          ARG=ARG*XSIGN
          IER=1
          RETURN
          END
C                                                              **** DEG ****
          COMPILER NOSTACK
          FUNCTION DEG(DIST)
C COMPUTE SETTING OF FOCUS RING (IN DEGREES) TO FOCUS AT DISTANCE DIST
C
C     LENSES ARE:
C          1       19 MM
C          2       24 MM
C          3       28 MM
C          4       35 MM
C          5       50 MM
C          6       90 MM
C
          COMMON /HEAD/ IBLN1(192),LENS,MISC(31),IBLN2(352)
C
          DEG=0.
          IF(LENS.EQ.0) RETURN
          D=DIST
          D2=D*D
          D3=D2*D
          D4=D3*D
          D5=D4*D
          GO TO (10,20,30,40,50,60),LENS
  10      DEG=-4.3709+2002.2/(4.10165E-6*D3-2.91183E-3*D2+1.35573*D
         * -5.49086)
          IF(DIST.LT.12.) DEG=188.8
          IF(DIST.GT.300.) DEG=3.64
          RETURN
  20      CONTINUE
          DEG=1./(-1.0146E-2+8.7276E-4*(8.82582E-10*D5-5.51309E-7*D4
         * +1.29883E-4*D3-1.33285E-2*D2+1.40524*D+5.59599))
          IF(DIST.LT.12.5) DEG=118.2
          IF(DIST.GT.240.) DEG=4.92
          RETURN
  30      DEG=-12.983+2664.5/(-5.73334+1.50029*D-.0115945*D2+1.61927E-4*D3
         * -1.02157E-6*D4+2.0484E-9*D5)
          IF(DIST.LT.12.) DEG=232.4
          IF(DIST.GT.150.) DEG=5.6
          RETURN
  40      DEG=1./(-.018747+6.7575E-4*(-1.11543E-10*D5+9.5474E-8*D4
         * -2.36044E-5*D3+1.94031E-3*D2+.760125*D+24.728))
          IF(DIST.LT.12.) DEG=233.1
          IF(DIST.GT.350.) DEG=4.41
          RETURN
  50      DEG=-1.372+4717.9/(-4.34025E-7*D3-4.5978E-4*D2+1.15862*D
         * -4.80525)
          IF(DIST.LT.20.) DEG=255.32
          IF(DIST.GT.500.) DEG=10.13
          RETURN
  60      DEG=1./(3.117E-3+1.438E-4*(2.20096E-7*D3-4.62066E-4*D2
         * +1.26097*D-30.9956))
          IF(DIST.LT.27.) DEG=285.1
          IF(DIST.GT.1000.) DEG=6.89
          RETURN
          END
C                                                              **** DIST ****
          COMPILER NOSTACK
          FUNCTION DIST(DEG)
C COMPUTE DISTANCE TO OBJECT WHEN FOCUS SETTING IS DEG DEGREES
C
C     LENSES ARE:
C          1       19 MM
C          2       24 MM
C          3       28 MM
C          4       35 MM
C          5       50 MM
C          6       90 MM
```

```
C
      COMMON /HEAD/ IBLN1(192),LENS,MISC(31),IBLN2(352)
C
      DIST=0.
      IF(LENS.EQ.0) RETURN
      D=DEG
      D2=D*D
      D3=D2*D
      D4=D3*D
      D5=D4*D
      GO TO (10,20,30,40,50,60),LENS
10    DIST=1./(7.6447E-3+4.2307E-4*(-1.70294E-9*D5+7.94886E-7*D4
     * -1.20523E-4*D3+4.15586E-3*D2+1.37163*D-15.3407))
      RETURN
20    CONTINUE
      DIST=1./(4.1576E-3+6.6406E-4*(-6.99743E-9*D5+2.55115E-6*D4
     * -3.55408E-4*D3+1.96972E-2*D2+.780074*D-4.39215))
      RETURN
30    DIST=1./(1.0088E-2+3.2413E-4*(-18.7466+1.47399*D-2.44613E-3*D2
     * +2.78978E-6*D3))
      RETURN
40    DIST=6.5547+1649.2/(-2.81935E-10*D5+2.11702E-7*D4-5.09313E-5*D3
     * +6.2585E-3*D2+.731136*D+1.5109)
      RETURN
50    DIST=1./(2.4242E-3+1.9097E-4*(1.46611E-10*D5-1.21464E-7*D4
     * +3.69763E-5*D3-5.92042E-3*D2+1.53608*D-17.0452))
      RETURN
60    DIST=1./(2.0747E-3+1.2787E-4*(-1.1447E-3*D2+1.33539*D-16.7946))
      RETURN
      END
;                                                    **** DIGIO ****
;
; PERFORMS DIGITAL I/O - ASSEMBLY LANGUAGE INTERFACE TO HARDWARE
;    CALLING SEQUENCE:
;        CALL DIGIN(IDEV,IARRAY)
;        CALL DIGOUT(IDEV,IARRAY)
;   WHERE:    IDEV IS THE 'DEVICE CODE'   - 0 = 42
;                                         - 1 = 44
;             IARRAY IS DIMENSIONED .GE. 16
;
        .TITL   DIGIO
        .ENT    DIGIN,DIGOU
DIO1    =       42
DIO2    =       44
        .EXTD   .FARL,.FRET
.NREL
        2
DIGIN:  JSR     @.FARL
                                    ;
        LDA     0,@-167,3           ; LOAD THE DEVICE CODE
        MOV#    0,0,SZR             ;   AND TEST IT
        JMP     IN005               ;   IF NOT ZERO, INPUT FROM DIO2
        DIA     1,DIO1              ;   IF ZERO, INPUT FROM DIO1
        JMP     IN010
IN005:  DIA     1,DIO2
                                    ;
IN010:  LDA     0,C16               ; SET THE LOOP
        STA     0,COUNT             ;   COUNTER TO 16
        LDA     3,-166,3            ; SET ARRAY POINTER TO ADDRESS OF ARRAY
                                    ;
                                    ; MAIN LOOP - TO UNPACK THE CONTROL WORD AND
                                    ;   LOAD THE ARRAY WITH THE BIT VALUES
IN020:  MOVL    1,1,SNC             ; EXAMINE THE NEXT BIT OF THE INPUT WORD
        JMP     FIND0               ; IF IT'S A ZERO, PUT A ZERO INTO THE ARRAY
FIND1:  LDA     0,C1                ;   ELSE, PUT A ONE THERE
        JMP     IN030
FIND0:  SUB     0,0                 ;     LOAD A ZERO
IN030:  STA     0,0,3               ; LOAD THE ARRAY WITH THE PROPER VALUE
        DSZ     COUNT               ; ARE WE THRU?
        JMP     IN040
        JSR     @.FRET              ;   IF SO, RETURN
IN040:  INC     3,3                 ;   ELSE, INCREMENT THE ARRAY POINTER
        JMP     IN020               ;     AND LOOP BACK TO CONTINUE UNPACKING
                                    ;
                                    ;
```

```
DIGOU:  JSR     @.FARL
                                ;
        LDA     0,@-167,3       ; GET THE DEVICE NUMBER AND
        STA     0,DEV           ;   STORE INTO DEV
        MOV#    0,0,SZR         ; TEST DEVICE NUMBER AND
        JMP     .+3             ;   JUMP IF NOT ZERO
        LDA     1,WRD42         ; IF DEVICE=0 LOAD CONTROL WORD FOR DEVICE 42
        JMP     .+2
        LDA     1,WRD44         ; IF NOT ZERO LOAD CONTROL WORD FOR DEVICE 44
        LDA     0,C16           ; SET THE LOOP COUNTER
        STA     0,COUNT         ;   TO 16
        LDA     3,-166,3        ; SET THE ARRAY POINTER TO THE ADDRESS OF THE ARRAY
                                ;
                                ; MAIN LOOP TO PACK THE CONTROL WORD AND
                                ;   FROM THE VALUES SET IN THE ARRAY
                                ;
        MOV#    0,0,SNR         ; TEST IT
        JMP     SET0            ; IF THE VALUE IS ZERO, SET THE BIT TO ZERO
        NEG     0,0             ; IF THE VALUE IS ONE
        COM     0,0,SNR         ;   SET THE CONTROL
        JMP     SET1            ;     WORD BIT TO ONE
                                ;
        MOVL#   1,1,SZC         ;   ELSE, TEST THE CURRENT CONTROL WORD BIT VALUE
        JMP     SET1            ; IF IT'S ONE, SET TO ONE
                                ; IF IT'S ZERO, SET TO ZERO
SET0:   MOVZL   1,1             ; SET TO ZERO
        JMP     OU020
SET1:   MOVOL   1,1             ; SET TO ONE
OU020:  DSZ     COUNT           ; SEE IF WE'RE DONE
        JMP     OU025
        JMP     OU030           ;   IF SO, OUTPUT THE CONTROL WORD
OU025:  INC     3,3             ;   IF NOT, INCREMENT THE ARRAY POINTER
        JMP     OU010           ;     AND LOOP BACK
                                ;
                                ; OUT OF MAIN LOOP - OUTPUT THE CONTROL WORD
                                ;
OU030:  LDA     0,DEV           ; LOAD THE DEVICE CODE
        MOV#    0,0,SZR         ;   AND TEST IT
        JMP     OU040           ;   IF DEVICE NOT ZERO, OUTPUT TO DEVICE DIO2
        STA     1,WRD42         ;   ELSE, SAVE CURRENT CONTROL WORD AND
        DOA     1,DIO1          ;     OUTPUT TO DEVICE DIO1
        JSR     @.FRET
OU040:  STA     1,WRD44         ; SAVE CURRENT CONTROL WORD
        DOA     1,DIO2
        JSR     @.FRET
                                ;
                                ;
COUNT:  0
DEV:    0
WRD42:  0
WRD44:  1B2             ; INIT BIT 2 TO 1 FOR PF RESET ENABLE
C16:    20
C1:     1
        .END
C                                               **** DMESS ****
        COMPILER NOSTACK
        SUBROUTINE DMESS(IM)
        COMMON /KEYS/ KSCRN
        DIMENSION MESS(18,4)
        DATA MESS/
    *   36H**** CAPPING SHUTTER IS CLOSED **** ,
    *   36H**** CAPPING SHUTTER IS OPEN **** ,
    *   36H**** MODEL STAND IS LOCKED OUT **** ,
    *   36H**** MODEL STAND LOCKOUT REMOVED ***/
        DATA MSG/1/,LERASE/13K/
C
        CALL REC(KSCRN,MSG)
        CALL MOVCURS(20,5,IER)
        WRITE BINARY(10) LERASE
        WRITE(10,100) (MESS(I,IM),I=1,18)
100     FORMAT(1X,18A2)
        CALL XMT(KSCRN,MSG,$10)
10      CONTINUE
        RETURN
        END
```

** ERMESS **

```
C
       COMPILER NOSTACK
       SUBROUTINE ERMESS(IM)
       COMMON  /COM2/ IARG1,IARG2,ARG1,ARG2,ICOM(20),KER
       COMMON /KEYS/ KSCRN
       COMMON /ERCOM/ MESS(12,11)
       DATA MESS/24HPOSITION ALREADY EXISTS         ,
      *           24HPOSITION DOES NOT EXIST        ,
      *           24HINVALID COMMAND                ,
      *           24HNOT A VALID NUMBER             ,
      *           24HVALID IN EDIT MODE ONLY        ,
      *           24HNOT VALID IN EDIT MODE         ,
      *           24HTAKE DOES NOT EXIST            ,
      *           24HAXIS VALUE OUT OF RANGE        ,
      *           24HFRAME NUM. OUT OF RANGE        ,
      *           24HCANNOT MODIFY THIS TAKE        /
C
C NON-ERMESS ERRORS
C    KER = 13  -  ERROR IN INBETWEENER
C    KER = 14  -  MALFUNCTION IN ELECTRONIC SHUTTER
C
       DATA MSG/1/,L/13K/
C
       CALL REC(KSCRN,MSG)
       CALL MOVCURS(22,1,IER)
       WRITE(10,100) ICOM,L,(MESS(J,IM),J=1,12),L
100    FORMAT(1X,21A1/1X,12A2," -  TRY AGAIN",A1)
       WRITE BINARY(10) L
       CALL XMT(KSCRN,MSG,$10)
10     CONTINUE
       KER=IM
       RETURN
       END
```

** FRAM1 **

```
C
       COMPILER NOSTACK
       SUBROUTINE FRAM1
C EXPOSE ONE FRAM1 FOR STOP-MOTION PHOTOGRAPHY
C
       COMMON /KTIM/ KTIMER
       COMMON /HEAD/ IPROD(32),ISEQ(32),ISCEN(32),ICAMAN(32),IDIRCT(32),
      * ICOMNTS(32),LENS,IPERF,FRATE,EXPS,ICS,NPOS,ISH,LASTF,IFRM1,
      * MISC(21),IHIST(32),
      * AXES(16,20)
       COMMON /SENS/ ITRSNS,IABRT,JPERF,JMAG,IBUCK
       DIMENSION IARRAY(16)
       EQUIVALENCE (IARRAY,ISEQ(17))
       EXTERNAL TIMER
       DATA XRATE/655.36/
       DATA MSG/1/
C IF EXPOSURE TIME .LT. 2 SEC. USE CONTINUOUS SHUTTER MOVEMENT
       IF(EXPS.GT.2.0) GO TO 50
C
C   SET UP USER CLOCK
C
       CALL DUCLK(1,TIMER,IER)
C
C COMPUTE MOVEMENT RATE IN COUNTS PER 10 MS PULSE
C
       RATE=XRATE*FRATE
C
C MOVE THE MECHANICAL SHUTTER AT A CONTROLLED RATE
C
       COUNT=0.
       KOUNT=0
C
10     CONTINUE
       COUNT=COUNT+RATE
       IF(COUNT.GE.65536.) GO TO 20
       CC=COUNT
       IF(CC.GE.32768.) CC=CC-65536.
       KOUNT=IFIX(CC)
       CALL REC(KTIMER,MSG)
       CALL WRTCAM(15K,KOUNT)
       GO TO 10
```

```
C
C   WE'RE DONE  -   MAKE SURE WE STOP AT ZERO
C
20      CONTINUE
        CALL RDCLK
        CALL WRTCAM(15K,0)
        RETURN
C IF EXPOSURE TIME .GT. 2 SEC. OPEN MECH. SHUTTER FOR TIMED INTERVAL
50      CONTINUE
        II=IFIX(100.*EXPS+.5)
        CALL WRTCAM(15K,8192)
        CALL FDELY(3)
        CALL WRTCAM(15K,16384)
        CALL FDELY(3)
        CALL WRTCAM(15K,24576)
        CALL FDELY(3)
        CALL WRTCAM(15K,32767)
        CALL FDELY(II)
        CALL WRTCAM(15K,-24576)
        CALL FDELY(3)
        CALL WRTCAM(15K,-16384)
        CALL WRTCAM(15K,-8192)
        CALL FDELY(3)
        CALL WRTCAM(15K,0)
        CALL FDELY(3)
        RETURN
        END
        .ENT    FRTSK
        FRTSK = 7
        .END
C                                                                   **** GETFR ****
        COMPILER NOSTACK
        SUBROUTINE GETFR(IFR)
C   GET CURRENT FRAME NUMBER
C
        CALL RDCAM(14K,IFR)
        XX=FLOAT(IFR+5)
        IF(XX.LT.0.) XX=XX+65536.
        IFR=IFIX(XX/10.)
        RETURN
        END
C                                                                   **** GETNAME ****
        COMPILER NOSTACK
        SUBROUTINE GETNAME(I)
        COMMON /COM1/ NTAKE,IPOS,IFILE(6)
        DATA IFILE/2HDP,2H4:,2HTA,2HKE/
        IFILE(5)=0
        IFILE(6)=0
        IF(I.GT.9) GO TO 20
        IFILE(5)=(I+60K)*400K
        RETURN
20      IFILE(5)=(I/10+60K)*400K
        IFILE(5)=IFILE(5).OR.(I-I/10*10+60K)
        RETURN
        END
C                                                                   **** HEADNG ****
        COMPILER NOSTACK
        SUBROUTINE HEADNG
C DISPLAY SCREEN HEADING
C
        COMMON /KEYS/ KSCRN
        COMMON /HEAD/ IPROD(32),ISEQ(32),ISCEN(32),ICAMAN(32),IDIRCT(32),
     *  ICOMNTS(32),MISC(32),IHIST(32),AXES(16,20)
        DATA MSG/1/
        CALL REC(KSCRN,MSG)
        CALL MOVCURS(1,1,IER)
        WRITE(10,100)
     *  (IPROD(I),I=1,12),
     *  (ISCEN(I),I=1,12)
100     FORMAT("     A C E S  -  AUTOMATED CAMERA EFFECTS SYSTEM",
     *  "   REV 4.3"/
     *  " PROD:",12A2,1X,"SCENE:",12A2,2X,"TAKE:"/
     *  " CURRENT FRAME:")
        CALL XMT(KSCRN,MSG,$10)
10      CONTINUE
        RETURN
        END
```

```
            .TITL   IDLE

.COMM   CLOAD,1

.ENT    IDLE
;-----------------------------------------------------
; CPU FREE TIME TASK
;       SHOULD RUN AT LOWEST PRIORITY
;       WILL BUMP TIME CTR EVERY .01 SEC
;       EXPECTS EXTERNAL TIMER RESET
;
; PCS
;-----------------------------------------------------

.NREL

IDLE:       LDA     0,LMPY      ; SET UP .01 SEC TIMER
            COM     0,0
            INC     0,0,SZR     ; BEGIN 1.4 USEC LOOP
            JMP     .-1         ; END LOOP
            ISZ     @CLPTR      ; BUMP .01 SEC CTR
            JMP     IDLE

CLPTR:      .GADD   CLOAD,0
LMPY:       7143.

.END
                                                          **** INPCH ****
;
; FORTRAN CALLABLE SUBROUTINE TO LOAD THE INPUT BUFFER (ICOM IN COM2)
;   WHEN THE BUFFER IS FULL
;   (I.E., WHEN THE 21-ST CHAR. OR A CAR. RET. IS RECEIVED)
;   RETURN IS MADE TO THE CALLING ROUTINE
;      IN SUMMARY:
;        C.R.  -  ENDS INPUT AND RETURNS
;        DEL   -  DELETES LAST RECEIVED CHARACTER AND DECREMENTS BUFFER POINTER
;        JOG KEY  -  PUT INTO COMMON JOGCOM TO BE PROCESSED BY THE JOG TASK
;      ALL LETTERS AND NUMBERS AND SOME PUNCTUATION ACCEPTED
;      LOWER CASE CONVERTED TO UPPER CASE
;      ALL OTHER CHARACTERS IGNORED
;
            .TITL   INPCH
            .ENT    INPCH
            .EXTD   .FARL,.FRET,.REC,.XMT
            .EXTN   KEYS,JOGCO,COM2,INLIN
            .NREL
            0
INPCH:      JSR     @.FARL      ; NO ARGS TO PROCESS
            JSR     WIPE        ; BLANK OUT BUFFER AND ZERO OUT POINTER
                                ;
INP2:       .SYSTM              ; - TOP OF LOOP FOR INPUTTING CHARACTERS -
            .GCHAR
            JMP     .+1
                                ;
            LDA     1,JOGHD     ; LOAD JOG CONTROL HEADER CHAR.
            SUB#    0,1,SNR     ;   AND TEST IT AGAINST INPUT CHAR.
            JMP     JOG         ;     PROCESS JOG KEY IF MATCH FOUND
                                ;
            LDA     1,CR        ; LOAD CARRIAGE RETURN CODE
            SUB#    0,1,SNR     ;   AND
            JMP     @.OUT       ;     RETURN IF IT'S FOUND
                                ;
            LDA     1,DEL       ; LOAD DELETE CODE
            SUB#    0,1,SNR     ;   AND
            JMP     DELET       ;     PERFORM DELETE FUNCTION IF MATCH FOUND
                                ;
            LDA     3,.LIM      ; LOAD START ADDRESS OF GROUP LIMIT TABLE
            LDA     1,C11       ; INITIALIZE THE GROUP
            STA     1,COUNT     ;   COUNTER TO 11 (NOTE: COUNT USED BY WIPE)
                                ;
SERCH:      INC     3,3         ; INCREMENT THE TABLE PTR (AND CURRENT GROUP NO.)
            LDA     1,0,3       ; LOAD THE LIMIT OF THIS GROUP
            SUBZ#   0,1,SZC     ; EXECUTE NEXT JUMP IF THE INPUT CHAR. IS
            JMP     GOTIT       ;   WITHIN THIS GROUP
```

```
            DSZ     COUNT           ; SEE IF THE LAST GROUP HAS BEEN CHECKED
            JMP     SERCH           ;   IF NOT, LOOP
            JMP     INP2            ;   IF SO, GET THE NEXT CHAR. (SHOULD NOT HAPPEN)
                                    ;
GOTIT:      LDA     1,.LIM          ; FOUND THE RIGHT GROUP -
            SUB     1,3             ;   NOW COMPUTE
            LDA     1,.BPTR         ;   THE LOCATION
            ADD     1,3             ;   OF THE ADDRESS WHERE
            JMP     0,@3            ;   PROCESSING IS TO BE DONE, AND JMP
                                    ;
INP3:       LDA     1,C40           ; SUB OFFSET TO CONVERT
            SUB     1,0             ;   LOWER CASE TO UPPER CSE
                                    ;
INP4:       STA     0,CHAR          ; SAVE INPUT CHARACTER IN CHAR
                                    ;
            JSR     REC             ; WAIT FOR USE OF SCREEN
            JSR     MVCRS           ; MOVE CURSOR TO APPROPRIATE POSITION
            LDA     0,CHAR          ; RE-LOAD INPUT CHARACTER
            JSR     PRINT           ; ECHO THE INPUT CHARACTER
            JSR     XMT             ; RELEASE THE SCREEN
            LDA     0,CHAR          ; RE-LOAD INPUT CHARACTER
            JSR     CNVRT           ; CONVERT CHAR. TO PROPER FORMAT
            JSR     STORE           ; PUT CHAR. INTO INPUT BUFFER
            ISZ     @CPTR           ; INCREMENT
            JMP     .+1             ;   BUFFER POINTER
                                    ;
            JMP     INP2            ; LOOP BACK TO GET NEXT CHARACTER
                                    ;
JOGHD:      36
CR:         15
DEL:        177
CHAR:       0
CPTR:       INLIN
.OUT:       OUT
                                    ;
.BPTR:      BRPTR
BRPTR:      0                       ; TABLE OF BRANCH ADDRESSES
            INP2                    ;   0  -  37    SPECIAL CHARACTERS - NOT USED
            INP4                    ;   40          SPACE
            INP2                    ;   41 -  53    UNUSED PUNCTUATION
            INP4                    ;   54 -  56    COMMA, MINUS, AND DECIMAL POINT
            INP2                    ;   57          SLASH - NOT USED
            INP4                    ;   60 -  71    NUMBERS
            INP2                    ;   72 - 100    UNUSED PUNCTUATION
            INP4                    ;  101 - 132    LETTERS
            INP2                    ;  133 - 140    UNUSED PUNCTUATION
            INP3                    ;  141 - 172    LOWER CASE LETTERS
            INP2                    ;  173 - 176    UNUSED PUNCTUATION
                                    ;
.LIM:       LIMIT
LIMIT:      0                       ; TABLE OF GROUP LIMITS
            37
            40
            53
            56
            57
            71
            100
            132
            140
            172
            176
                                    ;
C11:        13
C40:        40
                                    ;
; SUBROUTINE TO BLANK OUT LINE BUFFER
                                    ;
WIPE:       STA     3,WRET          ; SAVE RETURN ADDRESS
                                    ;
            LDA     0,C19           ; STORE BUFFER SIZE MINUS ONE
            STA     0,@CPTR         ;   INTO BUFFER POINTER
                                    ;
            LDA     0,C20           ; STORE BUFFER SIZE
```

```
        STA     0,COUNT          ; INTO LOOP COUNTER
                                 ;
        LDA     0,BBLNK          ; LOAD BLANK-FILLED BLANK CHAR.
                                 ;
        LDA     STORE            ; BLANK OUT BUFFER
        DSZ     @CPTR            ; DECREMENT
        JMP     .+1              ;    CHARACTER POINTER
        DSZ     COUNT            ; DECREMENT THE LOOP
        JMP     .-4              ;    COUNTER UNTIL IT REACHES ZERO
                                 ;
        SUB     0,0              ; ZERO OUT THE
        STA     0,@CPTR          ;    CHARACTER POINTER
        JMP     @WRET
                                 ;
C19:    23
C20:    24
BBLNK:  20040
COUNT:  0
WRET:   0
                                 ;
; BRANCH TO PROCESS JOB CONTROL CHARACTERS
                                 ;
JOG:    .SYSTM                   ; GET JOG
        .GCHAR                   ; CONTROL CHARACTER
        JMP     .+1
        STA     0,@JCHAR         ; STORE INTO COMMON 'JOGCOM'
        JMP     INP2
                                 ;
JCHAR:  JOGCO
                                 ;
; BRANCH TO PROCESS DELETE CHARACTER
                                 ;
DELET:  LDA     1,@CPTR          ; LOAD CHARACTER POINTER
        MOV#    1,1,SNR          ;    AND SEE IF IT IS ZERO
        JMP     INP2             ;       IF SO, IGNORE IT
                                 ;
        DSZ     @CPTR            ; DECREMENT INPUT
        JMP     .+1              ;    BUFFER POINTER
        JSR     PEC              ; WAIT UNTIL SCREEN IS AVAILABLE
        JSR     MVCRS            ; MOVE CURSOR TO CORRECT POSITION
        LDA     0,BLNK           ; BLANK OUT
        JSR     PRINT            ;    PREVIOUSLY INPUT CHAR.
        LDA     0,BAKSP          ; BACK UP
        JSR     PRINT            ;    CURSOR
        JSR     XMT              ; RELEASE SCREEN
        LDA     0,BBLNK          ; LOAD BLANK
        JSR     STORE            ;    INTO BUFFER
        JMP     INP2
                                 ;
BAKSP:  31
                                 ;
; SUBROUTINE TO MOVE CURSOR TO CORRECT POSITION ON SCREEN
                                 ;
MVCRS:  STA     3,MRET           ; SAVE RETURN ADDRESS
                                 ;
        LDA     0,WRITE          ; WRITE CURSOR CONTROL HEADER
        JSR     PRINT
                                 ;
        LDA     0,@CPTR          ; GO TO CORRECT HORIZONTAL POSITION
        JSR     PRINT
                                 ;
        LDA     0,L24            ; GO TO LINE 24
        JSR     PRINT
                                 ;
        JMP     @MRET
                                 ;
L24:    27
WRITE:  20
MRET:   0
                                 ;
; SUBROUTINE TO DISPLAY A CHARACTER (IN AC0 IN PCHAR FORMAT)
;               USES NO AC'S
                                 ;
```

```
PRINT:  STA     3,PRNRT         ; SAVE RETURN ADDRESS
        .SYSTM
        .PCHAR
        JMP     .+1
        JMP     @PRNRT
                                ;
PRNRT:  0
                                ;
; CONVERT A CHARACTER TO COMMAND LINE FORMAT
CNVRT:  MOVS    0,0             ; PUT CHAR. IN LEFT BYTE
        LDA     1,BLNK          ; AND BLANK FILL
        ADD     1,0             ;   RIGHT BYTE
        JMP     0,3
                                ;
BLNK:   40
                                ;
; SUBROUTINE TO STORE A CHARACTER INTO THE LINE BUFFER AT THE
;    LOCATION POINTED TO BY @CPTR ( INPUT CHAR. IN AC0)
;                USES AC1,AC2
                                ;
STORE:  STA     3,SRET          ; SAVE RETURN ADDRESS
                                ;
        LDA     1,@CPTR         ; LOAD BUFFER POINTER
        LDA     2,C20           ; CHECK FOR BUFFER FULL
        SUB#    2,1,SNR         ;   IF SO, TREAT AS A C.R.
        JMP     OUT
                                ;
        LDA     3,.BUFR         ; LOAD ADDRESS OF COM2
        LDA     1,C6            ; LOAD OFFSET FROM START OF COM2 TO
                                ;    START OF ICOM ARRAY
        ADD     1,3
        LDA     1,@CPTR         ; LOAD INPUT BUFFER POINTER
        ADD     1,3
        STA     0,0,3           ; STORE CHAR INTO BUFFER
                                ;
        JMP     @SRET
                                ;
.BUFR:  COM2
C6:     6
SRET:   0
                                ;
; SUBROUTINE TO RESERVE THE SCREEN
;                USES AC0
                                ;
REC:    STA     3,RECRT         ; SAVE RETURN ADDRESS
        LDA     0,.KEY
        .REC
        JMP     @RECRT
                                ;
RECRT:  0
                                ;
; SUBROUTINE TO RELEASE THE SCREEN
;               USES AC0,AC1
                                ;
XMT:    STA     3,XMTRT         ; SAVE RETURN ADDRESS
        LDA     0,.KEY
        .XMT
        JMP     .+1
        JMP     @XMTRT
                                ;
XMTRT:  0
                                ;
.KEY:   KEYS
MSG:    1
                                ;
; BRANCH TO EXIT SUBROUTINE
                                ;
OUT:    JSR     PRINT           ; ECHO THE C.R.
        JSR     @.FRET
                                ;
        .END
```

```
C                                                        **** ITOR ****
      COMPILER NOSTACK
      SUBROUTINE ITOR(IAX,IVAL,XVAL)
C CONVERT COUNTS TO REAL MEASURE (INCHES OR DEGREES)
C
      COMMON /SENS/ ITRSNS,IABRT,JPERF,JMAG,IBUCK,JPROJ
      COMMON /COM9/ PANGLE
      DATA RAD/57.29578/
      DATA TCON/.00895/
      GO TO (10,10,1,2,3,4,4,6,7,8,10,10,13,14,15,16),IAX
C
C  TRUCK AXIS  (IAX = 3)
C       TRACK SENSOR      TRACK COUNT              EQUATION
C             0           0 - 28500        X = FLOAT(COUNT) * C
C             1           0 - 25637        X = FLOAT(COUNT) * C + 65536 * C
C             1       28500 - 32767        X = FLOAT(COUNT) * C
C             1          -1 - -32768       X = FLOAT(COUNT + 32767) + 32769*C
C
C             0       28501 - 32767 SHOULD NEVER OCCUR
C             0          -1 - -32768 SHOULD NEVER OCCUR
C             1       25638 - 28499 SHOULD NEVER OCCUR
C
1     CONTINUE
      IF(ITRSNS.EQ.1) GO TO 11
      XVAL=FLOAT(IVAL)*TCON
      RETURN
11    IF(IVAL.GT.27000) GO TO 130
      IF(IVAL.LT.0) GO TO 12
      XVAL=FLOAT(IVAL)*TCON+586.55
      RETURN
12    XVAL=FLOAT(IVAL)*TCON+586.54
      RETURN
130   XVAL=FLOAT(IVAL)*TCON
      RETURN
C
C  E/W AXIS  (IAX = 4)
C
2     XVAL=FLOAT(IVAL)*.003835+29.04
      RETURN
C
C  N/S AXIS  (IAX = 5)
C
3     XVAL=FLOAT(IVAL)*.003835+24.79
      RETURN
C
C  ROLL AXIS  -   ZERO COUNTS AT 360 DEGREES
C    (IAX = 8)
C
6     CONTINUE
      XVAL=FLOAT(IVAL)*.0131836+360.
      RETURN
C
C  PAN, AND TILT AXES  -  COUNTS 0 TO 360 - NO NEGATIVE NUMBERS
C    (IAX = 6 AND 7)
C
4     CONTINUE
      XVAL=FLOAT(IVAL)*.0131836
      IF(XVAL.LT.0.) XVAL=XVAL+360.
      RETURN
C
C  FOCUS  (IAX = 9)
C
      X=FLOAT(IVAL)*.03767
      XVAL=DIST(X)
      IF(IABS(IVAL-2).LT.3) XVAL=-10000.
      RETURN
C
C  TRANSPORT POSITION -  ANSWER IN DEGREES
C    (IAX = 10)
C
8     XVAL=FLOAT(IVAL)*.022
      RETURN
```

```
C
C OTHERS
C
10        XVAL=0.
          RETURN
C
C MODEL STAND TRUCK
C
13        CONTINUE
          X=FLOAT(IVAL)
          IF(X.LT.0.) X=X+65536.
          XVAL=X*.00895
          RETURN
C
C MODEL STAND YAW
C
14        CONTINUE
          IF(IVAL.NE.100000K) GO TO 142
          XVAL=180.
          RETURN
142       XVAL=FLOAT(IVAL)*.005493164
          RETURN
C
C   MODEL STAND PITCH
C
15        CONTINUE
          X1=FLOAT(IVAL)
          X2=X1*X1
          X3=X2*X1
          X4=X3*X1
          XVAL=-1.34263E-2+2.56913E-3*X1+1.17052E-9*X2+1.24262E-12*X3
     *    -2.4712E-17*X4
          RETURN
C
C   MODEL STAND ROLL
C
16        CONTINUE
          X1=FLOAT(IVAL)/1000.
          X2=X1*X1
          X3=X2*X1
          X4=X3*X1
          X5=X4*X1
          CP1=COS(PANGLE/RAD)
          CP2=SQRT(CP1)
          CP3=CP1**.333333
          IF(IVAL.GT.0) GO TO 162
          XVAL=9.002352E-4+1.018707E+1*X1-3.027251E-1*X2
     *    -1.130368E-4*X3-5.602556E-5*X4-8.46978E-7*X5
     *    +1.133556E-3*X3*CP1+3.081914E-1*X2*CP2-7.582437*X1*CP3
          RETURN
162       CONTINUE
          XVAL=1.548497E-5+1.078763E+1*X1-5.115942E-2*X2
     *    +2.104642E-4*X3*CP1+5.001014E-2*X2*CP2-8.19531*X1*CP3
          RETURN
          END
C                                                          **** RTOI ****
          COMPILER NOSTACK
          SUBROUTINE RTOI(IAX,XVAL,IVAL)
C CONVERT INCHES OR DEGREES TO COUNTS
C
          COMMON /COM9/ PANGLE
          DATA RAD/57.29578/
          DATA TCON/.00895/
          GO TO (9,9,1,2,3,4,4,6,7,8,9,9,13,14,15,16),IAX
C
C TRUCK AXIS  (IAX = 3)
C
C FINAL 16-BIT ANSWER IS GLOBALLY AMBIGUOUS BUT GOOD FOR 'LOCAL' POSITIONING
C         TRACK MEASURE                  EQUATION
C         586.55 - 816.00        I=IFIX [ ( X - 586.55 ) / C ]
C         293.28 - 586.54        I=IFIX [ ( X - 586.55 ) / C ]
C         293.27                 I = 0
C           0.00 - 293.26        I = IFIX [ X / C ]
```

```
C
1       CONTINUE
        IF(XVAL.LE.586.54) GO TO 11
        IVAL=IFIX((XVAL-586.55)/TCON)
        RETURN
11      IF(XVAL.LT.293.2765) GO TO 12
        IVAL=IFIX((XVAL-586.55)/TCON)
        RETURN
12      IF(XVAL.GT.293.2646) GO TO 130
        IVAL=IFIX(XVAL/TCON)
        RETURN
130     IVAL=0
        RETURN
C
C  E/W AXIS  (IAX = 4)
C
2       IVAL=IFIX((XVAL-29.04)/.003835)
        RETURN
C
C  N/S  (IAX = 5) AXIS
C
3       IVAL=IFIX((XVAL-24.79)/.003835)
        RETURN
C
C  ROLL AXIS    -   ZERO COUNTS AT 360 DEGREES
C    (IAX = 8)
C
6       CONTINUE
        X=(XVAL-360.)/.0131836
        IVAL=IFIX(X)
        RETURN
C
C  PAN, AND TILT AXES   -  COUNTS 0 TO 360 - NO NEGATIVE NUMBERS
C    (IAX = 6 AND 7)
C
4       X=XVAL
        IF(XVAL.GT.180.) X=XVAL-360.
        IVAL=IFIX(X/.0131836)
        RETURN
C
C  FOCUS  (IAX = 9)
C
7       CONTINUE
        X=DEG(XVAL)
        IF(X.GT.32767.) X=32767.
        IF(X.LT.0.) X=0.
        IVAL=IFIX(X)
        IF(XVAL.EQ.-10000.) IVAL=0
        RETURN
C
C  TRANSPORT POSITION  (IAX = 10)
C
8       IVAL=IFIX(XVAL/.022)
        RETURN
C
C  OTHERS
C
9       IVAL=0
        RETURN
C
C  MODEL STAND TRUCK
C
13      CONTINUE
        X=XVAL/.00895
        IF(X.GT.32767.) X=X-65536.
        IVAL=IFIX(X)
        RETURN
C
C  MODEL STAND YAW
C
14      CONTINUE
        IF(XVAL.LT.179.99.AND.XVAL.GT.-179.99) GO TO 142
        IF(XVAL.LT.-180.005.OR. XVAL.GT.180.005) GO TO 142
        IVAL=100000K
        RETURN
```

```
142     IVAL=IFIX(XVAL/.005493164)
        RETURN
C
C MODEL STAND PITCH
C
15      CONTINUE
        X1=XVAL
        X2=X1*X1
        X3=X2*X1
        X4=X3*X1
        X5=X4*X1
        X=-.823508+3.85856E+2*X1+8.54627E-3*X2-1.9583E-2*X3
     *  +8.56397E-5*X4+2.91154E-7*X5
        IVAL=IFIX(X)
        RETURN
C
C MODEL STAND ROLL
C
16      CONTINUE
        X1=XVAL/RAD
        X2=X1*X1
        X3=X2*X1
        X4=X3*X1
        X5=X4*X1
        CP=COS(PANGLE/RAD)
        IF(XVAL.GT.0.) GO TO 162
        X=2.061939E-6+5.163433E-2*X1+8.619557*X2+2.189445*X3
     *  +1.061154*X4+3.917092E-1*X5-5.944379*X3*CP
     *  -8.637934*X2*CP+2.205409E+1*X1*CP
        IVAL=IFIX(X*1000.)
        RETURN
162     CONTINUE
        X=2.335953E-6-6.229299E-2*X1+8.717519*X2-2.435494*X3
     *  +1.071646*X4-5.310766E-2*X5-1.170659*X3*CP
     *  -8.740074*X2*CP+2.2173E+1*X1*CP
        IVAL=IFIX(X*1000.)
        RETURN
        END
```

** LISTX **

```
        COMPILER NOSTACK
        OVERLAY ZLIST
        SUBROUTINE LISTX
        COMMON /COM2/ IARG1,IARG2,ARG1,ARG2,ICOM(20),KER
        COMMON /KEYS/ KSCRN
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,IFRM1,
     *  MISC(21),IHIST(32),
     *  AXES(16,20)
        DIMENSION INFO(9,99)
        DATA MSG/1/
C
        CALL STAT("DP4:TAKELIST",IHIST,IER)
        IF(IER.NE.1) GO TO 12
        CALL OPEN(36,"DP4:TAKELIST",0,IER)
        READ(36,100) NUM
100     FORMAT(I4)
        IF(NUM.GT.0) GO TO 20
12      CALL REC(KSCRN,MSG)
        CALL MOVCURS(23,1,IER)
        TYPE " NO TAKES EXIST ON THIS DISKETTE"
        CALL XMT(KSCRN,MSG,$15)
15      CONTINUE
        KER=13
        RETURN
20      READ(36,110) ((INFO(I,J),I=1,9),J=1,NUM)
110     FORMAT(I4,8I5)
        CALL CLOSE(36,IER)
        IF(IARG1.NE.1) GO TO 40
C
C CREATE HARD COPY OF TAKES ON PRINTER
C
        CALL OPEN(12,"$TTO",0,IER)
        WRITE(12,120)
        DO 30 I=1,NUM
        WRITE(12,140)
```

```
140         FORMAT(1H1)
            WRITE(12,130) (INFO(J,I),J=1,9)
30          CONTINUE
            WRITE(12,140)
            CALL CLOSE(12,IER)
            RETURN
C
C DISPLAY TAKES ON SCREEN
C
40          CONTINUE
            I2=0
70          CONTINUE
            CALL CLRSCRN
            CALL REC(KSCRN,MSG)
            CALL MOVCURS(8,1,IER)
            WRITE(10,120)
120         FORMAT(" TAKE    NUMBER OF    STARTING        ENDING       ",
     *      "DATE AND TIME"/
     *      " NUM.  POSITIONS  TAKE FRAME   TAKE FRAME       LAST SHOT"/)
            N=MIN0(10,NUM)
            NUM=NUM-N
            I1=I2+1
            I2=I1+N-1
            DO 50 I=I1,I2
            WRITE(10,130) (INFO(J,I),J=1,9)
130         FORMAT(1X,I3,5X,I3,8X,I4,8X,I4,6X,I2,"/",I2,"/",I2,
     *      2X,I2,":",I2)
50          CONTINUE
            IF(NUM.LE.0) GO TO 55
            CALL MOVCURS(23,1,IER)
            TYPE "HIT C.R. WHEN DONE VIEWING"
            READ(11,150) I
150         FORMAT(A1)
55          CALL XMT(KSCRN,MSG,$60)
60          CONTINUE
            IF(NUM.GT.0) GO TO 70
            RETURN
            END
MRET:   0
        ;
; SUBROUTINE TO DISPLAY A CHARACTER (IN AC0 IN PCHAR FORMAT)
;               USES NO AC'S
        ;
PRINT:  STA     3,PRNRT         ; SAVE RETURN ADDRESS
        .SYSTM
        .PCHAR
        JMP     .+1
        JMP     @PRNRT
                                ;
PRNRT:  0
                                ;
; CONVERT A CHARACTER TO COMMAND LINE FORMAT
                                ;
CNVRT:  MOVS    0,0             ; PUT CHAR. IN LEFT BYTE
        LDA     1,BLNK          ; AND BLANK FILL
        ADD     1,0             ;    RIGHT BYTE
        JMP     0,3
                                ;
BLNK:   40
                                ;
; SUBROUTINE TO STORE A CHARACTER INTO THE LINE BUFFER AT THE
;    LOCATION POINTED TO BY @CPTR  ( INPUT CHAR. IN AC0)
;               USES AC1,AC2
                                ;
STORE:  STA     3,SRET          ; SAVE RETURN ADDRESS
                                ;
        LDA     1,@CPTR         ; LOAD BUFFER POINTER
        LDA     2,C20           ; CHECK FOR BUFFER FULL
        SUB#    2,1,SNR         ;    IF SO, TREAT AS A C.R.
        JMP     OUT
                                ;
        LDA     3,.BUFR         ; LOAD ADDRESS OF COM2
        LDA     1,C6            ; LOAD OFFSET FROM START OF COM2 TO
                                ;    START OF ICOM ARRAY
```

```
          ADD     1,3
          LDA     1,@CPTR         ; LOAD INPUT BUFFER POINTER
          ADD     1,3
          STA     0,0,3           ; STORE CHAR INTO BUFFER
                                  ;
          JMP     @SRET
                                  ;
.BUFR:    COM2
C6:       6
SRE1:     0
                                  ;
; SUBROUTINE TO RESERVE THE SCREEN
;                 USES AC0
                                  ;
REC:      STA     3,RECRT         ; SAVE RETURN ADDRESS
          LDA     0,.KEY
          .REC
          JMP     @RECRT
                                  ;
RECRT:    0
                                  ;
; SUBROUTINE TO RELEASE THE SCREEN
;                 USES AC0,AC1
                                  ;
XMT:      STA     3,XMTRT         ; SAVE RETURN ADDRESS
          LDA     0,.KEY
          LDA     1,MSG
```

** NUTIME **

```
C
      COMPILER NOSTACK
      TASK NUTIME
C DISPLAY NEW TIME AND DATE ON SCREEN
      COMMON /KEYS/ KSCRN
      COMMON /INLIN/ NCHAR
      COMMON /CLOAD/ICPU
      DIMENSION IDATE(3),ITIME(3)
      DATA MSG,IPCT/1,0/
10    CONTINUE
      CALL DATE(IDATE,IER)
      CALL TIME(ITIME,IER)
      CALL REC(KSCRN,MSG)
      CALL MOVCURS(1,60,IER)
      WRITE(10,100) IDATE,ITIME(1),ITIME(2),IPCT
100   FORMAT(1X,I2,"/",I2,"/",I2,2X,I2,":",I2,2X,I3)
      CALL MOVCURS(24,NCHAR+1,IER)
      CALL XMT(KSCRN,MSG,$20)
20    CONTINUE
      ICPU=0
      CALL FDELY(1000)
      IPCT=(1000-ICPU)/10
      GO TO 10
      END
```

```
          .TITL   PFSET

.ENT    PFSET
;-----------------------------------------------------------
; CPU POWER FAIL DETECT SETUP AND INTERRUPT SERVICE
;
;                         ; BIT 2, DEV 44 INIT TO 1 BY "DIGIO"
;         CALL PFSET      ; ATTACHES USER INTERRUPT
;
;         PWR FAIL    ; BIT 2, DEV 44 SET TO 0
;
; PCS
;-----------------------------------------------------------
          .EXTD   .FARL,.FRET
          .EXTN   .UIEX
          .NREL

0
PFSET:    JSR     @.FARL
          LDA     0,DCODE
          LDA     1,DCTA
          .SYSTM                  ; ATTACH USER PF INT
          .IDEF
          JMP     ERR
          JSR     @.FRET          ; RETURN
```

```
ERR:    .SYSTM              ; FATAL ERROR RETURN
        .ERTN

DCODE:  77                  ; PF DEV CODE
DCTA:   DCT                 ; CTRL TBL ADR

DCT:    0                   ; DEV CTRL TBL
        -1                  ; MASK ALL OTHERS
        INTS                ; SERV ADR

INTS:   SUBZ    0,0         ; SET FAIL BIT TO 0 (E-STOP NPL11)
        DOA     0,44
        .UIEX               ; RETURN TO RDOS

.END
```
** PFRST **
```
C
        COMPILER NOSTACK
        SUBROUTINE PFRST
C
C PERFORM POWERFAIL OR EMERGENCY STOP RESET
C
        COMMON /KEYS/ KSCRN
        COMMON /KEY3/ KDIO
        COMMON /CHNL/ ICHNL(24)
        DIMENSION IARRAY(16)
        DATA IARRAY/16*2/
        DATA MSG,LERASE/1,13K/
C
C RE-ENABLE EACH AXIS
C
        DO 10 I=3,10
        CALL RDCAM(ICHNL(I),K)
        CALL WRTCAM(ICHNL(I),K)
10      CONTINUE
        DO 12 I=13,16
        CALL RDCAM(ICHNL(I),K)
        CALL WRTCAM(ICHNL(I),K)
12      CONTINUE
        CALL FDELY(100)
C
C RESET E-STOP SIGNAL
C
        CALL REC(KDIO,MSG)
        IARRAY(2)=1
        CALL DIGOUT(1,IARRAY)
        IARRAY(2)=0
        CALL DIGOUT(1,IARRAY)
        CALL XMT(KDIO,MSG,$5)
5       CONTINUE
C
C FIX-UP SCREEN DISPLAY
C
        CALL REC(KSCRN,MSG)
        CALL MOVCURS(20,1,IER)
        WRITE BINARY(10) LERASE
        CALL XMT(KSCRN,MSG,$20)
20      CONTINUE
        RETURN
        END
```
** PROJ **
```
C
        COMPILER NOSTACK
        SUBROUTINE PROJ
C   ADVANCE THE PROCESS PROJECTOR BY ONE FRAME
C
        COMMON /HEAD/ IBLN1(32),IARRAY(16),IBLN2(848)
        COMMON /KEY3/ KDIO
        COMMON /KEYS/ KSCRN
        DATA MSG/1/
C
        DO 10 I=1,16
10      IARRAY(I)=2
        IARRAY(2)=1
        CALL REC(KDIO,MSG)
        CALL DIGOUT(0,IARRAY)
        CALL XMT(KDIO,MSG,$20)
```

```
20      CONTINUE
        CALL FDELY(33)
        IARRAY(2)=0
        CALL REC(KDIO,MSG)
        CALL DIGOUT(0,IARRAY)
        CALL XMT(KDIO,MSG,$30)
30      CONTINUE
C  SET UP PARAMETER FOR TIME OUT TEST
        CALL TIME(IARRAY,IER)
        ISEC=IARRAY(3)+3
        IF(ISEC.GE.60) ISEC=ISEC-60
C  WAIT FOR RECEIPT OF SET SIGNAL OR TIME OUT
40      CALL DIGIN(0,IARRAY)
        IF(IARRAY(9).EQ.1) GO TO 50
        CALL TIME(IARRAY,IER)
        IF(ISEC.EQ.IARRAY(3)) GO TO 60
        CALL FDELY(50)
        GO TO 40
C  SET SIGNAL RECEIVED
50      RETURN
C  TIME OUT
60      CALL REC(KSCRN,MSG)
        CALL MOVCURS(20,1,IER)
        TYPE " TIME OUT ON PROCESS PROJECTOR"
        CALL XMT(KSCRN,MSG,$65)
65      CONTINUE
        RETURN
        END

COMPILER NOSTACK                                    / *** RANGE ***
        SUBROUTINE RANGE
C---------------------------------------------------------------------
C  RANGE IS A SEPARATE PROCEDURE FOR GENERATING A 16 FRAME TAKE
C         VARYING TIME TO EVALUATE DIFFERENT FILTERS AND TIMES
C
C         THE 16 EXPOSURE SEQUENCE MAY BE REPEATED ANY NUMBER OF TIMES
C
C  PCS
C---------------------------------------------------------------------
        COMMON /KEYS/KSCRN
        COMMON /HEAD/IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,IFRM1,
     *  MISC(21),IHIST(32),
     *  AXES(16,20)
        COMMON /COM2/IARG1,IARG2,ARG1,ARG2,ICOM(20),KER

DIMENSION FRTM(16)

DATA MSG/1/
        DATA LERASE/13K/

CALL CLRSCRN                                        / GET EXPOSURE TIMES
        CALL REC(KSCRN,MSG)
        CALL MOVCURS(10,1,IER)
        TYPE "ENTER 16 EXPOSURE TIMES (SECONDS, -99=ABORT)"
        DO 10 I=1,16
                IL=I+11
                IF(I.GE.9)IL=I+3
                IC=1
                IF(I.GE.9)IC=25
                CALL MOVCURS(IL,IC,IER)
5               WRITE(10,7)I
7               FORMAT(I5" : "Z)
                ACCEPT EXPT
                IF(EXPT.LE.-99.)GO TO 900
                IF(EXPT.LT..0625)GO TO 5
                FRTM(I)=0.5/EXPT
10      CONTINUE
        CALL XMT(KSCRN,MSG,$12)
12      CONTINUE

/ INITIALIZE
        CALL WRTCAM(15K,0)                                  / FORCE SHUTTER CLOSED
        CALL GETFR(ICFR)                                    / GET CURRENT FRAME
```

```
100     CALL REC(KSCRN,MSG)                         ! SHOOT 16 EXPOSURES
        CALL MOVCURS(10,1,IER)
        WRITE BINARY(10)LERASE
        WRITE(10,140)
140     FORMAT(" HIT C.R. TO SHOOT 16 FRAMES (X TO EXIT): "Z)
        READ(11,150)ICHR
150     FORMAT(A1)
        IF(ICHR.EQ.2HX )GO TO 920
        CALL MOVCURS(10,1,IER)
        WRITE BINARY(10)LERASE
        CALL XMT(KSCRN,MSG,$160)
160     CONTINUE

CALL OPNEL                                  ! OPEN ELECTRONIC
        IF(KER.EQ.0) GO TO 170
        CALL DMESS(1)
        RETURN
170     CONTINUE

DO 200 I=1,16
            CALL CIEXP(FRTM(I),I,IER)
            IF(IER.NE.1)GO TO 910
200     CONTINUE

CALL CLOEL                                  ! CLOSE SHUTTER

GO TO 100                                   ! REPEAT

! ERRORS, EXIT
900     CALL XMT(KSCRN,MSG,$905)                    ! DATA ENTRY ABORT
905     CONTINUE
        CALL CLRSCRN
        RETURN
910     CALL REC(KSCRN,MSG)                         ! CIEXP PROBLEM
        CALL MOVCURS(20,1,IER)
        WRITE BINARY(10)LERASE
        IF(IER.EQ.-1)TYPE "** E-STOP **"
        IF(IER.EQ.-2)TYPE "** BUCKLE SWITCHES **"
        CALL XMT(KSCRN,MSG,$915)
915     CONTINUE
        RETURN
920     CALL XMT(KSCRN,MSG,$925)                    ! NORMAL RETUR
925     CONTINUE
        CALL CLRSCRN
        RETURN
        END
C                                                   **** SETFR ****
        COMPILER NOSTACK
        SUBROUTINE SETFR(IFR2)
C SET FRAME  -  MOVES CAMERA MOTOR TO SELECTED FRAME NUMBER
        COMMON /COM2/ IARG1,IARG2,ARG1,ARG2,ICOM(20),KER
        COMMON /SENS/ ITRSNS,IABRT,JPERF,JMAG,IBUCK
        COMMON /KEYS/ KSCRN
        CALL PRI(6)
C CLOSE ELECTRONIC SHUTTER
        CALL CLOEL
        IF(KER.EQ.0) GO TO 20
        CALL DMESS(2)
        GO TO 2
20      CONTINUE
C READ CURRENT FRAME NUMBER
        CALL GETFR(IFR)
C SEE WHICH WAY WE HAVE TO GO
        IF(IFR-IFR2) 1,2,3
C MOVE TRANSPORT FORWARD
1       CONTINUE
        J=IFR2-1
        DX=2021.44
        IFLAG=0
C ASSUME TRANSPORT IS AT 0 COUNTS
11      DO 10 I=IFR,J
        XX=0.
        IF(IFLAG.EQ.1) XX=65536.
        DO 15 K=1,25
        IF(IBUCK.NE.1) GO TO 6
```

```
            CALL REC(KSCRN,MSG)
            CALL MOVCURS(20,1,IER)
            TYPE "** BUCKLE SWITCHES ON **"
            CALL XMT(KSCRN,MSG,$5)
5           CONTINUE
            GO TO 2
6           CONTINUE
            IF(IABRT.NE.1) GO TO 8
            CALL REC(KSCRN,MSG)
            CALL MOVCURS(20,1,IER)
            TYPE "** EMERGENCY STOP IS ON **"
            CALL XMT(KSCRN,MSG,$7)
7           CONTINUE
            GO TO 2
8           CONTINUE
            XX=XX+DX
            IF(XX.GE.65536.) XX=0.
            IF(XX.LT.0.) XX=0.
            X=XX
            IF(X.GE.32768.) X=X-65536.
            KOUNT=IFIX(X)
            CALL WRTCAM(15K,KOUNT)
            CALL FDELY(1)
15          CONTINUE
10          CONTINUE
C   WE'RE ALREADY THERE
2           CONTINUE
            CALL PRI(10)
            RETURN
C   MOVE TRANSPORT BACK
3           CONTINUE
            J=IFR+IFR-IFR2-1
            DX=-2621.44
            IFLAG=1
            GO TO 11
            END
C                                                           **** SETUP ****
            COMPILER NOSTACK
            OVERLAY ZINIT
            SUBROUTINE SETUP(IFLAG)
C   INITIALIZE VARIABLES - SET UP SCREEN DISPLAY
C       IFLAG = 0   -   FULL INITIALIZATION
C             = 1   -   PARTIAL INITIALIZATION
C
            EXTERNAL NUTIME,DIOMON,CAMDISP,JOG
            COMMON /KEYS/ KSCRN
            COMMON /KEY3/ KDIO
            COMMON /HEAD/ IPROD(32),ISEQ(32),ISCEN(32),ICAMAN(32),IDIRCT(32),
        *   ICOMNTS(32),MISC(32),IHIST(32),AXES(16,20)
            DATA MSG,NROLL,NPAGE/1,23K,14K/
C   CLEAR SCREEN AND SET TO PAGE MODE
            TYPE "   <14>"
            IF(IFLAG.EQ.1) GO TO 20
            WRITE BINARY(10) NROLL
            CALL XMT(KSCRN,MSG,$5)
5           CONTINUE
            CALL XMT(KDIO,MSG,$6)
6           CONTINUE
C   SETUP TASK TO DISPLAY TIME ON SCREEN EVERY MINUTE
            CALL ITASK(NUTIME,5,12,IER)
C   SETUP TASK TO DISPLAY CAMERA AXIS DATA
            CALL ITASK(CAMDISP,10,12,JER)
C   SETUP TASK TO PROCESS JOG CONTROLS
            CALL ITASK(JOG,15,11,KER)
C   SETUP TASK TO PERFORM DIGITAL INPUT, SETUP POWER FAIL DETECT
            CALL ITASK(DIOMON,30,8,LER)
            CALL PFSET
            IF(IER+JER+KER+LER.EQ.4) GO TO 20
            TYPE "PROBLEM IN SETUP   -   ERROR CODES=",IER,JER,KER,LER
            CALL EXIT
20          CONTINUE
C   SET PRIORITY OF MAIN TASK TO 10
            CALL PRI(10)
```

```
C
C CHECK FOR FLOPPY READY
C
        CALL INIT("DP4",0,IER)
        IF(IER.EQ.1) GO TO 39
 34     CALL RLSE("DP4",IER)
        IF(IER.NE.1) GO TO 36
        CALL INIT("DP4",0,IER)
        GO TO 39
 36     CONTINUE
        CALL REC(KSCRN,MSG)
        CALL MOVCURS(10,1,IER)
        TYPE " FLOPPY NOT READY  -  TURN ON DRIVE,"
        TYPE " LOAD FLOPPY, AND HIT RETURN"
        READ(11,100) I
100     FORMAT(A1)
        CALL XMT(KSCRN,MSG,$37)
 37     CONTINUE
        CALL CLRSCRN
        CALL INIT("DP4",0,IER)
        IF(IER.NE.1) GO TO 34
C FLOPPY IS READY
 39     CONTINUE
        DO 10 I=1,32
        IPROD(I)=2H
        ISCEN(I)=2H
 10     CONTINUE
        CALL HEADN
        RETURN
        END
        COMPILER NOSTACK                              ; *** SLATE ***
        SUBROUTINE SLATE
;------------------------------------------------------------------
; SLATE IS A SEPARATE PROCEDURE FOR FILMING A "SLATE" TAKE.  EXPOSURE
;       TIME IS SPECIFIED AS THE FIRST CMD ARGUMENT, AND NO. OF
;       FRAMES IS AN OPTIONAL SECOND ARGUMENT.
;
; PCS
;------------------------------------------------------------------
        COMMON /KEYS/KSCRN
        COMMON /HEAD/IPROD(32),ISEQ(32),ISCEN(32),ICAMAN(32),IDIRCT(32),
      * ICOMNTS(32),LENS,IPERF,FRATE,EXPS,ICS,NPOS,ISH,LASTF,IFRM1,
      * MISC(21),IHIST(32),
      * AXES(16,20)
        COMMON /COM2/IARG1,IARG2,ARG1,ARG2,ICOM(20),KER

DATA MSG,LERASE,NFR/1,13K,10/

CALL CLRSCRN
        CALL REC(KSCRN,MSG)
        CALL MOVCURS(10,1,IER)
        IF(ARG1.EQ.-100000.)GO TO 900              ; CHK EXPOSURE SPECIFIED
        IF((ARG1.LT..0025).OR.(ARG1.GT.600.))GO TO 910
        FRTM=0.5/ARG1
        NFRM=NFR
        IF(ARG2.EQ.-100000.)GO TO 10               ; CHK FOR OPTIONAL NO. OF
        IF((IARG2.LT.1).OR.(IARG2.GT.99))GO TO 920 ; FRAMES
        NFRM=IARG2

13     WRITE(10,15)NFRM,ARG1
 15     FORMAT(" HIT C.R. TO SLATE"I3" FRAMES AT"F7.3" SEC  (X TO EXIT): "Z)
        READ(11,25)ICHR
 25     FORMAT(A1)
        IF(ICHR.EQ.2HX )GO TO 940
        CALL MOVCURS(10,1,IER)
        WRITE BINARY(10)LERASE
        CALL XMT(KSCRN,MSG,$30)
 30     CONTINUE

CALL WRTCAM(15K,0)                         ; FORCE MECH SHUTTER TO
        CALL OPNEL                                 ; OPEN ELECTRONIC SHUTTER
        IF(KER.EQ.0) GO TO 35
        CALL DMESS(1)
        RETURN
```

```
35      CONTINUE

DO 100 I=1,NFRM                                 ; SHOOT
            CALL CIEXP(FRTM,I,IER)
            IF(IER.NE.1)GO TO 930
100     CONTINUE

CALL CLOEL                                      ; CLOSE ELECTRONIC SHUTT

CALL GETFR(ICFR)                                ; BLACK OUT ONE FRAME
        ICFR=ICFR+1
        CALL SETFR(ICFR)

CALL CLRSCRN
        RETURN                                          ; EXIT

; ERRORS
900     TYPE "EXPOSURE MUST BE SPECIFIED"               ; EXPOSURE NOT ENTERED
        GO TO 999
910     TYPE "EXPOSURE TIME OUT OF RANGE"               ; EXPOSURE TIME ERROR
        GO TO 999
920     TYPE "NO. OF FRAMES OUT OF RANGE"               ; FRAME NO. ERROR
        GO TO 999
930     CALL REC(KSCRN,MSG)
        CALL MOVCURS(20,1,IER)
        WRITE BINARY(10)LERASE
        IF(IER.EQ.-1)TYPE "*** E-STOP ***"
        IF(IER.EQ.-2)TYPE "*** BUCKLE SWITCHES ***"
        GO TO 999
940     CALL XMT(KSCRN,MSG,$941)                        ; USER ABORT
941     CONTINUE
        CALL CLRSCRN
        RETURN
999     CALL XMT(KSCRN,MSG,$1000)
1000    CONTINUE
        RETURN
        END
C                                                       **** EDITX ****
        COMPILER NOSTACK
        OVERLAY ZEDIT
        SUBROUTINE EDITX
C
C ENTER EDIT MODE FOR TAKE NTAKE
C IF KFLAG = 0  REGULAR MODE  - READ INFO ON PRE-EXISTING FILE
C    KFLAG = 1  CREATE MODE   - JUST OPEN FILE, DO NOT READ
C
        COMMON /COM1/ NTAKE,IPOS,IFILE(6)
        COMMON /COM2/ IARG1,IARG2,ARG1,ARG2,ICOM(20),KER
        COMMON /COM3/ KFLAG
        COMMON /COM7/ LOKED
        COMMON /CHNL/ ICHNL(24)
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,
     *  MISC(22),IHIST(32),
     *  AXES(16,20)
        COMMON /KEYS/ KSCRN
        DIMENSION IARRAY(640)
        EQUIVALENCE (IARRAY,AXES)
        DATA MSG/1/
C
        LOKED=0
        IF(KFLAG.EQ.1) GO TO 50
C MAKE SURE THAT THE TAKE EXISTS
        CALL STAT("DP4:TAKELIST",IARRAY,IER)
        IF(IER.EQ.1) GO TO 20
        CALL REC(KSCRN,MSG)
        CALL MOVCURS(15,1,IER)
        TYPE " NO TAKES EXIST ON THIS DISKETTE"
        CALL XMT(KSCRN,MSG,$19)
19      CONTINUE
        RETURN
```

```
20      CONTINUE
        CALL OPEN(36,"DP4:TAKELIST",0,IER)
        READ(36,100) NUM
        DO 10 I=1,NUM
        READ(36,100) J,K
100     FORMAT(I4,18X,I2)

IF(IARG1.EQ.J) GO TO 6
10      CONTINUE
C TAKE DOES NOT EXIST
        CALL ERMESS(7)
        CALL CLOSE(36,IER)
        RETURN
C SET EDIT LOCK IF THIS TAKE HAS ALREADY BEEN FILMED
6       CONTINUE
        IF(K.NE.0) LOKED=1
        CALL CLOSE(36,IER)
50      NTAKE=IARG1
C OPEN FILE
        CALL GETNAME(NTAKE)
        IF(KFLAG.EQ.1) CALL CFILW(IFILE,1,IER)
        CALL OPEN(40,IFILE,0,IER,64)
C SKIP READ IF FILE JUST CREATED
        IF(KFLAG.EQ.1) GO TO 52
        CALL READR(40,0,IPROD,8,IER)
        CALL READR(40,8,IARRAY,NPOS,IER)
52      CALL HEADN
C SET UP SCREEN FOR EDIT MODE
        IPOS=1
        CALL REC(KSCRN,MSG)
        CALL MOVCURS(2,69,IER)
        WRITE(10,120) NTAKE
120     FORMAT(I3)
        CALL XMT(KSCRN,MSG,$55)
55      CONTINUE
C SET DEFAULT VALUES IF THIS IS A NEW TAKE (KFLAG.EQ.1)
C AND THE AXIS VALUES WEREN'T COPIED
        IF(KFLAG.EQ.0) GO TO 60
        IF(NPOS.GT.1) GO TO 60
        AXES(1,1)=1.
        DO 58 I=3,16
        IF(I.EQ.10) GO TO 58
        IF(I.EQ.11) GO TO 58
        IF(I.EQ.12) GO TO 58
        CALL RDCAM(ICHNL(I),K)
        CALL ITOR(I,K,AXES(I,1))
58      CONTINUE
        AXES(10,1)=AXES(9,1)
        NPOS=1
60      CONTINUE
        CALL AXDISP
        CALL EDCOM
        RETURN
        END
C                                                       **** EDCOM ****
        COMPILER NOSTACK
        SUBROUTINE EDCOM
C PROCESS EDIT COMMANDS
C
        COMMON /CHNL/ ICHNL(24)
        COMMON /COM1/ NTAKE,IPOS,IFILE(6)
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,IFRM1,IPROJ,
     *  IMODL,
     *  MISC(19),IHIST(32),
     *  AXES(16,20)
        COMMON /COM2/ IARG1,IARG2,ARG1,ARG2,ICOM(20),KER
        COMMON /COM5/ ISMTH,ISTP
        COMMON /COM7/ LOKED
        COMMON /COM8/ ICAM,ICAR,IBLN3(20)
        COMMON /INLIN/ NCHAR
        COMMON /KEYS/ KSCRN
        DATA MSG,L,M/1,27K,13K/
```

```
C
        KER=0
        ICHNG=0
10      CONTINUE
        IF(ICHNG.EQ.1) CALL CLRSCRN
        ICHNG=0
        CALL GETCOM(N)
        GO TO (95,95,95,95,95,95,94,95,95,34,27,28,95,95,
     *  11,12,13,14,15,16,17,18,19,20,21,22,23,
     *  24,25,26,20,21,29,29,95,30,31,32,33,35,95,36),N
C
C DISPLAY
C
11      CALL DISPX
        GO TO 10
C
C ADD
C
12      CONTINUE
        IF(LOKED.EQ.1) GO TO 96
        IF(IARG1.LT.1) GO TO 124
        IF(IARG1.GT.1975) GO TO 124
        ICHNG=1
        CALL ADDX
        GO TO 10
C NOT A VALID POSITION NUMBER
124     CALL ERMESS(4)
        GO TO 10
C
C DELETE
C
13      CONTINUE
        IF(LOKED.EQ.1) GO TO 96
        IF(NPOS.EQ.1) GO TO 132
        ICHNG=1
        CALL DELX
        GO TO 10
C CANNOT DELETE LAST POSITION
132     CALL ERMESS(4)
        GO TO 10
C
C UPDATE
C
14      CONTINUE
        IF(LOKED.EQ.1) GO TO 96
        ICHNG=1
        IF(ICAM.EQ.0)GOTO 145
        DO 142 I=3,9
        CALL RDCAM(ICHNL(I),K)
        CALL ITOR(I,K,AXES(I,IPOS))
142     CONTINUE
        AXES(10,IPOS)=AXES(9,IPOS)
        IF(AXES(9,IPOS).EQ.-10000.) AXES(10,IPOS)=999999.
        CALL AXDISP
        GO TO 10
145     DO 146 I=13,16
        CALL RDCAM(ICHNL(I),K)
        CALL ITOR(I,K,AXES(I,IPOS))
146     CONTINUE
        CALL AXDISP
        GO TO 10
C
C MOVE
C
15      CONTINUE
        IF(ICAM.EQ.0.AND.IMODL.EQ.1) GO TO 364
        IARG1=IPOS
        CALL MVCAM
        GO TO 10
C
C END
C
16      CALL ENDX
        RETURN
```

```
C
C POSITION
C
17        CONTINUE
          IF(IARG1.LT.1) GO TO 171
          IF(IARG1.LE.NPOS) GO TO 172
C POSITION NOT FOUND
171       CALL ERMESS(2)
          GO TO 10
172       IPOS=IARG1
          CALL AXDISP
          GO TO 10
C
C FRAME
C
18        CONTINUE
          IF(LUKED.EQ.1) GO TO 96
          IF(IARG1.LT.1) GO TO 57
          IF(IPOS.EQ.1) GO TO 52
          IFR=IFIX(AXES(1,IPOS-1))
          IF(IARG1.LT.IFR) GO TO 58
          IF(IARG1.EQ.IFR) GO TO 59
52        IF(IARG1.GT.1975) GO TO 57
          IF(IPOS.EQ.NPOS) GO TO 54
          IFR=IFIX(AXES(1,IPOS+1))
          IF(IARG1.GT.IFR) GO TO 58
          IF(IARG1.EQ.IFR) GO TO 59
54        AXES(1,IPOS)=ARG1
          CALL AXDISP
          ICHNG=1
          GO TO 10
C SELECTED FRAME NUMBER IS INVALID
57        CALL ERMESS(9)
          GO TO 10
C CANNOT RESEQUENCE POSITIONS WITH "FRAME" COMMAND
58        CALL ERMESS(9)
          GO TO 10
C ATTEMPT TO OVERWRITE EXISTING POSITION
59        CALL ERMESS(1)
          GO TO 10
C
C TRUCK
C
19        CONTINUE
          IF(LUKED.EQ.1) GO TO 96
          IF(ICAM.EQ.0) GO TO 10
          IF(ARG1.GT.795.) GO TO 192
          IF(ARG1.LT.0.) GO TO 192
          AXES(3,IPOS)=ARG1
          CALL AXDISP
          ICHNG=1
          GO TO 10
C AXIS VALUE OUT OF RANGE
192       CALL ERMESS(8)
          GO TO 10
C
C EAST/WEST
C
20        CONTINUE
          IF(LUKED.EQ.1) GO TO 96
          IF(ARG1.GT.68.) GO TO 202
          IF(ARG1.LT.32.) GO TO 202
          AXES(4,IPOS)=ARG1
          CALL AXDISP
          ICHNG=1
          GO TO 10
C AXIS VALUE OUT OF RANGE
202       CALL ERMESS(8)
          GO TO 10
C
C NORTH/SOUTH
C
21        CONTINUE
          IF(LUKED.EQ.1) GO TO 96
          IF(ARG1.GT.72.) GO TO 212
```

```
          IF(ARG1.LT.28.) GO TO 212
          AXES(5,IPOS)=ARG1
          CALL AXDISP
          ICHNG=1
          GO TO 10
C AXIS VALUE OUT OF RANGE
212       CALL ERMESS(8)
          GO TO 10
C
C PAN
C
22        CONTINUE
          IF(LOKED.EQ.1) GO TO 96
          IF(ARG1.EQ.-100000.) GO TO 221
          IF(ARG1.GT.360.) GO TO 222
          IF(ARG1.LT.0.) GO TO 222
221       AXES(6,IPOS)=ARG1
          CALL AXDISP
          ICHNG=1
          GO TO 10

C AXIS VALUE OUT OF RANGE
222       CALL ERMESS(8)
          GO TO 10
C
C TILT
C
23        CONTINUE
          IF(LOKED.EQ.1) GO TO 96
          IF(ARG1.EQ.-100000.) GO TO 231
          IF(ARG1.GT.360.) GO TO 232
          IF(ARG1.LT.0.) GO TO 232
231       AXES(7,IPOS)=ARG1
          CALL AXDISP
          ICHNG=1
          GO TO 10
C AXIS VALUE OUT OF RANGE
232       CALL ERMESS(8)
          GO TO 10
C
C ROLL
C
24        CONTINUE
          IF(LOKED.EQ.1) GO TO 96
          IF(ICAM.EQ.0) GO TO 10
          IF(ARG1.GT.720.) GO TO 242
          IF(ARG1.LT.0.) GO TO 242
          AXES(8,IPOS)=ARG1
          CALL AXDISP
          ICHNG=1
          GO TO 10
C AXIS VALUE OUT OF RANGE
242       CALL ERMESS(8)
          GO TO 10
C
C FOCUS
C
25        CONTINUE
          IF(LOKED.EQ.1) GO TO 96
          IF(ARG1.EQ.-100000.) GO TO 251
          IF(ARG1.EQ.-10000.) GO TO 251
          IF(ARG1.LT.0.) GO TO 252
251       AXES(9,IPOS)=ARG1
          CALL AXDISP
          ICHNG=1
C CHANGE POI TO MATCH FOCUS
          GO TO 26
C AXIS VALUE OUT OF RANGE
252       CALL ERMESS(8)
          GO TO 10
C
C POINT OF INTEREST
C
26        CONTINUE
          IF(LOKED.EQ.1) GO TO 96
          IF(ARG1.EQ.-100000.) GO TO 261
```

```
              IF(ARG1.EQ.-10000.) ARG1=999999.
              IF(ARG1.LT.0.) GO TO 262
261           AXES(10,IPOS)=ARG1
              CALL AXDISP
              ICHNG=1
              GO TO 10
C AXIS  VALUE OUT OF RANGE
262           CALL ERMESS(8)
              GO TO 10
C
C   OPEN THE SHUTTERS
C
27            CALL OPNSH
              IF(KER.EQ.0) GO TO 10
              CALL DMESS(1)
              GO TO 10
C
C   CLOSE THE SHUTTERS
C
28            CALL CLOSH
              IF(KER.EQ.0) GO TO 10
              CALL DMESS(2)
              GO TO 10
C
C   PROCESS PROJECTOR
C
29            CONTINUE
              CALL CLRSCRN
              CALL REC(KSCRN,MSG)
              CALL MOVCURS(12,1,IER)
              WRITE(10,291) IPROJ
291           FORMAT("     CURRENT MODE = ",I3//
     *        20X,"-N  -  SKIP FRAME, SHOOT EVERY N-TH PROJECTOR FRAME"/
     *        20X,"-3  -  SKIP FRAME, SHOOT EVERY 3-RD PROJECTOR FRAME"/
     *        20X,"-2  -  SKIP FRAME, SHOOT EVERY 2-ND PROJECTOR FRAME"/
     *        20X," 0  -  EXIT, DO NOT USE PROCESS PROJECTOR"/
     *        20X," 1  -  NORMAL, ONE FOR ONE, SHOOT EVERY PROJECTOR FRAME ONCE"/
     *        20X," 2  -  DOUBLE FRAME, SHOOT EVERY PROJECTOR FRAME TWICE"/
     *        20X," 3  -  TRIPLE FRAME, SHOOT EVERY PROJECTOR FRAME THREE TIMES"/
     *        20X,"     ETC."/)
              IF(LOKED.EQ.1) GO TO 294
              WRITE(10,293)
293           FORMAT("     ENTER NEW MODE : ",Z)
              ACCEPT IPROJ
294           CALL XMT(KSCRN,MSG,$292)
292           IF(LOKED.EQ.1) CALL FDELY(100)
              CALL CLRSCRN
              GO TO 10
C
C MODEL TRUCK
C
30            CONTINUE
              IF(LOKED.EQ.1)GO TO 96
              IF(ICAM.EQ.1) GO TO 10
              IF(IMODL.EQ.1) GO TO 364
              IF(ARG1.GT.360.)GO TO 302
              IF(ARG1.LT.0.)GO TO 302
              AXES(13,IPOS)=ARG1
              CALL AXDISP
              ICHNG=1
              GO TO 10
C
C AXIS VALUE OUT OF RANGE
C
302           CALL ERMESS(8)
              GO TO 10
C
C MODEL YAW
C
31            CONTINUE
              IF(LOKED.EQ.1)GO TO 96
              IF(ICAM.EQ.1) GO TO 10
              IF(IMODL.EQ.1) GO TO 364
```

```
C          IF(ARG1.GT.260.)GO TO 312
C          IF(ARG1.LT.-75.)GO TO 312
           AXES(14,IPOS)=ARG1
           CALL AXDISP
           ICHNG=1
           GO TO 10
C
C AXIS VALUE OUT OF RANGE
C
312        CALL ERMESS(8)
           GO TO 10
C
C MODEL PITCH
C
32         CONTINUE
           IF(LOKED.EQ.1)GO TO 96
           IF(ICAM.EQ.1) GO TO 10
           IF(IMODL.EQ.1) GO TO 364
           IF(ARG1.GT.35.)GO TO 322
           IF(ARG1.LT.-35.)GO TO 322
           AXES(15,IPOS)=ARG1
           CALL AXDISP
           ICHNG=1
           GO TO 10
C
C AXIS VALUE OUT OF RANGE
C
322        CALL ERMESS(8)
           GO TO 10
C
C MODEL ROLL
C
33         CONTINUE
           IF(LOKED.EQ.1)GO TO 96
           IF(ICAM.EQ.1) GO TO 10
           IF(IMODL.EQ.1) GO TO 364
           IF(ARG1.GT.30.)GO TO 332
           IF(ARG1.LT.-25.)GO TO 332
           AXES(16,IPOS)=ARG1
           CALL AXDISP
           ICHNG=1
           GO TO 10
C
C AXIS VALUE OUT OF RANGE
C
332        CALL ERMESS(8)
           GO TO 10
C
C   LOAD LENS
C
35         CALL WRTCAM(13K,0)
           GO TO 10
C
C   E-STOP RESET
C
34         CALL PFRST
           GO TO 10
C
C   MODEL STAND LOCKOUT
C
36         CONTINUE
           J=IMODL+IMODL+LOKED+1
           GO TO (361,362,363,364),J
361        IMODL=1
           CALL DMESS(3)
           GO TO 10
362        CALL DMESS(4)
           GO TO 10
363        IMODL=0
           CALL DMESS(4)
           GO TO 10
364        CALL DMESS(3)
           GO TO 10
C
C HELP
```

```
C
94      CONTINUE
C       CALL EDHELP
        GO TO 10
C
C NON-EDIT COMMANDS
C
95      CALL ERMESS(6)
        GO TO 10
C
C CANNOT MODIFY A TAKE THAT HAS BEEN FILMED
C
96      CALL ERMESS(11)
        GO TO 10
        END
C                                                       **** ADDX ****
        COMPILER NOSTACK
        SUBROUTINE ADDX
C ADD A POSITION
        COMMON /COM1/ NTAKE,IPOS,IFILE(6)
        COMMON /COM2/ IARG1,IARG2,ARG1,ARG2,ICOM(20),KER
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,
     *  MISC(22),IHIST(32),
     *  AXES(16,20)
C
C FIND WHERE TO ADD THE NEW POSITION
        DO 10 I=1,NPOS
        IF(ARG1.GT.AXES(1,I)) GO TO 10
        GO TO 20
10      CONTINUE
C ADD POINT AT END
        NPOS=NPOS+1
        I=NPOS
        GO TO 40
20      IF(ARG1.NE.AXES(1,I)) GO TO 30
C ADD COMMAND DUPLICATES EXISTING POINT
        CALL ERMESS(1)
        RETURN
C ADD POINT AT I AND MOVE OTHER POINTS OUT
30      NPOS=NPOS+1
        I2=NPOS+1
        I1=I2-1
35      I1=I1-1
        I2=I2-1
        IF(I1.LT.I) GO TO 40
        DO 38 J=1,16
38      AXES(J,I2)=AXES(J,I1)
        GO TO 35
40      AXES(1,I)=ARG1
        IPOS=I
        J=I-1
        IF(J.EQ.0) J=1
        DO 50 K=3,16
50      AXES(K,I)=AXES(K,J)
        CALL AXDISP
        RETURN
        END
C                                                       **** DELX ****
        COMPILER NOSTACK
        SUBROUTINE DELX
C DELETE A POSITION
C
        COMMON /COM1/ NTAKE,IPOS,IFILE(6)
        COMMON /COM2/ IARG1,IARG2,ARG1,ARG2,ICOM(20),KER
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,
     *  MISC(23),IHIST(32),
     *  AXES(16,20)
C
C FIND WHICH POSITION TO DELETE
        DO 10 I=1,NPOS
        IF(ARG1.NE.AXES(1,I)) GO TO 10
        GO TO 20
10      CONTINUE
```

```
C POSITION NOT FOUND
        CALL ERMESS(2)
        RETURN
20      CONTINUE
        IF(I.NE.NPOS) GO TO 30
C DELETE LAST POINT
        NPOS=NPOS-1
        IPOS=NPOS
        CALL AXDISP
        RETURN
C DELETE POSITION AND MOVE UP OTHER POINTS
30      N=NPOS-1
        DO 35 J=I,N
        JJ=J+1
        DO 35 K=1,16
35      AXES(K,J)=AXES(K,JJ)
        DO 40 K=1,16
40      AXES(K,NPOS)=0.
        NPOS=NPOS-1
        IF(IPOS.EQ.NPOS+1) IPOS=NPOS
        CALL AXDISP
        RETURN
        END
C                                                         **** DISPX ****
        COMPILER NOSTACK
        SUBROUTINE DISPX
        COMMON /COM1/ NTAKE,IPOS,IFILE(6)
        COMMON /COM2/ IARG1,IARG2,ARG1,ARG2,ICOM(20),KER
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,
     *  MISC(22),IHIST(32),
     *  AXES(16,20)
        COMMON /KEYS/ KSCRN
        COMMON /COM8/ ICAM,IBLN3(21)
        DIMENSION ID(3),IT(3)
        DATA MSG/1/
        ISEQ(1)=-1
        ISEQ(2)=0
        ISEQ(3)=40000K
        IOUT=10
        IF(IARG1.NE.1) CALL CLRSCRN
        IF(IARG1.NE.1) CALL REC(KSCRN,MSG)
        IF(IARG1.EQ.1) CALL APPEND(12,"STTO",ISEQ,IER)
        IF(IARG1.EQ.1) IOUT=12
        CALL DATE(ID,IER)
        CALL TIME(IT,IER)
        IF(IARG1.EQ.1) WRITE(12,110) ID,IT(1),IT(2),NTAKE
110     FORMAT("1",5X,I2,"/",I2,"/",I2,3X,I2,":",I2,
     *  8X,"POSITION DATA FOR TAKE ",I3//
     *  "   FRAME   TRUCK      E/W       N/S       PAN       TILT    ",
     *  "ROLL     FOCUS     POI  M. TRUCK  M. YAW  M. PITCH  M. ROLL"//)
        IF(IARG1.NE.1) CALL MOVCURS(9,1,IER)
        N=NPOS
        DO 80 I=1,N
        IF(I.NE.11) GO TO 15
        IF(IARG1.EQ.1) GO TO 15
        CALL MOVCURS(20,1,IER)
        TYPE "  MORE TO COME  -  HIT C.R. WHEN DONE VIEWING"
        READ(11,170) III
170     FORMAT(A1)
        CALL XMT(KSCRN,MSG,$13)
13      CONTINUE
        CALL CLRSCRN
        CALL REC(KSCRN,MSG)
        CALL MOVCURS(9,1,IER)
15      CONTINUE
        IFR=IFIX(AXES(1,I))
        WRITE(IOUT,100) I,IFR
100     FORMAT(1X,I2,I5,Z)
        J1=3
        J2=10
        IF(ICAM.EQ.0) J1=13
        IF(ICAM.EQ.0) J2=16
        IF(IARG1.EQ.1) J1=3
        IF(IARG1.EQ.1) J2=16
```

```
              DO 50 J=J1,J2
              IF(J.EQ.11) GO TO 50
              IF(J.EQ.12) GO TO 50
              IF(AXES(J,I).EQ.-100000.) GO TO 20
              IF(AXES(J,I).EQ.-10000.) GO TO 30
              WRITE(IOUT,120) AXES(J,I)
120           FORMAT(1X,F9.2,Z)
              GO TO 50
20            WRITE(IOUT,130)
130           FORMAT(10X,Z)
              GO TO 50
30            WRITE(IOUT,160)
160           FORMAT(1X,"   INF   ",Z)
50            CONTINUE
              IF(IARG1.EQ.0) WRITE(IOUT,135)
135           FORMAT( )
              IF(IARG1.EQ.1) WRITE(IOUT,140)
140           FORMAT(/)
80            CONTINUE
              IF(IARG1.EQ.1) CALL CLOSE(12,IER)
              IF(IARG1.EQ.1) RETURN
              CALL XMT(KSCRN,MSG,$85)
85            CONTINUE
              RETURN
              END
C                                                           **** AXDISP ****
              COMPILER NOSTACK
              SUBROUTINE AXDISP
C DISPLAY AXIS DATA FOR IPOS
C
              COMMON /HEAD/ IPROD(32),ISEQ(32),ISCEN(32),ICAMAN(32),
     *        IDIRCT(32),ICOMNTS(32),MISC(32),IHIST(32),AXES(16,20)
              COMMON /COM1/ NTAKE,IPOS,IFILE(6)
              COMMON /KEYS/ KSCRN
              COMMON /COM8/ ICAM,IBLN3(21)
              DATA MSG/1/
              DATA LERASE/13K/
              IFR=IFIX(AXES(1,IPOS))
              CALL REC(KSCRN,MSG)
              CALL MOVCURS(6,1,IER)
              WRITE BINARY(10) LERASE
              WRITE(10,100)
100           FORMAT(" DATA:  ",Z)
              J1=3
              J2=10
              IF(ICAM.EQ.0) J1=13
              IF(ICAM.EQ.0) J2=16
              DO 30 I=J1,J2
              IF(AXES(I,IPOS).EQ.-100000.) GO TO 20
              IF(AXES(I,IPOS).EQ.-10000.) GO TO 40
              WRITE(10,110) AXES(I,IPOS)
110           FORMAT(1X,F9.2,Z)
              GO TO 30
40            WRITE(10,140)
140           FORMAT(1X,"   INF   ",Z)
              GO TO 30
20            WRITE(10,120)
120           FORMAT(1X,9X,Z)
30            CONTINUE
              WRITE(10,130) IFR,IPOS
130           FORMAT(/" FRAME: ",I5,"  POSITION ",I3)
              CALL XMT(KSCRN,MSG,$50)
50            CONTINUE
              RETURN
              END
C                                                           **** ENDX ****
              COMPILER NOSTACK
              SUBROUTINE ENDX
C PERFORM END COMMAND
C   WRITE OUT LATEST DATA VALUES TO DISK
C   CLOSE TAKE FILE
C
              COMMON /COM1/ NTAKE,IPOS,IFILE(6)
              COMMON /COM2/ IARG1,IARG2,ARG1,ARG2,ICOM(20),KER
              COMMON /COM7/ LOKED
```

```
        COMMON /KEYS/ KSCRN
        COMMON /HEAD/ IPROD(32),ISEQ(32),ISCEN(32),ICAMAN(32),IDIRCT(32),
      * ICOMNTS(32),LENS,IPERF,FRATE,EXPS,ISC,NPOS,ISH,LASTF,IFRM1,IPROJ,
      * IMODL,
      * MISC(19),IHIST(32),
      * AXES(16,20)
        DIMENSION IARRAY(640),ID(3),IT(3),INFO(9,99)
        EQUIVALENCE (IARRAY,AXES)
        DATA LERASE/13K/,LNEXT/32K/
        DATA MSG/1/
C
        CALL REC(KSCRN,MSG)
        CALL MOVCURS(6,1,IER)
        WRITE BINARY(10) LERASE,LNEXT,LERASE
        CALL MOVCURS(2,69,IER)
        WRITE(10,110)
110     FORMAT("  ")
        CALL XMT(KSCRN,MSG,$30)
30      CONTINUE
        LASTF=IFIX(AXES(1,NPOS))
        IFRM1=IFIX(AXES(1,1))
        CALL WRITR(40,0,IPROD,8,IER)
X       TYPE "AFTER FIRST CALL TO WRITR, IER=",IER
        CALL WRITR(40,8,IARRAY,NPOS,IER)
X       TYPE "AFTER SECOND CALL TO WRITR, IER,NPOS=",IER,NPOS
        IF(IER.EQ.1) GO TO 10
        TYPE "PROBLEM IN ENDX  - IER=",IER
        CALL RESET
        CALL EXIT
C
10      CONTINUE
        CALL CLOSE(40,IER)
        LENS=0
X       TYPE "AFTER CLOSE COMMAND, IER=",IER
C UPDATE FILE 'TAKELIST'
        IF(LOOKED.EQ.1) GO TO 67
        CALL OPEN(36,"DP4:TAKELIST",0,IER)
        READ(36,120) NUM
120     FORMAT(I4)
        IF(NUM.LE.99) GO TO 45
        TYPE " TOO MANY TAKES  - NUM=",NUM
        CALL RESET
        CALL EXIT
45      CONTINUE
        IF(NUM.EQ.0) GO TO 54
        READ(36,130) ((INFO(I,J),I=1,9),J=1,NUM)
130     FORMAT(I4,8I5)
        REWIND 36
        DO 50 I=1,NUM
        IF(NTAKE.EQ.INFO(1,I)) GO TO 53
        IF(NTAKE.LT.INFO(1,I)) GO TO 55
50      CONTINUE
C NEW TAKE SHOULD BE PUT AT END OF 'TAKELIST'
54      REWIND 36
        I=NUM+1
        GO TO 55
C TAKE ALREADY EXISTED  - UPDATE INFO IN 'TAKELIST'
53      J1=I-1
        J2=I+1
        IF(I.EQ.NUM) J2=NUM
        N=NUM
        GO TO 57
C PLACE FOR NEW TAKE FOUND  - JUST BEFORE TAKE IN I-TH POSITION
55      J2=I
        J1=I-1
        N=NUM
        NUM=NUM+1
57      WRITE(36,125) NUM
125     FORMAT(I5)
        IF(J1.EQ.0) GO TO 60
C WRITE PRIOR TAKES
        WRITE(36,135) ((INFO(I,J),I=1,9),J=1,J1)
135     FORMAT(9I5)
C WRITE NEW TAKE
C ZERO OUT DATA AND TIME FIRST SHOT
```

```
60      WRITE(36,145) NTAKE,NPOS,IFRM1,LASTF
145     FORMAT(4I5,"   0     0     0     0     0")
        IF(J2.EQ.NUM) GO TO 65
C WRITE SUBSEQUENT TAKES
        WRITE(36,135) ((INFO(I,J),I=1,9),J=J2,N)
65      CALL CLOSE(36,IER)
C ZERO OUT AXIS DATA FOR NEXT TAKE
67      CONTINUE
        DO 20 I=1,16
        DO 20 J=1,10
20      AXES(I,J)=0.
        IMODL=0
        IPROJ=0
        NTAKE=0
        CALL CLRSCRN
        RETURN
        END
C                                                           **** SHOOT ****
        COMPILER NOSTACK
        OVERLAY ZSHOOT
        SUBROUTINE SHOOT(NOFLM)
C
        EXTERNAL FLMDISP,TIMER,DISKIN,IDLE
        COMMON /KEYS/ KSCRN
        COMMON /CHNL/ ICHNL(24)
        COMMON /FLM/ IF1,FTIME
        COMMON /KEY2/ KMPTY,KFULL
        COMMON /KTIM/ KTIMER
        COMMON /DKBUFF/ IBUF(256,2)
        COMMON /COM6/ XTIME(20),YAX(20),IREC,TSTART,TEND,NPOINTS,DELT
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,IFRM1,
     *  IPROJ,IMODL,
     *  MISC(19),IHIST(32),
     *  AXES(16,20)
        COMMON /COM1/ NTAKE,IPOS,IFILE(6)
        COMMON /COM2/ IARG1,IARG2,ARG1,ARG2,ICOM(20),KER
        COMMON /NPL/ JVAL(24)
        COMMON /SENS/ ITRSNS,IABRT,JPERF,JMAG,IBUCK,JPROJ
        COMMON /COM8/ ICAM,JBLN1(21)
        COMMON /CLOAD/ ICPU
        DIMENSION IARRAY(640),IVAL(12),IDIF(12),IREM(12),ITREM(12),
     *  IEND(12),JAX(12),IT(3),ID(3)
        EQUIVALENCE (IARRAY,AXES),(ISEQ,ID),(ISEQ(4),IT)
        DATA JAX/3,4,5,6,7,8,9,13,14,15,16,10/
        DATA IBON/782/,IBOFF/8207/
        DATA LERASE/13K/
        DATA MSG/1/
C  TRANSPORT MOTOR SPEED CONSTANT = QUANTM * 65536
        DATA SMOTOR/2621.44/
C
CX      CALL OPEN(23,"SHUTTER",0,IER)
        ICAM=1
        CALL CLRSCRN
        FTIME=EXPS+EXPS
C
        CALL GETNAME(IARG1)
        CALL OPEN(41,IFILE,0,IER,64)
C FIND OUT WHICH HALF OF THE TRACK THE CAMERA SHOULD START OUT ON
        CALL READR(41,8,IARRAY,1,IER)
        ITRK=0
        IF(AXES(3,1).GT.255.) ITRK=1
        CALL CLOSE(41,IER)
C OPEN SMOOTHED TAKE FILE
        CALL OPEN(40,"SMOOTH",0,IER,4)
        IF(IER.EQ.1) GO TO 10
        TYPE "CANNOT OPEN SMOOTHED TAKE FILE  -   IER=",IER
        CALL RESET
        CALL EXIT
C
C UPDATE 'TAKELIST' FILE WITH DATE AND TIME
C
10      CONTINUE
        IF(NOFLM.EQ.1) GO TO 20
        CALL OPEN(36,"DP4:TAKELIST",0,IER)
```

```
            READ(36,100) N
100         FORMAT(I4)
            DO 15 I=1,N
            READ(36,110) J,K,L,M,MON
110         FORMAT(I4,4I5)
            IF(J.EQ.IARG1) GO TO 17
15          CONTINUE
C WE SHOULD NEVER FALL THRU THIS LOOP
17          REWIND 36
            N=I
            DO 18 I=1,N
            READ(36,130)
130         FORMAT()
18          CONTINUE
            CALL TIME(IT,IER)
            CALL DATE(ID,IER)
            WRITE(36,140) J,K,L,M,ID,IT(1),IT(2)
140         FORMAT(9I5)
            CALL CLOSE(36,IER)
C
C INITIALIZE VARIABLES
C
20          CONTINUE
            NAXES=11
            IF(IMODL.EQ.1) NAXES=7
            IF1=IFRM1
C SETUP DISK INPUT TASK
            CALL ITASK(DISKIN,20,7,IER)
C SETUP SCREEN DISPLAY TASK
            CALL ITASK(FLMDISP,25,12,JER)
C  DISABLE JOG CONTROLS
            CALL HOLD(15,KER)
C  SETUP IDLE TIME TASK
            CALL ITASK(IDLE,40,50,LER,-1)
C  SETUP TIMER TASK
            CALL DUCLK(4,TIMER,MER)
            IF(IER+JER+KER+LER+MER.EQ.5) GO TO 25
            TYPE " PROBLEM IN SHOOT  -   ERROR CODES=",IER,JER,KER,LER,MER
            CALL RESET
            CALL EXIT
25          CONTINUE
C PRIME THE BUFFER
            CALL XMT(KMPTY,MSG,$27)
27          CONTINUE
C  WAIT FOR BUFFER TO FILL
            CALL REC(KFULL,MSG)
C MOVE TO START POSITION AND WAIT FOR OPERATOR OK
C
C SET TRACK SENSOR FLAG TO ITRK FOR ITOR CONVERSION
            II=ITRSNS
            ITRSNS=ITRK
            DO 30 I=1,11
            J=JAX(I)
            IEND(I)=IBUF(I,1)
            CALL ITOR(J,IEND(I),AXES(J,1))
30          CONTINUE
            NTIMES=IBUF(16,1)
C RESET TRACK SENSOR FLAG BACK TO CORRECT VALUE
            ITRSNS=II
            IARG1=1
            AXES(1,1)=0.
            CALL REC(KSCRN,MSG)
            CALL MOVCURS(10,1,IER)
            WRITE(10,150) IBON,IBOFF,LERASE
150         FORMAT(1X,A2,"HIT C.R. WHEN OK TO MOVE CAMERA : ",2A2)
            READ(11,120) I
            CALL MOVCURS(10,1,IER)
            WRITE BINARY(10) LERASE
            CALL XMT(KSCRN,MSG,$32)
32          CONTINUE
            CALL MVCAM
            CALL REC(KSCRN,MSG)
            CALL MOVCURS(10,1,IER)
            WRITE(10,160) IBON,IBOFF,LERASE
160         FORMAT(1X,A2,"HIT RETURN WHEN READY TO SHOOT : ",2A2)
            READ(11,120) I
```

```
120     FORMAT(A1)
        CALL MOVCURS(10,1,IER)
        WRITE BINARY(10) LERASE
        CALL XMT(KSCRN,MSG,$34)
34      CONTINUE
C
C OPEN SHUTTER(S)
C
        IF(NOFLM.EQ.1) CALL OPNSH
        IF(NOFLM.EQ.0) CALL OPNEL
        IF(KER.EQ.0) GO TO 36
        CALL DMESS(1)
        GO TO 80
36      CONTINUE
C
C    MAIN PROGRAM LOOP
C
        IARG2=0
        II=1
        SM=SMOTOR*FRATE
        IVAL(12)=0
        IDIF(12)=IFIX(SM)
        IREM(12)=IFIX((SM-FLOAT(IDIF(12)))*25.+.1)
        ITREM(12)=0
        KK=0
        NTDIV=NTIMES
        NT=NTIMES
40      NT=NT+1
C CHECK IF NEXT DELT HAS BEEN REACHED
        IF(NT.LE.NTIMES) GO TO 50
C DELT WAS REACHED  -  INTRODUCE NEXT SET OF DATA
        NT=1
        KK=KK+32
C CHECK IF BUFFER EXHAUSTED
        IF(KK.LT.256) GO TO 43
C BUFFER EMPTY  -  FILL IT UP
        CALL XMT(KMPTY,MSG,$41)
41      CONTINUE
X       TYPE "BUFFER EMPTY"
C MAKE SURE OTHER BUFFER IS FULL
        CALL REC(KFULL,MSG)
X       TYPE "BUFFER FILLED"
C SWITCH BUFFERS
        II=3-II
        KK=0
43      CONTINUE
C SEE IF WE'RE DONE
        IF(IBUF(KK+1,II).EQ.-70000K) GO TO 80
C  SET UP VARIABLES FOR NEXT SET OF COMPUTATIONS
        DO 45 I=1,11
        IVAL(I)=IEND(I)
        IEND(I)=IBUF(KK+I,II)
        IDIF(I)=IEND(I)-IVAL(I)
        CALL IDIV(IDIF(I),NTDIV,IDIF(I),IREM(I),IER)
        ITREM(I)=0
45      CONTINUE
        NTIMES=IBUF(KK+16,II)
        IF(NTIMES.EQ.0) GO TO 80
X       TYPE "NTIMES=",NTIMES
X       TYPE "IVAL=",IVAL
X       TYPE "IEND=",IEND
X       TYPE "IDIF=",IDIF
C
C   COMPUTE NEXT SET OF POINTS AND OUTPUT THEM
C
50      CONTINUE
        DO 55 I=1,11
        IVAL(I)=IVAL(I)+IDIF(I)
        ITREM(I)=ITREM(I)+IREM(I)
        IF(IABS(ITREM(I)).LT.NTDIV) GO TO 55
        IVAL(I)=IVAL(I)+ISIGN(1,IREM(I))
        ITREM(I)=ITREM(I)-ISIGN(NTDIV,IREM(I))
55      CONTINUE
X       TYPE "IVAL=",IVAL
X       TYPE "ITREM=",ITREM
```

```
              IF(NUFLM.EQ.1) GO TO 58
C   COMPUTE SHUTTER POSITION
              IVAL(12)=IVAL(12)+IDIF(12)
              ITREM(12)=ITREM(12)+IREM(12)
              IF(ITREM(12).LT.25) GO TO 58
              IVAL(12)=IVAL(12)+1
              ITREM(12)=ITREM(12)-25
58            CONTINUE
X             TYPE "IVAL(12)=",IVAL(12)
C
C   CHECK FOR E-STOP
C
              IF(IABRT.NE.1) GO TO 70
              CALL REC(KSCRN,MSG)
              CALL MOVCURS(20,1,IER)
              TYPE "** EMERGENCY STOP IS ON **"
              CALL XMT(KSCRN,MSG,$65)
65            CONTINUE
              GO TO 80
70            CONTINUE
              IF(IBUCK.NE.1) GO TO 77
              CALL REC(KSCRN,MSG)
              CALL MOVCURS(20,1,IER)
              TYPE "**** BUCKLE SWITCHES ARE ON ****"
              CALL XMT(KSCRN,MSG,$75)
75            CONTINUE
              GO TO 80
77            CONTINUE
C
C   OUTPUT NEXT POSITIONS TO ALL AXES
C
              CALL REC(KTIMER,MSG)
              DO 56 I=1,NAXES
              J=JAX(I)
56            CALL WRTCAM(ICHNL(J),IVAL(I))
              IF(NOFLM.EQ.0) CALL WRTCAM(15K,IVAL(12))
              GO TO 40
C
C   DONE PROCESSING
C
80            CONTINUE
C   PUT TRANSPORT AT FULL CLOSED POSITION
              IF(NOFLM.EQ.0) CALL WRTCAM(15K,0)
C   KILL DISK INPUT TASK
              CALL ABORT(20,IER)
C   KILL SCREEN DISPLAY
              CALL ABORT(25,JER)
              CALL XMT(KSCRN,MSG,$81)
81            CONTINUE
C   RE-ENABLE JOG CONTROLS
              CALL RELSE(15,KER)
C   KILL IDLE TIME TASK
              CALL ABORT(40,LER)
C   KILL TIMER TASK
              CALL RUCLK
              IF(IER+JER+KER+LER.EQ.4) GO TO 84
              TYPE " PROBLEM 2 IN SHOOT -  ERROR CODES=",IER,JER,KER,LER
              CALL RESET
              CALL EXIT
84            CONTINUE
              ICPU=0
C
C             CLOSE ELECTRONIC SHUTTER
C
              IF(NUFLM.EQ.0) CALL CLOEL
              CALL REC(KSCRN,MSG)
              CALL MOVCURS(10,1,IER)
              TYPE "IARG2=",IARG2
              WRITE(10,170) IBON,IBOFF,LERASE
170           FORMAT(1X,A2,"END OF TAKE -  HIT RETURN : ",2A2)
              READ(11,120) I
              CALL XMT(KSCRN,MSG,$86)
86            CONTINUE
              LENS=0
              CALL CLOSE(40,IER)
```

```
            IF(IER.EQ.1) GO TO 88
            TYPE " PROBLEM 3 IN SHOOT  -   IER=",IER
            CALL RESET
            CALL EXIT
88          CONTINUE
            CALL REC(KSCRN,MSG)
            CALL MOVCURS(7,1,IER)
            WRITE BINARY(10) LERASE
            CALL XMT(KSCRN,MSG,$89)
89          CONTINUE
        CALL CLRSCRN
        RETURN
        END
C                                                                   **** DISKIN ****
            COMPILER NOSTACK
            TASK DISKIN
            COMMON /KEY2/ KMPTY,KFULL
            COMMON /DKBUF/ IBUF(256,2)
            DATA MSG,MSG1/1,1/
C
            NBLK=-1
            II=2
10          NBLK=NBLK+1
            II=3-II
            CALL RDBLK(40,NBLK,IBUF(1,II),1,IER)
            IF(IER.EQ.9) GO TO 30
            IF(IER.EQ.1) GO TO 20
            TYPE " PROBLEM IN DISKIN  -   IER=",IER
            CALL RESET
            CALL EXIT
C WAIT FOR EMPTY SIGNAL
20          CALL REC(KMPTY,MSG1)
C GIVE FULL SIGNAL
            CALL XMT(KFULL,MSG,$10)
            GO TO 10
C  LAST BLOCK READ
C MAKE SURE AN "END-OF-DATA" INDICATOR IS PRESENT
30          IBUF(241,II)=-70000K
            CALL XMT(KFULL,MSG,$31)
31          CONTINUE
            CALL PRI(20)
35          CONTINUE
C  WAIT TO BE KILLED
            GO TO 35
            END
C                                                                   **** FLMDISP ****
            COMPILER NOSTACK
            TASK FLMDISP
C DISPLAY CAMERA POSITION ON SCREEN
C
            COMMON /SENS/ ITRSNS,IABRT,JPERF,JMAG,IBACK,JPROJ
            COMMON /INLIN/ NCHAR
            COMMON /CHNL/ ICHNL(24)
            COMMON /KEYS/ KSCRN
            COMMON /KEY4/ KDISP
            COMMON /COM8/ ICAM,ICAR,IR,IAX1,IAX2,ICAMOLD,ISAVE(16)
            COMMON /COM9/ PANGLE
            COMMON /FLM/ IFRM1,FTIME
C CHANNEL ASSIGNMENTS
C   IN AXES       CHANNEL NUMBER (OCTAL)
C    3    TRUCK            0
C    4    E/W              2
C    5    N/S              1
C    6    PAN              10
C    7    TILT             11
C    8    ROLL             12
C    9    FOCUS            13
C   10    TRANSPORT POS'N  15
C    -    FRAME NUMBER     14
C   13    MODEL TRUCK      20
C   14    MODEL YAW        23
C   15    MODEL PITCH      21
C   16    MODEL ROLL       22
C
            DATA MSG/1/
C  INITIALIZE VARIABLES
```

```
C
        CALL GETFR(IFR1)
        IFROLD=-32000
        DO 2 I=13,16
2       ISAVE(I)=-32000
        CALL REC(KSCRN,MSG)
        CALL MOVCURS(7,1,IER)
        WRITE(10,110)
110     FORMAT("  MODEL     TRUCK      YAW       PITCH     ROLL")
        CALL MOVCURS(13,1,IER)
        WRITE(10,120)
120     FORMAT(6X,"TIME INTO SHOT    TAKE"/
       *       6X,"                  FRAME")
        CALL XMT(KSCRN,MSG,$10)
C
C  MAIN LOOP
C
10      CONTINUE
        CALL FDELY(20)
        J=-1
        DO 30 I=13,16
        J=J+9
        CALL RDCAM(ICHNL(I),KK)
        IF(KK.EQ.ISAVE(I)) GO TO 30
        ISAVE(I)=KK
        CALL ITOR(I,KK,XX)
        IF(I.EQ.15) PANGLE=XX
        CALL REC(KSCRN,MSG)
        CALL MOVCURS(8,J,IER)
        WRITE(10,100) XX
100     FORMAT(1X,F9.2)
        CALL XMT(KSCRN,MSG,$30)
30      CONTINUE
        CALL RDCAM(14K,IFR)
        IF(IFR.EQ.IFROLD) GO TO 10
        IFROLD=IFR
        CALL GETFR(IFR)
        ITF=IFR-IFR1+IFRM1
        FT=FLOAT(IFR-IFR1)/24.
        CALL REC(KSCRN,MSG)
        CALL MOVCURS(16,1,IER)
        WRITE(10,130) FT,ITF
130     FORMAT(8X,F7.2,9X,I5)
        CALL XMT(KSCRN,MSG,$10)
        GO TO 10
        END
        .TITL   TIMER
        .ENT    TIMER
        .EXTD   .IXMT,.UCEX
        .EXTN   KTIM,COM2
        .NREL
TIMER:  STA     3,RTRN
        LDA     0,.KEY
        LDA     1,MSG
        .IXMT
        JMP     .ERR
        LDA     3,RTRN
        .UCEX
;
ERR:    ISZ     @.COM2
        JMP     .+1
        .UCEX
;
MSG:    1
.KEY:   KTIM
RTRN:   0
.COM2:  .GADD   COM2,1
        .END
;
; INTEGER DIVIDER
;       CALL IDIV(I1,I2,I3,I4,IER)
; WHERE:
;       I3 = I1 / I2
;       I4 = REMAINDER
;       IER = 1 IF OVERFLOW
;
```

** IDIV **

```
        .TITL   IDIV
        .ENT    IDIV
        .EXTD   .FARL,.FRET
        .NREL
        5
IDIV:   JSR     @.FARL

LDA     0,ZERO          ; CLEAR AC0
        STA     0,FLAG          ; CLEAR NEGATION FLAG
        STA     0,@-163,3       ; SET IER = 0
        LDA     1,@-167,3       ; LOAD DIVIDEND INTO AC1
        MOVL#   1,1,SNC
        JMP     OK1             ; DIVIDEND ALREADY POSITIVE
                                ;
NEG1:   NEG     1,1             ; NEGATE DIVIDEND
        ISZ     FLAG            ; SET NEGATION FLAG
        JMP     .+1
                                ;
OK1:    LDA     2,@-166,3       ; LOAD DIVISOR INTO AC2
        MOVL#   2,2,SNC
        JMP     OK2             ; DIVISOR ALREADY POSITIVE
                                ;
NEG2:   NEG     2,2             ; NEGATE THE DIVISOR
        ISZ     FLAG            ; SET NEGATION FLAG
        JMP     .+1
                                ;
OK2:    DIV                     ; DO IT
                                ;
        MOV#    0,0,SNC         ; IF CARRY IS ZERO
        JMP     OK              ;    WE'RE OK
ERR:    LDA     2,ONE           ; IF NOT, SET IER = 1
        STA     2,@-163,3
                                ;
OK:     LDA     2,FLAG          ; LOAD NEGATION FLAG
        MOVR#   2,2,SNC         ; IF IT WAS NOT A
        JMP     OUT             ;    ONE JUMP OUT
        NEG     1,1             ; NEGATE THE QUOTIENT
        NEG     0,0             ; NEGATE THE REMAINDER
OUT:    STA     1,@-165,3       ; PUT QUOTIENT INTO I3
        STA     0,@-164,3       ; PUT REMAINDER INTO I4
                                ;
        JSR     @.FRET
                                ;
ZERO:   0
ONE:    1
FLAG:   0
        .END
```

** STSHOOT **

```
C
      COMPILER NOSTACK
      OVERLAY ZSTSHOOT
      SUBROUTINE STSHOOT(NOFLM)
C
C WORD NUMBER            CONTENTS
C IN STOPACT RECORD
C
C       1                PROCESS PROJECTOR CONTROL
C       2                W (POINT OF INTEREST)
C       3                TRUCK
C       4                EAST/WEST
C       5                NORTH/SOUTH
C       6                PAN
C       7                TILT
C       8                ROLL
C       9                FOCUS
C       10               TRANSPORT
C       11               U (POINT OF INTEREST)
C       12               V (POINT OF INTEREST)
C       13               MODEL STAND TRUCK
C       14               MODEL STAND YAW
C       15               MODEL STAND PITCH
C       16               MODEL STAND ROLL
C
      EXTERNAL MODDISP
      COMMON /SENS/ ITRSNS,IABRT,JPERF,JMAG,IBUCK,JPROJ
      COMMON /KEYS/ KSCRN
```

```
      COMMON /CHNL/ ICHNL(24)
      COMMON /SFLM/ FT,ITF,IDSLV
     COMMON /COM2/IARG1,IARG2,ARG1,ARG2,ICOM(20),KER
      COMMON /HEAD/ IPROD(32),ISEQ(32),ISCEN(32),ICAMAN(32),IDIRCT(32),
    * ICOMNTS(32),LENS,IPERF,FRATE,EXPS,ICS,NPOS,ISH,LASTF,IFRM1,
    * MISC(21),IHIST(32),
    * AXES(16,20)
      COMMON /COM1/ NTAKE,IPOS,IFILE(6)
      COMMON /COM6/ XTIME(20),YAX(20),IREC,TSTART,TEND,NPOINTS,DELT
      COMMON /COM8/ ICAM,JBLN1(21)
      DIMENSION IARRAY(320),ID(3),IT(3)
      EQUIVALENCE (IARRAY,AXES)
      DATA MAGEND/6800/,LERASE/13K/
      DATA MSG1/1/,MSG/1/
      DATA IBON/782/,IBOFF/8207/,IDSLV/0/
C
      ICAM=1
      CALL CLRSCRN
C
C READ HEADER INFO FOR THIS TAKE
C
      CALL GETNAME(IARG1)
      CALL OPEN(41,IFILE,0,IER,64)
      CALL READR(41,6,LENS,1,IER)
      CALL CLOSE(41,IER)
C OPEN FILE 'STOPACT'
      CALL OPEN(40,"STOPACT",0,IER,64)
      IF(IER.EQ.1) GO TO 20
      TYPE "CANNOT OPEN SMOOTHED TAKE FILE  -  IER=",IER
      CALL RESET
      CALL EXIT
C
C UPDATE FILE 'TAKELIST' WITH DATE AND TIME
C
20    CONTINUE
      IF(NOFLM.EQ.1) GO TO 35
      CALL OPEN(36,"DP4:TAKELIST",0,IER)
      READ(36,130) N
130   FORMAT(I4)
      DO 22 I=1,N
      READ(36,140) J,K,L,M,MON
140   FORMAT(I4,4I5)
      IF(J.EQ.IARG1) GO TO 24
22    CONTINUE
C WE SHOULD NEVER FALL THRU THIS LOOP
24    REWIND 36
      N=I
      DO 26 I=1,N
      READ(36,150)
150   FORMAT()
26    CONTINUE
      CALL TIME(IT,IER)
      CALL DATE(ID,IER)
      WRITE(36,160) J,K,L,M,ID,IT(1),IT(2)
160   FORMAT(9I5)
28    CALL CLOSE(36,IER)
C
C INITIALIZE VARIABLES
C
35    CONTINUE
C  SETTLING TIME
      CALL REC(KSCRN,MSG)
37    CALL MOVCURS(20,1,IER)
      WRITE BINARY(10) LERASE
      ACCEPT "SETTLING TIME = ",SETL
      IF(SETL.LT.0.1) GO TO 37
      IDELAY=IFIX(100.*SETL)
C EXPOSURE TIME
38    CALL MOVCURS(21,1,IER)
      WRITE BINARY(10) LERASE
      ACCEPT "EXPOSURE TIME = ",EXPS
      IF(EXPS.LT.0.1) GO TO 38
      FTIME=EXPS+EXPS
      FRATE=1./FTIME
      CALL XMT(KSCRN,MSG,$36)
36    CONTINUE
```

```
              FDT=DELT/24.
              FT=-FDT
              ITF=IFRM1-1
              ISTRT=IFRM1
              IPAUS=0
              IF(ARG2.EQ.-100000.) GO TO 83
C    CUTBACK FRAME
              CALL REC(KSCRN,MSG)
43            CALL MOVCURS(21,30,IER)
              WRITE BINARY(10) LERASE
              ACCEPT "CUTBACK FRAME : ",ISTRT
              IF(ISTRT.LT.IFRM1) GO TO 43
              IF(ISTRT.GT.LASTF) GO TO 43
C    PAUSE FRAME
44            CALL MOVCURS(21,50,IER)
              WRITE BINARY(10) LERASE
              ACCEPT "PAUSE FRAME : ",IPAUS
              IF(IPAUS.EQ.0) GO TO 46
              IF(IPAUS.LT.ISTRT) GO TO 44
              IF(IPAUS.GT.LASTF) GO TO 44
46            CONTINUE
              ITF=ISTRT-1
              FT=(FLOAT(ISTRT-IFRM1-1))*FDT
              CALL XMT(KSCRN,MSG,$42)
42            CONTINUE
C    DISSOLVE FRAME
              CALL REC(KSCRN,MSG)
81            CALL MOVCURS(18,1,IER)
              WRITE BINARY(10) LERASE
              ACCEPT "START DISSOLVE FRAME   (0=NO DISSOLVE): ",IDSTRT
              IF(IDSTRT.EQ.0) GO TO 82
              IF(IDSTRT.LT.ISTRT) GO TO 81
              IF(IDSTRT.GT.LASTF) GO TO 81
82            CONTINUE
              IDFRM=IDSTRT
              CALL XMT(KSCRN,MSG,$83)
83            CONTINUE
              IREC=ISTRT-IFRM1
C    SETUP MODEL STAND DISPLAY TASK
              CALL ITASK(MODDISP,40,11,IER)
C    DISABLE JOG CONTROLS
              CALL HOLD(15,KER)
              IF(IER+KER.EQ.2) GO TO 40
              TYPE " PROBLEM IN STSHOOT  -  ERROR CODES=",IER,KER
              CALL RESET
              CALL EXIT
40            CONTINUE
C    MOVE TO START POSITION AND WAIT FOR OPERATOR OK
              IARG1=1
              CALL READR(40,IREC,IARRAY,1,IER)
              AXES(1,1)=0.
X             ACCEPT "INPUT OUTPUT DEVICE CODE : ",IOUT
-X            WRITE(IOUT,1234) LLL,(AXES(III,1),III=1,16)
X1234         FORMAT(I5," AXES=",8F8.2/8F8.2)
X             WRITE(IOUT,1235) (IARRAY(III),III=1,32)
X1235         FORMAT(" IVALS=",8OI7/8OI7/8OI7/8OI7)
              CALL REC(KSCRN,MSG1)
              CALL MOVCURS(10,1,IER)
              WRITE(10,175) IBON,IBOFF,LERASE
175           FORMAT(1X,A2,"HIT C.R. WHEN OK TO MOVE CAMERA : ",A2,A1)
              READ(11,120) I
              CALL MOVCURS(10,1,IER)
              WRITE BINARY(10) LERASE
              CALL XMT(KSCRN,MSG1,$45)
45            CONTINUE
              CALL MVCAM
              CALL REC(KSCRN,MSG1)
              CALL MOVCURS(10,1,IER)
              WRITE(10,155) IBON,IBOFF,LERASE
155           FORMAT(1X,A2,"HIT RETURN WHEN READY TO SHOOT : ",A2,A1)
              READ(11,120) I
120           FORMAT(A1)
              CALL MOVCURS(10,1,IER)
              WRITE BINARY(10) LERASE
              CALL XMT(KSCRN,MSG1,$71)
```

```
71      CONTINUE
C
C MAKE SURE SHUTTER IS SET TO ZERO
C
        IF(NOFLM.EQ.1) GO TO 72
        CALL WRTCAM(15K,0)
72      CONTINUE
C
C   OPEN SHUTTER(S)
C
        IF(NOFLM.EQ.1) CALL OPNSH
        IF(NOFLM.EQ.0) CALL OPNEL
        IF(KER.EQ.0) GO TO 73
        CALL DMESS(1)
        GO TO 60
73      CONTINUE
C ******* KLUGE FOR ACME CAMERA  -  3/22/79  ********
C*      JDELAY=IFIX(100.*EXPS)
C ********************
C
C   MAIN PROGRAM LOOP
C
        IFIRST=1
        IREC=IREC-1
70      IREC=IREC+1
C UPDATE SCREEN DISPLAY VARIABLES
        FT=FT+FDT
        ITF=ITF+1
C
        CALL READR(40,IREC,IARRAY,1,IER)
X       WRITE(IOUT,1234) IREC,(AXES(III,1),III=1,16)
X       WRITE(IOUT,1235) (IARRAY(III),III=1,32)
C SEE IF WE'RE DONE
        IF(IARRAY(1).EQ.-70000K) GO TO 60
        IF(IFIRST.EQ.1) AXES(1,1)=0.
        IFIRST=0
C
C CHECK FOR E-STOP
C
        IF(IABRT.NE.1) GO TO 50
        CALL REC(KSCRN,MSG)
        CALL MOVCURS(20,1,IER)
        TYPE "**** EMERGENCY STOP CONDITION ****"
        CALL XMT(KSCRN,MSG,$52)
52      CONTINUE
        GO TO 60
50      CONTINUE
        IF(NOFLM.EQ.1) GO TO 54
        IF(IBUCK.NE.1) GO TO 54
        CALL REC(KSCRN,MSG)
        CALL MOVCURS(20,1,IER)
        TYPE "** BUCKLE SWITCHES ON **"
        CALL XMT(KSCRN,MSG,$56)
56      CONTINUE
        GO TO 60
54      CONTINUE
C   UPDATE SCREEN DISPLAY
C
        CALL STFLMDISP
C
C   PAUSE
C
        IF(IPAUS.EQ.0) GO TO 57
        IF(IPAUS.NE.ITF) GO TO 57
        CALL REC(KSCRN,MSG)
        CALL MOVCURS(19,1,IER)
        WRITE BINARY(10) LERASE
        ACCEPT "*** PAUSE  -  ENTER NEXT PAUSE FRAME (OR ZERO) AND HIT",
     *  " C.R. TO RESUME : ",IPAUS
        CALL XMT(KSCRN,MSG,$57)
57      CONTINUE
C
C   DISSOLVE FRAME
```

```
C
            IF(IDFRM.EQ.0) GO TO 80
            IF(IDFRM.NE.ITF) GO TO 80
            IDSLV=1
            IDFRM=IDFRM+1
            CALL REC(KSCRN,MSG)
            CALL MOVCURS(18,1,IER)
            WRITE BINARY(10) LERASE
            WRITE(10,181) IBON,IBOFF
181         FORMAT(1X,A2,"***",A2,"SET MECHANICAL SHUTTER (CR TO SHOOT,"
      *     "X TO END DISSOLVE) : ",Z)
            READ(11,120) I
            CALL MOVCURS(18,1,IER)
            WRITE BINARY(10) LERASE
            CALL XMT(KSCRN,MSG,$84)
84          CONTINUE
            IF(I.NE.2HX ) GO TO 80
            IDSLV=0
            IDFRM=0
85          CALL REC(KSCRN,MSG)
            CALL MOVCURS(18,1,IER)
            WRITE(10,182)
182         FORMAT(1X,"R-REWIND,START DISSOLVE IN  ;  C-CONTINUE SHOOTING NORMALLY
      *     "  ;  X-END TAKE: ",Z)
            READ(11,120) I
            CALL XMT(KSCRN,MSG,$86)
86          CONTINUE
            IF(I.EQ.2HX ) GO TO 60
            IF(I.EQ.2HC ) GO TO 79
            IF(I.EQ.2HR ) GO TO 87
            GO TO 85
C
C  PREPARE FOR DISSOLVE IN
C
87          J=IDSTRT-5
C  WIND FILM BACK TO 5 FRAMES BEFORE START ...
            CALL GETFR(IFR)
            IFR=IFR-(ITF-IDSTRT+5)
            CALL SETFR(IFR)
C  ... AND THEN FORWARD TO START POSITION
            IFR=IFR+5
            CALL SETFR(IFR)
            IF(KER.EQ.14) GO TO 60
            CALL OPNEL
            IF(KER.EQ.0) GO TO 88
            CALL DMESS(1)
            GO TO 60
C  MOVE CAMERA BACK TO 5 FRAMES BEFORE START ...
88          ITF=ITF-1
            IREC=IREC-1
            CALL READR(40,IREC,IARRAY,1,IER)
            CALL STFLMDISP
            CALL MVCAM
            CALL FDELY(200)
            IF(ITF.GT.J) GO TO 88
C  ... AND THEN FORWARD TO START POSITION
89          ITF=ITF+1
            IREC=IREC+1
            CALL READR(40,IREC,IARRAY,1,IER)
            CALL STFLMDISP
            CALL MVCAM
            CALL FDELY(200)
            IF(ITF.LT.IDSTRT) GO TO 89
            IDFRM=ITF
            GO TO 57
79          CONTINUE
            CALL REC(KSCRN,MSG)
            CALL MOVCURS(18,1,IER)
            WRITE BINARY(10) LERASE
            WRITE(10,183)
183         FORMAT(1X,"HIT CR WHEN READY TO RESUME SHOOTING: ",Z)
            READ(11,120) I
            CALL MOVCURS(18,1,IER)
            WRITE BINARY(10) LERASE
            CALL XMT(KSCRN,MSG,$80)
80          CONTINUE
```

```
      C
      C
      C
      C MOVE CAMERA TO NEXT POSITION
            CALL MVCAM
      C WAIT FOR MECHANICAL JITTER TO SETTLE DOWN
            CALL FDELY(IDELAY)
            IF(NOFLM.EQ.1) GO TO 75
      C SHOOT ONE FRAME IN THIS POSITION
            CALL FRAME
      C ********* KLUGE FOR ACME CAMERA  -  3/22/79 *********
      C*      CALL PROJ
      C*      CALL FDELY(JDELAY)
      C*      CALL PROJ
      C*      CALL FDELY(20)
      C ***************
      75      CONTINUE
              GO TO 70
      C
      C DONE PROCESSING
      C
      60      CONTINUE
      C
      C   CLOSE ELECTRONIC SHUTTER
      C
              IF(NOFLM.NE.1) CALL CLOEL
      C END MODEL STAND DISPLAY TASK
              CALL ABORT(40,IER)
              CALL XMT(KSCRN,MSG,$67)
      67      CONTINUE
      C  RE-ENABLE JOG CONTROLS
              CALL RELSE(15,KER)
              IF(IER+KER.EQ.2) GO TO 62
              TYPE " PROBLEM 2 IN STSHOOT  -  ERROR CODES=",IER,KER
              CALL RESET
              CALL EXIT
      62      CONTINUE
              CALL MOVCURS(10,1,IER)
              WRITE(10,165) IBON,IBOFF,LERASE
      165     FORMAT(1X,A2,"END OF TAKE  -  HIT RETURN : ",A2,A1)
              READ(11,120) I
              CALL MOVCURS(7,1,IER)
              WRITE BINARY(10) LERASE
              CALL XMT(KSCRN,MSG1,$61)
      61      CONTINUE
              LENS=0
              CALL CLOSE(40,IER)
              IF(IER.EQ.1) GO TO 65
              TYPE " PROBLEM 3 IN STSHOOT  -  IER=",IER
              CALL RESET
              CALL EXIT
      65      CONTINUE
              CALL CLRSCRN
              RETURN
              END
      C                                                      **** STFLMDISP ****
              COMPILER NOSTACK
              SUBROUTINE STFLMDISP
              COMMON /SFLM/ FT,ITF,IDSLV
              COMMON /KEYS/ KSCRN
              DATA MSG/1/,IFLAG/1/
      C DISPLAY TITLES
              IF(IFLAG.EQ.0) GO TO 10
              IFLAG=0
              CALL REC(KSCRN,MSG)
              CALL MOVCURS(12,1,IER)
              WRITE(10,100)
      100     FORMAT(/
             *  6X,"TIME INTO SHOT     TAKE"/
             *  6X,"                   FRAME")
              CALL XMT(KSCRN,MSG,$10)
      10      CONTINUE
      C DISPLAY FILMING VARIABLES
              CALL REC(KSCRN,MSG)
              CALL MOVCURS(16,1,IER)
              WRITE(10,110) FT,ITF
```

```
110     FORMAT(8X,F7.2,9X,I5)
        CALL XMT(KSCRN,MSG,$10)
        RETURN
        END
C                                                               **** FRAME ****
        COMPILER NOSTACK
        SUBROUTINE FRAME
C EXPOSE ONE FRAME FOR STOP-MOTION PHOTOGRAPHY
C
        COMMON /KTIM/ KTIMER
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,IFRM1,
     *  MISC(21),IHIST(32),
     *  AXES(16,20)
        COMMON /SENS/ ITRSNS,IABRT,JPERF,JMAG,IBUCK
        COMMON /SFLM/ FT,ITF,IDSLV
        DIMENSION IARRAY(16)
        EQUIVALENCE (IARRAY,ISEQ(17))
        EXTERNAL TIMER
        DATA XRATE/655.36/
        DATA MSG/1/
C IF WE'RE DOING DISSOLVE FRAMES MOVE CONTINUOUS ONLY
        IF(IDSLV.EQ.1) GO TO 5
C IF EXPOSURE TIME .LT. 2 SEC. USE CONTINUOUS SHUTTER MOVEMENT
        IF(EXPS.GT.2.0) GO TO 50
C
C   SET UP USER CLOCK
C
5       CONTINUE
        CALL DUCLK(1,TIMER,IER)
C
C   COMPUTE MOVEMENT RATE IN COUNTS PER 10 MS PULSE
C
        RATE=XRATE*FRATE
C
C   MOVE THE MECHANICAL SHUTTER AT A CONTROLLED RATE
C
        COUNT=0.
        KOUNT=0
C
10      CONTINUE
        COUNT=COUNT+RATE
        IF(COUNT.GE.65536.) GO TO 20
        CC=COUNT
        IF(CC.GE.32768.) CC=CC-65536.
        KOUNT=IFIX(CC)
        CALL REC(KTIMER,MSG)
        CALL WRTCAM(15K,KOUNT)
        GO TO 10
C
C   WE'RE DONE - MAKE SURE WE STOP AT ZERO
C
20      CONTINUE
        CALL RUCLK
        CALL WRTCAM(15K,0)
        RETURN
C IF EXPOSURE TIME .GT. 2 SEC. OPEN MECH. SHUTTER FOR TIMED INTERVAL
50      CONTINUE
        II=IFIX(100.*EXPS+.5)
        CALL WRTCAM(15K,8192)
        CALL FDELY(3)
        CALL WRTCAM(15K,16384)
        CALL FDELY(3)
        CALL WRTCAM(15K,24576)
        CALL FDELY(3)
        CALL WRTCAM(15K,32767)
        CALL FDELY(II)
        CALL WRTCAM(15K,-24576)
        CALL FDELY(3)
        CALL WRTCAM(15K,-16384)
        CALL FDELY(3)
        CALL WRTCAM(15K,-8192)
        CALL FDELY(3)
        CALL WRTCAM(15K,0)
        CALL FDELY(3)
        RETURN
        END
```

```
C                                                              **** MODDISP ****
        COMPILER NOSTACK
        TASK MODDISP
C  DISPLAY CAMERA POSITION ON SCREEN
C
        COMMON /SENS/ ITRSNS,IABRT,JPERF,JMAG,IBACK,JPROJ
        COMMON /INLIN/ NCHAR
        COMMON /CHNL/ ICHNL(24)
        COMMON /KEYS/ KSCRN
        COMMON /COM8/ ICAM,ICAR,IR,IAX1,IAX2,ICAMOLD,ISAVE(16)
        COMMON /COM9/ PANGLE
C CHANNEL ASSIGNMENTS
C  3    TRUCK            0
C  4    E/W              2
C  5    N/S              1
C  6    PAN              10
C  7    TILT             11
C  8    ROLL             12
C  9    FOCUS            13
C 10    TRANSPORT POS'N  15
C  -    FRAME NUMBER     14
C 13    MODEL TRUCK      20
C 14    MODEL YAW        23
C 15    MODEL PITCH      21
C 16    MODEL ROLL       22
C
        DATA MSG/1/
C
        DO 2 I=13,16
2       ISAVE(I)=-32000
        CALL REC(KSCRN,MSG)
        CALL MOVCURS(7,1,IER)
        WRITE(10,110)
110     FORMAT("  MODEL     TRUCK     YAW     PITCH     ROLL")
        CALL XMT(KSCRN,MSG,$10)
10      CONTINUE
        CALL FDELY(20)
        J=-1
        DO 30 I=13,16
        J=J+9
        CALL RDCAM(ICHNL(I),KK)
        IF(KK.EQ.ISAVE(I)) GO TO 30
        ISAVE(I)=KK
        CALL ITOR(I,KK,XX)
        IF(I.EQ.15) PANGLE=XX
        CALL REC(KSCRN,MSG)
        CALL MOVCURS(8,J,IER)
        WRITE(10,100) XX
100     FORMAT(1X,F9.2)
        CALL MOVCURS(24,NCHAR+1,IER)
        CALL XMT(KSCRN,MSG,$30)
30      CONTINUE
        GO TO 10
        END
C                                                              **** INBET ****
        COMPILER NOSTACK
        OVERLAY ZINTRP
        SUBROUTINE INBET
C PERFORM CAMERA POSITION INBETWEENING
C AXES ARE:
C       IN SMOOTH      IN AXES
C                         2       - W (POINT OF INTEREST)
C          1              3       - TRUCK
C          2              4       - E/W
C          3              5       - N/S
C          4              6       - PAN
C          5              7       - TILT
C          6              8       - ROLL
C          7              9       - FOCUS
C                        10       - POINT OF INTEREST
C                        11       - U (POINT OF INTEREST)
C                        12       - V (POINT OF INTEREST)
C          8             13       - MODEL TRUCK
C          9             14       - MODEL YAW
C         10             15       - MODEL PITCH
```

```
C       11              16          - MODEL ROLL
C       16                          - NTIMES
C
C NOMENCLATURE LIST:
C
C       EXPS            - EXPOSURE TIME
C       FTIME           - FRAME (TURNOVER) TIME
C       QUANTM          - TIME BETWEEN OUTPUTS (= 40 MS)
C       DELT            - TIME BETWEEN DATA POINTS (= NTIMES * QUANTM)
C                         (SELECTED TO BE THE NEAREST WHOLE
C                         NUMBER OF QUANTM'S .LE. FTIME)
C       NTIMES          - NUMBER OF ON-THE-FLY COMPUTATIONS BETWEEN INPUTS
C       NTLAST          -         "                         FOR LAST SET
C       IREVRS          - IF.EQ.1 -> TILT HAS MOVED BEYOND + OR - 90 DEG.
C                         IF SO:  PAN  <- PAN +180
C                                 TILT <- 180-TILT
C
C
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,
     *  MISC(22),IHIST(32),
     *  AXES(16,20)
        COMMON /COM1/ NTAKE,IPOS,IFILE(6)
        COMMON /COM2/ IARG1,IARG2,ARG1,ARG2,ICOM(20),KER
        COMMON /COM6/ XTIME(20),YAX(20),IREC,TSTART,TEND,NPOINTS,DELT
        COMMON /COM9/ PANGLE
        COMMON /KEYS/ KSCRN
        COMMON /COMIB/ ISAXES(32)
        DIMENSION IARRAY(32),JAX(16),SPDMAX(6),SPDCHK(6),SAXES(16),
     *  IAXES(320)
        EQUIVALENCE (SAXES,ISAXES),(AXES,IAXES)
        DATA QUANTM/.04/
        DATA JAX/0,0,1,2,3,4,5,6,7,0,0,0,8,9,10,11/
        DATA RAD/57.2957795/
C MAXIMUM SPEED FOR EACH AXIS IN INCHES OR DEGREES PER SECOND
        DATA SPDMAX/36.,6.,6.,36.,36.,36./
        DATA MSG/1/,LERASE/13K/,IBEEP/7K/
C
C OPEN TAKE FILE AND READ IN AXIS DATA
C
        CALL OPEN(40,IFILE,0,IER,64)
        CALL READR(40,6,LENS,1,IER)
X       TYPE "AFTER FIRST READ NPOS,FRATE=",NPOS,FRATE
        CALL READR(40,8,IAXES,NPOS,IER)
X       TYPE "AFTER SECOND READ AXES=",((AXES(I,J),J=1,8),I=1,2)
        CALL CLOSE(40,IER)
        IREVRS=0
        IF(AXES(7,1).GT.90.0.AND.AXES(7,1).LT.270.0) IREVRS=1
        IF(NPOS.GE.2) GO TO 13
        CALL REC(KSCRN,MSG)
        CALL MOVCURS(22,1,IER)
        TYPE "CANNOT INBETWEEN A TAKE WITH ONLY ONE POSITION"
        CALL XMT(KSCRN,MSG,$12)
12      CONTINUE
        WRITE BINARY(10) IBEEP
        CALL FDELY(200)
        KER=13
        RETURN
13      CONTINUE
        CALL REC(KSCRN,MSG)
11      CALL MOVCURS(21,1,IER)
        WRITE BINARY(10) LERASE
        ACCEPT "EXPOSURE TIME = ",EXPS
        IF(EXPS.LT.0.05) GO TO 11
        CALL XMT(KSCRN,MSG,$14)
14      CONTINUE
        FTIME=EXPS+EXPS
        FRATE=1./FTIME
C
C DELETE OLD SMOOTHED FILE AND CREATE NEW ONE
C
        CALL STAT("SMOOTH",ISEQ,IER)
        IF(IER.EQ.1) CALL DFILW("SMOOTH",IER)
        CALL CFILW("SMOOTH",3,300,IER)
        IF(IER.EQ.1) GO TO 70
```

```
              TYPE " CANNOT CREATE SMOOTHED TAKE FILE"
99            CALL RESET
              CALL EXIT
C
C OPEN SMOOTH FILE
C
70            CALL OPEN(40,"SMOOTH",0,IER,4)
              IF(IER.EQ.1) GO TO 85
              TYPE " CANNOT OPEN SMOOTHED TAKE FILE   -   IER=",IER
              GO TO 99
C
C COMPUTE U,V,W FOR EACH POSITION
C
85            CONTINUE
              DO 10 I=1,NPOS
C IF PAN AND TILT ARE BLANK, POI STAYS THE SAME
              IF(AXES(6,I).EQ.-100000.) GO TO 20
C   IF POI .LE. 0  DROP OUT
              IF(AXES(10,I).GT.0.) GO TO 86
              KER=13
              CALL REC(KSCRN,MSG)
              CALL MOVCURS(20,1,IER)
              TYPE " CANNOT INBETWEEN A TAKE WITH NEGATIVE POI VALUES"
              CALL XMT(KSCRN,MSG,$87)
87            CONTINUE
              WRITE BINARY(10) IBEEP
              CALL FDELY(200)
              GO TO 78
86            CONTINUE
C
              D=AXES(10,I)+5.25
              A=AXES(7,I)/RAD
              CT=COS(A)
              ST=SIN(A)
X             TYPE "D,A,CT,ST=",D,A,CT,ST
              A=AXES(6,I)/RAD
              CP=COS(A)
              SP=SIN(A)
X             TYPE "A,CP,SP=",A,CP,SP
X             TYPE "AXES(3-5,I)=",(AXES(JJJJ,I),JJJJ=3,5)
C COMPUTE U = TRUCK - POI * COS(TILT) * COS(PAN)
              AXES(11,I)=AXES(3,I)-D*CT*CP
C COMPUTE V = E/W + POI * COS(TILT) * SIN(PAN)
              AXES(12,I)=AXES(4,I)+D*CT*SP
C COMPUTE W = N/S + D * SIN(TILT)
              AXES(2,I)=AXES(5,I)+D*ST
X             TYPE "II,P.O.I. = ",II,AXES(11,I),AXES(12,I),AXES(2,I)
              GO TO 10
C POI STAYS THE SAME AS BEFORE
20            II=I-1
              AXES(11,I)=AXES(11,II)
              AXES(12,I)=AXES(12,II)
              AXES(2,I)=AXES(2,II)
X             TYPE "II,P.O.I. = ",II,AXES(11,I),AXES(12,I),AXES(2,I)
10            CONTINUE
C  CHECK IF YAW MUST MOVE THRU 180 DEG. POSITION
C     IF SO, TRANSFORM YAW < 0 TO YAW = YAW +360
              DO 72 I=2,NPOS
              IF(ABS(AXES(14,I)-AXES(14,I-1)).GT.180.) GO TO 73
72            CONTINUE
              GO TO 76
73            CONTINUE
              DO 74 I=1,NPOS
              IF(AXES(14,I).GE.0.) GO TO 74
              AXES(14,I)=AXES(14,I)+360.
74            CONTINUE
78            CONTINUE
C
C INBETWEEN TRUCK,E/W,N/S,ROLL,U,V,W, AND MODEL STAND
C
C COMPUTE TIME AXIS VALUES
C
C   SELECT DELTA T FOR INBETWEENING
              DELT=QUANTM
              X=FTIME+.0001
```

```
              DO 33 I=1,10000
              DELT=DELT+QUANTM
              IF(DELT.GT.X) GO TO 34
 33           CONTINUE
              CALL REC(KSCRN,MSG)
              CALL MOVCURS(22,1,IER)
              TYPE "PROBLEM IN COMPUTING DELT IN INBET - DELT,QUANTM=",DELT,QUANTM
              CALL XMT(KSCRN,MSG,$333)
 333          CONTINUE
              KER=13
              RETURN
 34           DELT=DELT-QUANTM
              NTIMES=I
              DO 35 J=1,NPOS
              XTIME(J)=(AXES(1,J)-AXES(1,1))*FTIME
 35           CONTINUE
 X            TYPE "XTIME=",XTIME
 C   COMPUTE NTLAST
              N=IFIX(XTIME(NPOS)/DELT)
              X=FLOAT(N)*DELT
              DO 71 I=1,10000
              X=X+QUANTM
              IF(X.GT.XTIME(NPOS)) GO TO 77
 71           CONTINUE
 77           NTLAST=I-1
 C
 C SET UP LIMIT VALUES FOR INTRPL
              TSTART=0.
              TEND=XTIME(NPOS)
              NPOINTS=NPOS
              DO 30 I=2,16
              IF(I.EQ.6) GO TO 30
              IF(I.EQ.7) GO TO 30
              IF(I.EQ.9) GO TO 30
              IF(I.EQ.10) GO TO 30
              DO 32 J=1,NPOS
              YAX(J)=AXES(I,J)
 32           CONTINUE
 X            TYPE "YAX=",YAX
 C
              IREC=I-17
              CALL INTRPL
 C
              IF(I.EQ.2) NREC=IREC-1
 X            TYPE " IREC,NREC=",IREC,NREC
 30           CONTINUE
 C
 C COMPUTE PAN,TILT,AND FOCUS FOR EACH POINT IN SMOOTHED FILE
 C AND CONVERT TO COUNTS
 C
              IFIRST=1
              IREC=-16
 50           CONTINUE
              IREC=IREC+16
              CALL READR(40,IREC,ISAXES,16,IER)
 C            WRITE(10,222) (ISAXES(I),I=1,16),(SAXES(I),I=1,8)
 C222         FORMAT(8OI7/8OI7/4E14.4/4E14.4)
              IF(IER.NE.1) GO TO 92
 C  COMPUTE A,B,C
              A=SAXES(3)-SAXES(11)
              B=SAXES(4)-SAXES(12)
              C=SAXES(5)-SAXES(2)
 C
 C   TEST FOR DEGENERATIVE CASES  -   WHERE A AND/OR B = ZERO
 C
              IF(ABS(A).GT.1.E-4) GO TO 22
              IF(ABS(B).GT.1.E-4) GO TO 21
 C   A=B=0  -  TILT = 90 OR 270    PAN = PREVIOUS VALUE OF PAN
              SAXES(7)=90.
              IF(C.GT.0.) SAXES(7)=270.
              IF(IFIRST.EQ.1) GO TO 23
              SAXES(6)=OLPAN
              GO TO 29                    ; IF NOT FIRST TIME PAN = PREVIOUS VALUE OF PAI
 23           SAXES(6)=AXES(6,1)          ; IF FIRST TIME THRU PAN = VALUE IN TAKE FILE
              GO TO 29
```

```
C   A=0     -    PAN = 90 OR 270
21      CONTINUE
        SAXES(6)=90.
        IF(B.GT.0.) SAXES(6)=270.
        SAXES(7)=ATAN2(-C,ABS(B))*RAD
        GO TO 29
22      CONTINUE
        IF(ABS(B).GT.1.E-4) GO TO 24
C   B=0     -    PAN = 0 OR 180
        SAXES(6)=0.
        IF(A.LT.0.) SAXES(6)=180.
        SAXES(7)=ATAN2(-C,ABS(A))*RAD
        GO TO 29
C   A AND B BOTH .NE. ZERO   -    NORMAL CASE
C
24      CONTINUE
C   PAN = ATAN2( U-Y , X-U )
        SAXES(6)=ATAN2(-B,A)*RAD
C   TILT = ATAN2( W-Z , SQRT( ( X-U )*2+( V-Y )*2))
        SAXES(7)=ATAN2(-C,SQRT(A*A+B*B))*RAD
C
29      CONTINUE
        OLPAN=SAXES(6)
C
C       IF:             AND:           THEN:
C
C       IREVRS=0        PAN OK         DO NOTHING
C       IREVRS=0        PAN FLIPPED    SET IREVRS=1 & FLIP PAN,TILT
C       IREVRS=1        PAN OK         FLIP PAN,TILT
C       IREVRS=1        PAN FLIPPED    SET IREVRS=0
C
C
C CHECK FOR TILT OUTSIDE OF + OR - 90 DEG.
        IF(IREVRS.EQ.0) GO TO 65
C FLAG ON - IF FIRST TIME THRU IGNORE IT
        IF(IFIRST.EQ.1) GO TO 68
C IF REVERSAL OCCURRED LAST TIME WE ARE NOW OK - ELSE FLIP PAN,TILT
        IF(ABS(SAXES(6)-OLDPAN).LT.90.) GO TO 68
        IREVRS=0
        GO TO 69
65      CONTINUE
C FLAG OFF - IF FIRST TIME THRU IGNORE IT
        IF(IFIRST.EQ.1) GO TO 69
C IF REVERSAL OCCURRED LAST TIME SET FLAG AND FLIP PAN,TILT - ELSE DO NOTHING
        IF(ABS(SAXES(6)-OLDPAN).LT.90.) GO TO 69
        IREVRS=1
68      OLDPAN=SAXES(6)
        SAXES(6)=SAXES(6)+180.
        IF(SAXES(6).GE.360.) SAXES(6)=SAXES(6)-360.
        SAXES(7)=180.-SAXES(7)
        GO TO 60
69      OLDPAN=SAXES(6)
60      CONTINUE
        IF(SAXES(6).LT.0.) SAXES(6)=SAXES(6)+360.
        IF(SAXES(7).LT.0.) SAXES(7)=SAXES(7)+360.
        IFIRST=0
C
C
C FOCUS = SQRT(( X-U )*2+( Y-V )*2+( Z-W )*2)
        SAXES(9)=SQRT(A*A+B*B+C*C)-5.25
C   IF YAW > 180 THEN RE-TRANSFORM YAW = YAW-360
        IF(SAXES(14).GT.180.) SAXES(14)=SAXES(14)-360.
C DO LIMIT CHECKING
C******* NOT IN YET
C UPDATE THE SMOOTHED FILE WITH THESE VALUES
        IARRAY(12)=0
        DO 75 I=3,16
        J=JAX(I)
        IF(J.EQ.0) GO TO 75
        IF(I.EQ.16) PANGLE=SAXES(15)
        CALL RTOI(I,SAXES(I),IARRAY(J))
75      CONTINUE
        IARRAY(16)=NTIMES
X       TYPE "IREC=",IREC,"IVALS=",IARRAY
```

```
        CALL WRITR(40,IREC,IARRAY,8,IER)
        IF(IER.NE.1) GO TO 95
        IF(IREC.LT.NREC) GO TO 50
C  OUTPUT SHORT COUNT
        CALL READR(40,IREC,IARRAY,16,IER)
        IARRAY(16)=NTLAST
        CALL WRITR(40,IREC,IARRAY,16,IER)
C
C WRITE END-OF-DATA INDICATOR
C
70      CONTINUE
        DO 80 I=1,32
80      IARRAY(I)=-70000K
        IREC=IREC+16
        CALL WRITR(40,IREC,IARRAY,16,IER)
        IF(IER.NE.1) GO TO 95
        CALL CLOSE(40)
        RETURN
92      TYPE " PROBLEM IN INBET - CANNOT READ FILE 'SMOOTH' , IER=",IER
        CALL RESET
        CALL EXIT
95      TYPE " PROBLEM IN INBET - CANNOT WRITE TO 'SMOOTH' , IER=",IER
        CALL RESET
        CALL EXIT
        END
C                                                        **** INTRPL ****
        COMPILER NOSTACK
        SUBROUTINE INTRPL
C PERFORMS INBETWEENING COMPUTATIONS
C
C       IAX   = PARTICULAR AXIS TO BE INBETWEENED
C       XTIME = X VALUES FOR INBETWEENING
C       AXES  = Y VALUES FOR INBETWEENING
C       NPOS  = NUMBER OF DATA POINTS
C       XTIME(1)   = FIRST X VALUE FOR WHICH INTERP'ED Y VALUE IS TO BE SUPPLIE
C       XTIME(NPOS) = LAST  "  "  "  "
C       DELT  = DELT TIME BETWEEN INTERPOLATED VALUES
C
C
C OLD COMMENTS FOLLOW:
C
C INTERPOLATION OF A SINGLE-VALUED FUNCTION
C THIS SUBROUTINE INTERPOLATED, FROM VALUES OF THE FUNCTION
C GIVEN AS ORDINATES OF INPUT DATA POINTS IN AN X-Y PLANE
C AND FOR A GIVEN SET OF X VALUES (ABSCISSAS), THE VALUES OF
C A SINGLE-VALUED FUNCTION Y = Y(X).
C THE INPUT PARAMETERS ARE
C    IU = LOGICAL UNIT NUMBER OF STANDARD OUTPUT UNIT
C    L  = NUMBER OF INPUT DATA POINTS
C         (MUST BE 2 OR GREATER)
C    X  = ARRAY OF DIMENSION L STORING THE X VALUES
C         (ABSCISSAS) OF INPUT DATA POINTS
C         (IN ASCENDING ORDER)
C    Y  = ARRAY OF DIMENSION L STORING THE Y VALUES
C         (ORDINATES) OF INPUT DATA POINTS
C    N  = NUMBER OF POINTS AT WHICH INTERPOLATION OF THE
C         Y VALUE (ORDINATE) IS DESIRED
C         (MUST BE 1 OR GREATER)
C    U  = ARRAY OF DIMENSION N STORING THE X VALUES
C         (ABSCISSAS) OF DESIRED POINTS
C THE OUTPUT PARAMETER IS
C    V  = ARRAY OF DIMENSION N WHERE THE INTERPOLATED Y
C         VALUES (ORDINATES) ARE TO BE DISPLAYED
C DECLARATION STATEMENTS
        DIMENSION X(20),IV(2),Y(20)
        COMMON /COM6/ XTIME(20),YAX(20),IREC,TSTART,TEND,NPOINTS,DELT
        COMMON /HEAD/ IPROD(32),ISEQ(32),ISCEN(32),ICAMAN(32),IDIRCT(32),
     *  ICOMNTS(32),LENS,IPERF,FRATE,EXPS,ICS,NPOS,ISH,LASTF,
     *  MISC(22),IHIST(32),
     *  AXES(16,20)
        COMMON/ABC/ UK,X2,X5,SW,Y2,Y5,P0,Q0,Q1,V
        EQUIVALENCE (P0,X3),(Q0,Y3),(Q1,T3)
        REAL        M1,M2,M3,M4,M5
        EQUIVALENCE (UK,DX),(IMN,X2,A1,M1),(IMX,X5,A5,M5),
     1              (J,SW,SA),(Y2,W2,W4,Q2),(Y5,W3,Q3),
```

```
      2 (X,XTIME),(Y,YAX),(V,IV)
        DATA IU/12/
        CALL OPEN(IU,"STTO",0,IER)
C PRELIMINARY PROCESSING
X       TYPE "XTIME=",XTIME,"DELT=",DELT,"YAX=",YAX,"NPOS=",NPOS
        L=NPOINTS
        UX=TSTART-DELT
      L0=L
      LM1=L0-1
      LM2=LM1-1
      LP1=L0+1
      IF(LM2.LT.0)        GO TO 90
      DO 11  I=2,L0
         IF(X(I-1)-X(I))    11,95,96
  11     CONTINUE
      IPV=0
C MAIN DO-LOOP
  80     CONTINUE
C TEST FOR NORMAL RETURN
        IF(UX.GE.TEND) GO TO 200
        IREC=IREC+16
        UX=UX+DELT
        UK=UX
        IF(LM2.EQ.0)        GO TO 27
        IF(UK.GE.X(L0))     GO TO 26
        IF(UK.LT.X(1))      GO TO 25
        IMN=2
        IMX=L0
  21    I=(IMN+IMX)/2
        IF(UK.GE.X(I))      GO TO 23
        IMX=I
        GO TO 24
  23    IMN=I+1
  24    IF(IMX.GT.IMN)      GO TO 21
        I=IMX
        GO TO 30
  25    I=1
        GO TO 30
  26    I=LP1
        GO TO 30
  27    I=2
C CHECK IF I = IPV
  30    IF(I.EQ.IPV)        GO TO 70
        IPV=I
C ROUTINES TO PICK UP NECESSARY X AND Y VALUES AND
C          TO ESTIMATE THEM IF NECESSARY
        J=I
        IF(J.EQ.1)         J=2
        IF(J.EQ.LP1)       J=L0
        X3=X(J-1)
        Y3=Y(J-1)
        X4=X(J)
        Y4=Y(J)
        A3=X4-X3
        M3=(Y4-Y3)/A3
        IF(LM2.EQ.0)        GO TO 43
        IF(J.EQ.2)          GO TO 41
        X2=X(J-2)
        Y2=Y(J-2)
        A2=X3-X2
        M2=(Y3-Y2)/A2
        IF(J.EQ.L0)         GO TO 42
  41    X5=X(J+1)
        Y5=Y(J+1)
        A4=X5-X4
        M4=(Y5-Y4)/A4
        IF(J.EQ.2)          M2=M3+M3-M4
        GO TO 45
  42    M4=M3+M3-M2
        GO TO 45
  43    M2=M3
        M4=M3
  45    IF(J.LE.3)          GO TO 46
        A1=X2-X(J-3)
        M1=(Y2-Y(J-3))/A1
        GO TO 47
```

```
   46    M1=M2+M2-M3
   47    IF(J.GE.LM1)         GO TO 48
         A5=X(J+2)-X5
         M5=(Y(J+2)-Y5)/A5
         GO TO 50
   48    M5=M4+M4-M3
C NUMERICAL DIFFERENTIATION
   50    IF(I.EQ.LP1)         GO TO 52
         W2=ABS(M4-M3)
         W3=ABS(M2-M1)
         SW=W2+W3
         IF(SW.NE.0.0)        GO TO 51
         W2=0.5
         W3=0.5
         SW=1.0
   51    T3=(W2*M2+W3*M3)/SW
         IF(I.EQ.1)           GO TO 54
   52    W3=ABS(M5-M4)
         W4=ABS(M3-M2)
         SW=W3+W4
         IF(SW.NE.0.0)        GO TO 53
         W3=0.5
         W4=0.5
         SW=1.0
   53    T4=(W3*M3+W4*M4)/SW
         IF(I.NE.LP1)         GO TO 60
         T3=T4
         SA=A2+A3
         T4=0.5*(M4+M5-A2*(A2-A3)*(M2-M3)/(SA*SA))
         X3=X4
         Y3=Y4
         A3=A2
         M3=M4
         GO TO 60
   54    T4=T3
         SA=A3+A4
         T3=0.5*(M1+M2-A4*(A3-A4)*(M3-M4)/(SA*SA))
         X3=X3-A4
         Y3=Y3-M2*A4
         A3=A4
         M3=M2
C DETERMINATION OF THE COEFFICIENTS
   60    Q2=(2.0*(M3-T3)+M3-T4)/A3
         Q3=(-M3-M3+T3+T4)/(A3*A3)
C COMPUTATION OF THE POLYNOMIAL
   70    DX=UK-P0
         V=Q0+DX*(Q1+DX*(Q2+DX*Q3))
         CALL WRITR(40,IREC,IV,1,IER)
C        WRITE(10,222) IREC,V,IV
C222     FORMAT(" IREC=",I4," V=",E14.4,"  IV=",2I7)
         IF(IER.EQ.1) GO TO 80
         WRITE(IU,2098) IREC,IER
C
C NORMAL RETURN
C
  200    CONTINUE
         CALL CLOSE(IU,IER)
         RETURN
C
C ERROR EXIT
   90    WRITE (IU,2090)
         GO TO 99
   95    WRITE (IU,2095)
         GO TO 97
   96    WRITE (IU,2096)
   97    J=I-1
         WRITE (IU,2097) I,X(I),X(J)
   99    WRITE (IU,2099) L0,N0,IAX
         GO TO 200
C FORMAT STATEMENTS
 2090 FORMAT(1X/22H ***    L = 1 OR LESS./)
 2095 FORMAT(1X/27H ***    IDENTICAL X VALUES./)
 2096 FORMAT(1X/33H ***    X VALUES OUT OF SEQUENCE./)
 2097 FORMAT(6H   I =,I7,10X,6HX(I) =,E12.3,5X,"X(I-1) =",E12.3)
```

```
2098    FORMAT(1X/" ***    WRITE ERROR  -  RECORD",I9," - IER =",I5)
2099    FORMAT(6H   L =,I7,10X,3HN =,I7,3X,"IAX =",I4/
       1        36H ERROR DETECTED IN ROUTINE    INTRPL)
        END
C                                                        **** STINBET ****
        COMPILER NOSTACK
        OVERLAY ZSTINTRP
        SUBROUTINE STINBET
C PERFORM CAMERA POSITION INBETWEENING FOR STOP-ACTION FILMING
C AXES ARE:
C           1 - PROCESS PROJECTOR
C           2 - W (POINT OF INTEREST)
C           3 - TRUCK
C           4 - E/W
C           5 - N/S
C           6 - PAN
C           7 - TILT
C           8 - ROLL
C           9 - FOCUS
C          10 - TRANSPORT MOTOR
C          11 - U (POINT OF INTEREST)
C          12 - V (POINT OF INTEREST)
C          13 - MODEL STAND TRUCK
C          14 - MODEL STAND YAW
C          15 - MODEL STAND PITCH
C          16 - MODEL STAND ROLL
C
C              IREVRS          - IF .EQ. 1  -> TILT HAS MOVED BEYOND +/- 90
C                                IF SO:  PAN  <- PAN +180
C                                        TILT <- 180-TILT
C
        COMMON /KEYS/ KSCRN
        COMMON /HEAD/ IPROD(32),ISEQ(32),ISCEN(32),ICAMAN(32),IDIRCT(32),
       *  ICOMNTS(32),LENS,IPERF,FRATE,EXPS,ICS,NPOS,ISH,LASTF,IFRM1,IPROJ,
       *  MISC(20),IHIST(32),
       *  AXES(16,20)
        COMMON /COM1/ NTAKE,IPOS,IFILE(6)
        COMMON /COM2/ IARG1,IARG2,ARG1,ARG2,ICOM(20),KER
        COMMON /COM4/ DELTC,DELTS
        COMMON /COM6/ XTIME(20),YAX(20),IREC,TSTART,TEND,NPOINTS,DELT
        DIMENSION IARRAY(320),SAXES(16)
        EQUIVALENCE (IARRAY,AXES),(SAXES,ISEQ)
        DATA IBEEP/7K/
        DATA MSG/1/
        DATA RAD/57.2957795/
C
C OPEN TAKE FILE AND READ IN AXIS DATA
C
        CALL OPEN(40,IFILE,0,IER,64)
        CALL READR(40,8,LENS,1,IER)
X       TYPE "AFTER FIRST READ NPOS,IFRATE=",NPOS,IFRATE
        CALL READR(40,8,IARRAY,NPOS,IER)
X       TYPE "AFTER SECOND READ AXES=",((AXES(I,J),J=1,8),I=1,2)
        CALL CLOSE(40,IER)
C
        IREVRS=0
        IF(AXES(7,1).GT.90.0.AND.AXES(7,1).LT.270.) IREVRS=1
        IF(NPOS.GE.2) GO TO 13
        CALL REC(KSCRN,MSG)
        CALL MOVCURS(22,1,IER)
        TYPE "CANNOT INBETWEEN A TAKE WITH ONLY ONE POSITION"
        CALL XMT(KSCRN,MSG,$12)
12      CONTINUE
        KER=13
        RETURN
13      CONTINUE
C
C DELETE OLD 'STOPACT' FILE AND CREATE NEW ONE
C
        CALL STAT("STOPACT",ISEQ,IER)
        IF(IER.EQ.1) CALL DFILW("STOPACT",IER)
        CALL CFILW("STOPACT",3,300,IER)
        IF(IER.EQ.1) GO TO 70
        TYPE " CANNOT CREATE FILE 'STOPACT' - IER=",IER
99      CALL RESET
        CALL EXIT
```

```
C
C OPEN FILE
C
70        CALL OPEN(40,"STOPACT",0,IER,4)
          IF(IER.EQ.1) GO TO 85
          TYPE " CANNOT OPEN FILE 'STOPACT'   -   IER=",IER
          GO TO 99
C
C COMPUTE U,V,W FOR EACH POSITION
C
85        CONTINUE
          DO 10 I=1,NPOS
C IF PAN AND TILT ARE BLANK, POI STAYS THE SAME
          IF(AXES(6,I).EQ.-100000.) GO TO 20
C IF POI .LT. ZERO, DROP OUT
          IF(AXES(10,I).GT.0.) GO TO 86
          KER=13
          CALL REC(KSCRN,MSG)
          CALL MOVCURS(20,1,IER)
          TYPE "CANNOT INBETWEEN A TAKE WITH NEGATIVE POI VALUES"
          CALL XMT(KSCRN,MSG,$87)
87        CONTINUE
          WRITE BINARY(10) IBEEP
          CALL FDELY(200)
          GO TO 78
86        CONTINUE
C
          D=AXES(10,I)+5.25
          A=AXES(7,I)/RAD
          CT=COS(A)
          ST=SIN(A)
          A=AXES(6,I)/RAD
          CP=COS(A)
          SP=SIN(A)
C COMPUTE U = TRUCK - POI * COS(TILT) * COS(PAN)
          AXES(11,I)=AXES(3,I)-D*CT*CP
C COMPUTE V = E/W + POI * COS(TILT) * SIN(PAN)
          AXES(12,I)=AXES(4,I)+D*CT*SP
C COMPUTE W = N/S + POI * SIN(TILT)
          AXES(2,I)=AXES(5,I)+D*ST
          GO TO 10
C POI STAYS THE SAME AS BEFORE
20        II=I-1
          AXES(11,I)=AXES(11,II)
          AXES(12,I)=AXES(12,II)
          AXES(2,I)=AXES(2,II)
10        CONTINUE
C CHECK IF YAW MUST MOVE THRU 180
C IF SO, TRANSFORM YAW<0 INTO YAW=360+YAW
          DO 72 I=2,NPOS
          IF(ABS(AXES(14,I)-AXES(14,I-1)).GT.180.) GO TO 73
72        CONTINUE
          GO TO 75
73        CONTINUE
          DO 74 I=1,NPOS
          IF(AXES(14,I).GE.0.) GO TO 74
          AXES(14,I)=360.+AXES(14,I)
74        CONTINUE
75        CONTINUE
C
C INBETWEEN TRUCK,E/W,N/S,ROLL,U,V,W
C
C COMPUTE TIME AXIS VALUES
          DO 35 J=1,NPOS
          XTIME(J)=AXES(1,J)
35        CONTINUE
X         TYPE "XTIME=",XTIME
C
C SET UP LIMITS FOR INTRPL
          TSTART=XTIME(1)
          TEND=XTIME(NPOS)
          NPOINTS=NPOS
          DELT=1
          NREC=(IFIX(AXES(1,NPOS)-AXES(1,1))+1)*16-16
          DO 30 I=2,16
```

```
X           TYPE "I=",I
            IF(I.EQ.6) GO TO 30
            IF(I.EQ.7) GO TO 30
            IF(I.EQ.9) GO TO 30
            IF(I.EQ.10) GO TO 30
            DO 32 J=1,NPOS
            YAX(J)=AXES(I,J)
32          CONTINUE
X           TYPE "YAX=",YAX
C
            IREC=I-17
X           TYPE "GOING INTO STINTRPL"
            CALL STINTRPL
C
30          CONTINUE
C
C COMPUTE PAN,TILT,AND FOCUS FOR EACH POINT IN SMOOTHED FILE
C
            IFIRST=1
            IREC=-16
C   SET IPCOUNT SO WE ADVANCE FRAMES CORRECTLY FROM BEGINNING
            IPCOUNT=-1
50          CONTINUE
            IREC=IREC+16
            CALL READR(40,IREC,ISEQ,16,IER)
C           WRITE(10,222) (ISEQ(I),I=1,16),(SAXES(I),I=1,8)
C222        FORMAT(8OI7/8OI7/4E14.4/4E14.4)
            IF(IER.NE.1) GO TO 92
C   COMPUTE A,B,C
            A=SAXES(3)-SAXES(11)
            B=SAXES(4)-SAXES(12)
            C=SAXES(5)-SAXES(2)
C
C CHECK FOR DEGENERATIVE CASES  -  WHERE A AND/OR B = ZERO
C
            IF(ABS(A).GT.1.E-4) GO TO 22
            IF(ABS(B).GT.1.E-4) GO TO 21
C   A=B=0    -   TILT = 90 OR 270    PAN = PREVIOUS VALUE OF PAN
            SAXES(7)=90.
            IF(C.GT.0.) SAXES(7)=270.
            IF(IFIRST.EQ.1) GO TO 23
            SAXES(6)=OLPAN
            GO TO 29                    ; IF NOT FIRST TIME PAN = PREVIOUS VALUE OF PAN
23          SAXES(6)=AXES(6,1)          ; IF FIRST TIME THRU PAN = VALUE IN TAKE FILE
            GO TO 29
C   A=0      -   PAN = 90 OR 270
21          CONTINUE
            SAXES(6)=90.
            IF(B.GT.0.) SAXES(6)=270.
            SAXES(7)=ATAN2(-C,ABS(B))*RAD
            GO TO 29
22          CONTINUE
            IF(ABS(B).GT.1.E-4) GO TO 24
C   B=0      -   PAN = 0 OR 180
            SAXES(6)=0.
            IF(A.LT.0.) SAXES(6)=180.
            SAXES(7)=ATAN2(-C,ABS(A))*RAD
            GO TO 29
C   A AND B BOTH .NE. ZERO   -   NORMAL CASE
C
24          CONTINUE
C PAN = ATAN2( V-Y , X-U )
            SAXES(6)=ATAN2(-B,A)*RAD
C TILT = ATAN2( W-Z , SQRT( ( X-U )*2+( V-Y )*2))
            SAXES(7)=ATAN2(-C,SQRT(A*A+B*B))*RAD
C
29          CONTINUE
            OLPAN=SAXES(6)
C
C         IF:              AND:              THEN:
C
C         IREVRS=0         PAN OK            DO NOTHING
C         IREVRS=0         PAN FLIPPED       SET IREVRS=1 & FLIP PAN,TILT
C         IREVRS=1         PAN OK            FLIP PAN,TILT
C         IREVRS=1         PAN FLIPPED       SET IREVRS=0
C
```

```
C  CHECK FOR TILT OUTSIDE OF + OR - 90 DEG
         IF(IREVRS.EQ.0) GO TO 65
C  FLAG ON - IF FIRST TIME THRU IGNORE IT
         IF(IFIRST.EQ.1) GO TO 68
C  IF REVERSAL OCCURRED LAST TIME WE ARE NOW OK - ELSE FLIP PAN,TILT
         IF(ABS(SAXES(6)-OLDPAN).LT.90.) GO TO 68
         IREVRS=0
         GO TO 69
65       CONTINUE
C  FLAG OFF - IF FIRST TIME THRU IGNORE IT
         IF(IFIRST.EQ.1) GO TO 69
C  IF REVERSAL OCCURRED LAST TIME SET FLAG AND FLIP PAN,TILT - ELSE DO NOTHING
         IF(ABS(SAXES(6)-OLDPAN).LT.90.) GO TO 69
         IREVRS=1
68       OLDPAN=SAXES(6)
         SAXES(6)=SAXES(6)+180.
         IF(SAXES(6).GE.360.) SAXES(6)=SAXES(6)-360.
         SAXES(7)=180.-SAXES(7)
         GO TO 60
69       OLDPAN=SAXES(6)
60       CONTINUE
         IF(SAXES(6).LT.0.) SAXES(6)=SAXES(6)+360.
         IF(SAXES(7).LT.0.) SAXES(7)=SAXES(7)+360.
         IFIRST=0
C
C
C  FOCUS = SQRT(( X-U )**2+( Y-V )**2+( Z-W )**2)
         SAXES(9)=SQRT(A*A+B*B+C*C)-5.25
C  IF YAW > 180  THEN TRANSFORM  YAW=YAW-360
         IF(SAXES(14).GT.180.) SAXES(14)=SAXES(14)-360.
C  SET PROCESS PROJECTOR CONTROL VALUE
         SAXES(1)=0.
         IF(IPROJ.EQ.0) GO TO 55
         IF(IPROJ.LT.0) GO TO 54
         IPCOUNT=IPCOUNT+1
         IF(IPCOUNT.LT.IPROJ) GO TO 55
         IPCOUNT=0
         SAXES(1)=1.
         GO TO 55
54       SAXES(1)=FLOAT(-IPROJ)
55       CONTINUE
C  UPDATE THE SMOOTHED FILE WITH THESE VALUES
         CALL WRITR(40,IREC,ISEQ,16,IER)
         IF(IER.NE.1) GO TO 95
         IF(IREC.LT.NREC) GO TO 50
C
78       CONTINUE
         DO 80 I=1,32
80       IARRAY(I)=-70000K
         IREC=NREC+16
         CALL WRITR(40,IREC,IARRAY,16,IER)
         IF(IER.NE.1) GO TO 95
         CALL CLOSE(40)
         RETURN
92       TYPE " PROBLEM IN STINBET - CANNOT READ 'STOPACT' , IER=",IER
         CALL RESET
         CALL EXIT
95       TYPE " PROBLEM IN STINBET - CANNOT WRITE TO 'STOPACT' , IER=",IER
         CALL RESET
         CALL EXIT
         END
C                                                         **** STINTRPL ****
         COMPILER NOSTACK
         SUBROUTINE STINTRPL
C  PERFORMS INBETWEENING COMPUTATIONS
C
C       IAX    - PARTICULAR AXIS TO BE INBETWEENED
C       XTIME  - X VALUES FOR INBETWEENING
C       AXES   - Y VALUES FOR INBETWEENING
C       NPOS   - NUMBER OF DATA POINTS
C       XTIME(1)    - FIRST X VALUE FOR WHICH INTERP'ED Y VALUE IS TO BE SUPPLI!
C       XTIME(NPOS) - LAST   "  "  "   "
C       DELT   - DELT TIME BETWEEN INTERPOLATED VALUES
C
C
```

```
C OLD COMMENTS FOLLOW:
C
C INTERPOLATION OF A SINGLE-VALUED FUNCTION
C THIS SUBROUTINE INTERPOLATED, FROM VALUES OF THE FUNCTION
C GIVEN AS ORDINATES OF INPUT DATA POINTS IN AN X-Y PLANE
C AND FOR A GIVEN SET OF X VALUES (ABSCISSAS), THE VALUES OF
C A SINGLE-VALUED FUNCTION Y = Y(X).
C THE INPUT PARAMETERS ARE
C      IU = LOGICAL UNIT NUMBER OF STANDARD OUTPUT UNIT
C      L  = NUMBER OF INPUT DATA POINTS
C           (MUST BE 2 OR GREATER)
C      X  = ARRAY OF DIMENSION L STORING THE X VALUES
C           (ABSCISSAS) OF INPUT DATA POINTS
C           (IN ASCENDING ORDER)
C      Y  = ARRAY OF DIMENSION L STORING THE Y VALUES
C           (ORDINATES) OF INPUT DATA POINTS
C      N  = NUMBER OF POINTS AT WHICH INTERPOLATION OF THE
C           Y VALUE (ORDINATE) IS DESIRED
C           (MUST BE 1 OR GREATER)
C      U  = ARRAY OF DIMENSION N STORING THE X VALUES
C           (ABSCISSAS) OF DESIRED POINTS
C THE OUTPUT PARAMETER IS
C      V  = ARRAY OF DIMENSION N WHERE THE INTERPOLATED Y
C           VALUES (ORDINATES) ARE TO BE DISPLAYED
C DECLARATION STATEMENTS
       DIMENSION X(20),IV(2),Y(20)
       COMMON /COM6/ XTIME(20),YAX(20),IREC,TSTART,TEND,NPOINTS,DELT
       COMMON /HEAD/ IPROD(32),ISEQ(32),ISCEN(32),ICAMAN(32),IDIRCT(32),
     * ICOMNTS(32),LENS,IPERF,FRATE,EXPS,ICS,NPOS,ISH,LASTF,
     * MISC(22),IHIST(32),
     * AXES(16,20)
       COMMON/STABC/ UK,X2,X5,SW,Y2,Y5,P0,Q0,Q1,V
       EQUIVALENCE (P0,X3),(Q0,Y3),(Q1,T3)
       REAL         M1,M2,M3,M4,M5
       EQUIVALENCE (UK,DX),(IMN,X2,A1,M1),(IMX,X5,A5,M5),
     1             (J,SW,SA),(Y2,W2,W4,Q2),(Y5,W3,Q3),
     2 (X,XTIME),(Y,YAX),(V,IV)
       DATA IU/12/
       CALL OPEN(IU,"STTO",0,IER)
C PRELIMINARY PROCESSING
X      TYPE "XTIME=",XTIME,"DELT=",DELT,"YAX=",YAX,"NPOS=",NPOS
       L=NPOINTS
       UX=TSTART-DELT
       L0=L
       LM1=L0-1
       LM2=LM1-1
       LP1=L0+1
       IF(LM2.LT.0)      GO TO 90
       DO 11 I=2,L0
         IF(X(I-1)-X(I)) 11,95,96
   11  CONTINUE
       IPV=0
C MAIN DO-LOOP
   80  CONTINUE
C TEST FOR NORMAL RETURN
       IF(UX.GE.TEND) GO TO 200
       IREC=IREC+16
       UX=UX+DELT
       UK=UX
       IF(LM2.EQ.0)      GO TO 27
       IF(UK.GE.X(L0))   GO TO 26
       IF(UK.LT.X(1))    GO TO 25
       IMN=2
       IMX=L0
   21  I=(IMN+IMX)/2
       IF(UK.GE.X(I))    GO TO 23
       IMX=I
       GO TO 24
   23  IMN=I+1
   24  IF(IMX.GT.IMN)    GO TO 21
       I=IMX
       GO TO 30
   25  I=1
       GO TO 30
   26  I=LP1
```

```
              GO TO 30
      27   I=2
C CHECK IF I = IPV
      30   IF(I.EQ.IPV)         GO TO 70
           IPV=I
C ROUTINES TO PICK UP NECESSARY X AND Y VALUES AND
C          TO ESTIMATE THEM IF NECESSARY
           J=I
           IF(J.EQ.1)           J=2
           IF(J.EQ.LP1)         J=L0
           X3=X(J-1)
           Y3=Y(J-1)
           X4=X(J)
           Y4=Y(J)
           A3=X4-X3
           M3=(Y4-Y3)/A3
           IF(LM2.EQ.0)         GO TO 43
           IF(J.EQ.2)           GO TO 41
           X2=X(J-2)
           Y2=Y(J-2)
           A2=X3-X2
           M2=(Y3-Y2)/A2
           IF(J.EQ.L0)          GO TO 42
      41   X5=X(J+1)
           Y5=Y(J+1)
           A4=X5-X4
           M4=(Y5-Y4)/A4
           IF(J.EQ.2)           M2=M3+M3-M4
           GO TO 45
      42   M4=M3+M3-M2
           GO TO 45
      43   M2=M3
           M4=M3
      45   IF(J.LE.3)           GO TO 46
           A1=X2-X(J-3)
           M1=(Y2-Y(J-3))/A1
           GO TO 47
      46   M1=M2+M2-M3
      47   IF(J.GE.LM1)         GO TO 48
           A5=X(J+2)-X5
           M5=(Y(J+2)-Y5)/A5
           GO TO 50
      48   M5=M4+M4-M3
C NUMERICAL DIFFERENTIATION
      50   IF(I.EQ.LP1)         GO TO 52
           W2=ABS(M4-M3)
           W3=ABS(M2-M1)
           SW=W2+W3
           IF(SW.NE.0.0)        GO TO 51
           W2=0.5
           W3=0.5
           SW=1.0
      51   T3=(W2*M2+W3*M3)/SW
           IF(I.EQ.1)           GO TO 54
      52   W3=ABS(M5-M4)
           W4=ABS(M3-M2)
           SW=W3+W4
           IF(SW.NE.0.0)        GO TO 53
           W3=0.5
           W4=0.5
           SW=1.0
      53   T4=(W3*M3+W4*M4)/SW
           IF(I.NE.LP1)         GO TO 60
           T3=T4
           SA=A2+A3
           T4=0.5*(M4+M5-A2*(A2-A3)*(M2-M3)/(SA*SA))
           X3=X4
           Y3=Y4
           A3=A2
           M3=M4
           GO TO 60
      54   T4=T3
           SA=A3+A4
           T3=0.5*(M1+M2-A4*(A3-A4)*(M3-M4)/(SA*SA))
           X3=X3-A4
```

```
            Y3=Y3-M2*A4
            A3=A4
            M3=M2
C DETERMINATION OF THE COEFFICIENTS
   60       Q2=(2.0*(M3-T3)+M3-T4)/A3
            Q3=(-M3-M3+T3+T4)/(A3*A3)
C COMPUTATION OF THE POLYNOMIAL
   70       DX=UK-P0
            V=Q0+DX*(Q1+DX*(Q2+DX*Q3))
            CALL WRITR(40,IREC,IV,1,IER)
C           WRITE(10,222) IREC,V,IV
C222        FORMAT(" IREC=",I4," V=",E14.4," IV=",2OI7)
            IF(IER.EQ.1) GO TO 80
            WRITE(IU,2098) IREC,IER
C
C NORMAL RETURN
C
  200       CONTINUE
            CALL CLOSE(IU,IER)
            RETURN
C
C ERROR EXIT
   90  WRITE (IU,2090)
       GO TO 99
   95  WRITE (IU,2095)
       GO TO 97
   96  WRITE (IU,2096)
   97       J=I-1
            WRITE (IU,2097) I,X(I),X(J)
   99  WRITE (IU,2099) L0,N0,IAX
       GO TO 200
C FORMAT STATEMENTS
 2090 FORMAT(1X/22H  ***    L = 1 OR LESS./)
 2095 FORMAT(1X/27H  ***    IDENTICAL X VALUES./)
 2096 FORMAT(1X/33H  ***    X VALUES OUT OF SEQUENCE./)
 2097 FORMAT(6H   I =,I7,10X,6HX(I) =,E12.3,5X,"X(I-1) =",E12.3)
 2098    FORMAT(1X/"  ***    WRITE ERROR  -  RECORD",I9,"  -  IER =",I5)
 2099 FORMAT(6H   L =,I7,10X,3HN =,I7,3X,"IAX =",I4/
     1       38H ERROR DETECTED IN ROUTINE    STINTRPL)
            END
C                                                           **** DUMPSTOP ****
            COMPILER NOSTACK
            DIMENSION VAL(16),ID(3),IT(3),IARRAY(3)
            COMMON /COM1/ IVAL(32)
            EQUIVALENCE (IVAL,VAL)
            DATA IARRAY/-1,0,40000K/
            ACCEPT "INPUT THE OUTPUT DEVICE CODE : ",IOUT
            ACCEPT "START AT FRAME : ",ISTRT
            ACCEPT "STOP AT FRAME : ",ISTOP
            IF(IOUT.NE.10) CALL OPEN(IOUT,"$TTO",IARRAY,IER)
            CALL DATE(ID,IER)
            CALL TIME(IT,IER)
            CALL OPEN(40,"STOPACT",0,IER,64)
            WRITE(IOUT,100) ID,IT(1),IT(2)
  100       FORMAT(20X,"DUMP OF INBETWEENED FILE = ",I2,"/",I2,"/",I2,5X,I2,":",I2
     *       8X,"TRUCK     E/W       N/S      PAN     TILT     ROLL",
     *       "     FOCUS",6X,"POINT OF INTEREST",17X,"MODEL STAND"/
     *       67X,"U",7X,"V",7X,"W",9X,"TRUCK    YAW    PITCH   ROLL"/)
C
            DO 10 I=ISTRT,ISTOP
            J=I-1
            CALL READR(40,J,IVAL,1,IER)
            IF(IER.EQ.9) GO TO 90
            IF(IVAL(1).EQ.-70000K) GO TO 95
            WRITE(IOUT,110) I,(VAL(K),K=3,9),VAL(11),VAL(12),VAL(2),(VAL(K),K=13,1
  110       FORMAT(I5,F8.2,2F7.2,3F8.2,F10.2,1X,3F8.2,5X,4F7.2)
   10       CONTINUE
C
   90       WRITE(IOUT,120)
  120       FORMAT(" END OF FILE")
            GO TO 99
   95       WRITE(IOUT,130)
  130       FORMAT(" END OF DATA")
   99       CALL RESET
            STOP
            END
```

** DUMPSMOOTH **

```
C
        COMPILER NOSTACK
        COMMON /HEAD/ IBLN1(192),LENS,MISC(31),IBLN2(672)
        DIMENSION VAL(16),ID(3),IT(3),XX(12)
        COMMON /COM1/ IVAL(32),IARRAY(3),JAX(11)
        COMMON /COM9/ PANGLE
        COMMON /SENS/ ITRSNS,IDUM(5)
        EQUIVALENCE (IVAL,VAL)
        DATA IARRAY/-1,0,40000K/
        DATA JAX/3,4,5,6,7,8,9,13,14,15,16/
C
        ACCEPT "INPUT THE OUTPUT DEVICE CODE: ",IOUT
        ACCEPT "INPUT TRACK SENSOR VALUE: ",ITRSNS
        ACCEPT "INPUT THE LENS TYPE: ",LENS
        ACCEPT "FIRST DATA POINT TO BE DISPLAYED = ",ISTRT
        ACCEPT "LAST DATA POINT TO BE DISPLAYED = ",ISTOP
        IF(IOUT.NE.10) CALL OPEN(IOUT,"STTO",IARRAY,IER)
C
        CALL DATE(ID,IER)
        CALL TIME(IT,IER)
        CALL OPEN(40,"SMOOTH",0,IER,64)
        WRITE(IOUT,100) ID,IT(1),IT(2)
100     FORMAT(20X,"DUMP OF INBETWEENED FILE - ",I2,"/",I2,"/",I2,5X,I2,":",I2,
       * 12X,"TRUCK    E/W     N/S     PAN     TILT    ROLL",
       * 6X,"FOCUS",5X,"POINT OF INTEREST",17X,"MODEL STAND"/
       * 71X,"U",7X,"V",7X,"W",9X,"TRUCK    YAW    PITCH   ROLL")
C
        DO 10 I=ISTRT,ISTOP
        J=I-1
        CALL READR(40,J,IVAL,1,IER)
        IF(IER.EQ.9) GO TO 90
        IF(IVAL(1).EQ.-70000K) GO TO 95
           DO 20 K=1,11
        J=JAX(K)
           CALL ITOR(J,IVAL(K),XX(K))
20      CONTINUE
        WRITE(IOUT,110) I,(XX(L),L=1,7),VAL(11),VAL(12),
       * (XX(L),L=8,11)
110     FORMAT(I5,4X,F8.2,2F7.2,3F8.2,F10.2,1X,2F8.2,13X,4F7.2)
10      CONTINUE
C
90      WRITE(IOUT,120)
120     FORMAT(" END OF FILE")
        GO TO 99
95      WRITE(IOUT,130)
130     FORMAT(" END OF DATA")
99      CALL RESET
        STOP
        END
        .TITL   HMA
        .ENT    START
        .NREL
START:  .SYSTM
        .MEM
        JMP     .+1
        MOV     0,2
        .SYSTM
        .ERTN
        .END    START
```

APPENDIX D

| ROUTINE NAME | FUNCTION |
| --- | --- |
| ACES | Main program; processes all (except editing) commands |
| INITX, CREATE | Creates a new take |
| GETCOM | Accepts and interprets user input |
| JOG | Moves ACES hardware according to jog (special function) keys 70 |
| MVCAM | Moves ACES hardware to a position specified by AXES array |
| CAMDISP | Displays current camera position and state indicators on screen |
| DIOMON | Monitors digital input and sets status flags |

CONTENTS OF "EDITING", "INBETWEENING", AND "SHOOTING" FUNCTIONAL GROUPS

| GROUP NAME | ROUTINE NAME | FUNCTION |
| --- | --- | --- |
| Editing | EDITX | Initializes the editor |
| | EDCOM | Processes all edit commands |
| | ADDX | Adds a new position |
| | DELX | Deletes a position |
| | DISPX | Displays or prints axis values for all positions |
| | AXDISP | Displays axis data for position being edited |
| | ENDX | Terminates the editor |
| Inbetweening | INBET | Inbetweens takes to be shot in continuous motion |
| | INTRPL | Performs actual curve fit/interpolation for INBET |
| | STINBET | Inbetweens takes to be shot in stop motion. |
| | STINTRPL | Performs actual curve fit/interpolation for STINBET |
| Shooting | SHOOT | Shoots and rehearses in continuous motion |
| | DISKIN | Loads core buffer with inbetweened positions for SHOOT |
| | TIMER | User clock for SHOOT |
| | FLMDISP | Displays current take frame and model stand position |
| | IDIV | Integer divide routine (returns both quotient and remainder) |
| | STSHOOT | Shoots and rehearses in stop motion mode |
| | STFLMDISP | Displays current take frame |
| | MODDISP | Displays position of model stand axes |
| | FRAME | Exposes one frame |

APPENDIX E

| COMMANDS | SUBROUTINE(S) CALLED |
| --- | --- |
| CREATE | ACES→CREATE→EDITX →EDCOME |
| TAKE | ACES→EDITX→EDCOM |
| REHEARSE | ACES→INBET→SHOOT (for continuous) |
| | ACES→STINBET→STSHOOT (for stop-motion) |
| SET | ACES→SETFR |
| SHOOT | ACES→INBET→SHOOT (for continuous) |
| | ACES→STINBET STSHOOT (for stop-motion) |
| | ACES→LISTX |
| RS | ACES→PFRST |
| QUIT | ACES |
| OPEN | ACES→OPNSH |
| CLOSE | ACES→CLOSH |
| PR or PP | ACES→PROJ |
| CINEX | ACES→CINEX |
| RANGE | ACES→RANGE |
| SLATE | ACES→SLATE |
| LL | ACES |
| DISPLAY | EDCOM→DISPX |
| POSITION | EDCOM |
| ADD | EDCOM→ADDX |
| DELETE | EDCOM→DELX |
| FRAME | EDCOM |
| UPDATE | EDCOM |
| MOVE | EDCOM→MVCAM |
| TRUCK | EDCOM |
| EW or EA | EDCOM |
| NS or NO | EDCOM |
| PAN | EDCOM |
| TILT | EDCOM |
| ROLL | EDCOM |
| FOCUS | EDCOM |
| PI | EDCOM |
| MT | EDCOM |
| MY | EDCOM |
| MP | EDCOM |
| MR | EDCOM |
| END | EDCOM→ENDX —return→ ACES |
| PR or PP | EDCOM |
| MS | EDCOM |

We claim:

1. An automated motion picture camera control system comprising:
camera positioning means for positioning and holding a motion picture camera along a plurality of independent position axes,
memory means for storing electronically encoded desired co-ordinates of said positioning means for each of said position axes for each of a plurality of separated and enumerated film frames,
operator input means connected to said memory means for manually providing co-ordinates and for designating an associated film frame by number,
means connected to said memory means for deriving position-co-ordinates for each position axis for each frame between sequential designated frames,
actuating means for cycling said means for deriving sequentially through film frames between sequential designated film frames and for coupling said memory means and said means for deriving to said camera positioning means to direct said camera positioning means to the cor-ordinate positions of sequential film frames.

2. An automated motion picture camera control system of claim 1 in which said camera positioning means includes separate servo-mechanisms for moving a motion picture camera along longitudinal, lateral, elevational, roll, pan, tilt and focal axes.

3. An automated motion picture camera control system of claim 1 which in said camera positioning means includes a servo mechanism for adjusting the camera focus in a focal axis, and said operator input means includes means for specifying a point of interest as a distance from the film plane of a camera at a particular film frame and a lens code associated with a particular lens assembly and said means for deriving automatically specifies a focal co-ordinate for each film frame based upon stored encoded characteristics associated with said lens code and using the position co-ordinates along said other axes.

4. An automated motion picture camera control system of claim 1 in which said lens assembly includes a lens barrel carrying said lens and rotatably mounted on said camera, whereby angular rotation of said barrel proportionally alters the distance of said lens from said film, and said encoded characteristics include at least one algorithm relating angular position of said lens barrel to lens distance from said point of interest.

5. The automated motion picture camera control system of claim 1 further comprising a subject positioning means for positioning and holding a subject along a plurality of independent subject position axes, and further characterized in that said memory means stores electronically encoded desired subject co-ordinates of said subject positioning means for each of said subject position axes for each of said plurality of designated film frames, and further comprising means for entering said desired subject co-ordinates into said memory means through said operator input means, and said means for deriving determines subject position co-ordinates along each position axis for each frame between sequential designated frames, and said actuating means couples said memory means and said means for deriving to said subject positioning means to direct said subject positioning means to the subject co-ordinate positions for sequential film frames.

6. An automated motion picture camera control system of claim 3 or 5 in which said means for deriving additionally uses the subject position co-ordinate of said subject positioning means to determine focal co-ordinates for each film frame.

7. An automated motion picture camera control system according to claim 1 further comprising camera film transport means for advancing and rewinding film coupled to said actuating means and including encoding means to provide film position signals of film frame passage and direction of movement therethrough, and said memory means receives said film position signals and stores in encoded form a number corresponding to the film frame currently at said film lens, and further comprising means for displaying said number to a control system operator.

8. An automated motion picture camera control system according to claim 1 further comprising camera film transport means for advancing and rewinding film coupled to said actuating means and further characterized in that said operator input means includes means for designating an index film frame for film in a camera, and said actuating means provides a signal to said memory means for each film frame through which said actuating means cycles and said memory means determines and stores the encoded number of the film frame currently at the camera lens, said operator input means includes means for designating a desired current film frame, and for providing a repositioning signal, and said actuating means responds to said repositioning signal to operate said film transport means to move said desired current film frame to said camera lens and to operate said camera positioning means to move the camera to the co-ordinate positions associated with said desired current film frame.

9. An automated motion picture camera control system according to claim 8 in which said operator input means includes means for entering slating information and a slating command and said actuating means responds thereto to record said slating information on a designated film frame.

10. An automated motion picture camera control system according to claim 1 in which said memory means includes erasable memory storage means, and said desired co-ordinates of said positioning means for said designated film frames are erasably stored in said erasable memory storage means.

11. An automated motion picture camera control system according to claim 1 further comprising camera film transport means for advancing film in a camera controlled by said actuating means, a process projector for projecting images sequentially on a screen in view of a camera controlled by said camera positioning means and also coupled to said actuating means, and said actuating means includes time synchronizing means for advancing said images in said process projector at a rate proportional to the rate of actuation of said film transport.

12. An automated motion picture camera control system comprising:
camera servo controls for positioning said camera according to co-ordinates along a plurality of spatial axes,
a film transport servocontrol,
electronic input terminal means for manually entering axial co-ordinates for each of a plurality of frame locations within said film,
memory means for storing axial co-ordinates entered in association with sequential film frames,
transducer means for receiving axial co-ordinates from said memory means in association with sequential film frames and driving said film transport to advance said film, frame by frame, past a camera lens and driving said camera servocontrols to positions corresponding to axial co-ordinates as the film frame associated therewith is in registration with said camera lens.

13. An automated motion picture camera control system according to claim 12 in which co-ordinates are entered at said input means only for specified frame locations, and further comprising co-ordinate calculation means connected to said memory means for ascertaining axial co-ordinates for frame locations between said specified frame locations and for directing said transducer means to drive said camera servocontrols thereto.

14. An automated motion picture camera control system according to claim 13 in which said memory means comprises erasable floppy disks.

15. An automated motion picture camera control system according to claim 12 further comprising an operator terminal including means for producing an image of data in said memory means.

16. An automated motion picture camera control system according to claim 15 wherein said operator terminal further includes a electronically actuated image display.

17. An automated motion picture camera control system according to claim 15 further comprising a printer for providing a tangible record of at least portions of data imaged by said means for imaging data from said memory means.

18. An automated video camera control system comprising:
camera positioning means for positioning and holding a video camera independently along a plurality of position axes,
memory means for storing electronically encoded desired co-ordinates of said positioning means for each of said position axes for each of a plurality of separated and enumerated sequential running time intervals,
operator input means connected to said memory means for manually providing co-ordinates and for designating an associated running time interval by number,
means connected to said memory means for deriving position co-ordinates for each position axis for each running time interval between sequential designated running time intervals, actuating means for cycling said means for deriving sequentially through running time intervals between sequential designated ones thereof, and for coupling said memory means and said means for deriving to said camera positioning means to direct said camera positioning means to the co-ordinate positions of running time intervals.

19. An automated video camera control system according to claim 18 further comprising, an operator viewing and control console positionable independent of said video camera, and including said operator input means and a video monitor for receiving images from said camera.

20. An automated video camera control system according to claim 19 further comprising means for imaging stored data, said memory means is connected to said means for imaging stored data for displaying encoded material stored therein.

21. An automated video camera control system according to claim 20 in which encoded images of said position co-ordinates are accessible for display on said monitor, and further comrpising means on said console for accessing into position co-ordinates for display on said monitor.

22. An automated video camera control system according to claim 18 in which said console is mobile and is connected to said memory means and said means for deriving by umbilical connections.

* * * * *